United States Patent
Noda

(10) Patent No.: US 7,230,994 B2
(45) Date of Patent: Jun. 12, 2007

(54) MULTI-LEVEL MODULATION APPARATUS, MULTI-LEVEL DEMODULATION APPARATUS, MULTI-LEVEL MODULATION/DEMODULATION COMMUNICATION SYSTEM, PROGRAM AND MODULATION/DEMODULATION METHOD

(75) Inventor: Seiichi Noda, Tokyo (JP)

(73) Assignee: NEC Corporation, Tokyo (JP)

( * ) Notice: Subject to any disclaimer, the term of this patent is extended or adjusted under 35 U.S.C. 154(b) by 817 days.

(21) Appl. No.: 10/404,135

(22) Filed: Apr. 2, 2003

(65) Prior Publication Data

US 2003/0189986 A1 Oct. 9, 2003

(30) Foreign Application Priority Data

| Apr. 4, 2002 | (JP) | 2002-102994 |
| Apr. 4, 2002 | (JP) | 2002-102995 |
| Apr. 4, 2002 | (JP) | 2002-102996 |

(51) Int. Cl.
*H04L 25/34* (2006.01)
*H04L 25/49* (2006.01)

(52) U.S. Cl. ............ 375/286; 375/261; 375/264; 375/298; 375/324; 375/340

(58) Field of Classification Search ........ 375/261, 375/286, 264, 298, 324, 340
See application file for complete search history.

(56) References Cited

U.S. PATENT DOCUMENTS 5,107,504 A * 4/1992 Nakamura et al. .......... 714/778
6,212,654 B1 * 4/2001 Lou et al. ................... 714/701
6,980,539 B2 * 12/2005 Hanada et al. .............. 370/342
2002/0031190 A1    3/2002 Ophir et al.
2003/0039315 A1 * 2/2003 Noda ......................... 375/261

FOREIGN PATENT DOCUMENTS

| DE | 102 37 521 A1 | 3/2003 |
| JP | 4-196945 | 7/1992 |

OTHER PUBLICATIONS

A. Chouly et al., "A Class of Block-Coded Modulation Schemes Based on One-Step Partitioning of the Signal Alphabet," International Conference on Communications, vol. 1, Jun. 1989, XP000075508.
Patent Abstracts of Japan, vol. 16, No. 526, Oct. 28, 1992 & JP 04-196945A Jul. 16, 1992, abstract only.

* cited by examiner

*Primary Examiner*—Dac Ha
*Assistant Examiner*—Ted M. Wang
(74) *Attorney, Agent, or Firm*—Foley & Lardner LLP

(57) ABSTRACT

In a QAM modulation system, (3p+1) or (3p+2) input signal strings, where p is an integer not less than 3 or 2, are converted into three (p+1) string signals which are then allocated to three phase planes. The converted three (p+1) string signals are time-division multiplexed and multi-level modulated to realize QAM modulation in which the n-ary number may be set to approximately $2^{(p+1/3)}$ or $2^{(p+2/3)}$.

In a QAM modulation system, (4p+3) input signal strings, where p is an integer not less than 3, are converted into three (p+1) string signals, which are then allocated to three phase planes, time-division multiplexed and multi-level modulated to realize QAM modulation in which the n-ary number may be set to approximately $2^{(p+3/4)}$.

64 Claims, 29 Drawing Sheets

A, B, C, : FIRST TO THIRD MODULATION SYMBOLS

FIG. 4

| INPUT SIGNAL NUMBER | VALUES THE MODULATION SYMBOLS MAY TAKE ON | | | SUM |
| --- | --- | --- | --- | --- |
| | FIRST MODULATION SYMBOL | SECOND MODULATION SYMBOL | THIRD MODULATION SYMBOL | |
| 1 ~ 7040 | 1~16 | 1~22 | 1~20 | 7040 |
| 7041 ~ 16128 | 17~22 | 1~16 | 1~12 | 1152 |
| SUM | | | | 8192 |

| TRANSMISSION CAPACITY (bit/Symbol) | p | 3p+1 | MODULATION SYMBOLS | | |
|---|---|---|---|---|---|
| | | | FIRST | SECOND | THIRD |
| 3.333... | 3 | 10 | 11QAM | 11QAM | 10QAM |
| | | | | 8QAM | 6QAM |
| 4.333... | 4 | 13 | 22QAM | 22QAM | 20QAM |
| | | | | 16QAM | 12QAM |
| 5.333... | 5 | 16 | 44QAM | 44QAM | 40QAM |
| | | | | 32QAM | 24QAM |
| 6.333... | 6 | 19 | 88QAM | 88QAM | 80QAM |
| | | | | 64QAM | 48QAM |
| 7.333... | 7 | 22 | 176QAM | 176QAM | 160QAM |
| | | | | 128QAM | 96QAM |

FIG. 14

| INPUT SIGNAL NUMBER | VALUES THE MODULATION SYMBOLS MAY TAKE ON | | | SUM |
|---|---|---|---|---|
| | FIRST MODULATION SYMBOL | SECOND MODULATION SYMBOL | THIRD MODULATION SYMBOL | |
| 1 ~ 12544 | 1~16 | 1~28 | 1~28 | 12544 |
| 12545 ~ 16128 | 17~24 | 1~28 | 1~16 | 3584 |
| 16130 ~ 16384 | 25~28 | 1~16 | 1~4 | 256 |
| | SUM | | | 16384 |

FIG. 15

| | NUMBER OF SIGNAL POINTS |
|---|---|
| 16 POINTS OF FIRST SYMBOL | 16 × 28 × 28 = 12544 |
| 8 POINTS OF FIRST SYMBOL | 8 × 28 × 16 = 3584 |
| 4 POINTS OF FIRST SYMBOL | 4 × 16 × 4 = 256 |

16 POINTS IN 28QAM — 28QAM — 28QAM

8 POINTS IN 28QAM — 28QAM — 16QAM

4 POINTS IN 28QAM — 16QAM — 4QAM

SUM = 16384 = 2^14

FIG. 16

| TRANSMISSION CAPACITY (bit/Symbol) | p | 3p+2 | | MODULATION SYMBOLS | | |
|---|---|---|---|---|---|---|
| | | | | FIRST | SECOND | THIRD |
| 2.666··· | 2 | 8 | 7QAM | 4<br>2<br>1 | 7QAM<br>7QAM<br>2QAM | 7QAM<br>4QAM<br>2QAM |
| 3.666··· | 3 | 11 | 14QAM | 8<br>4<br>2 | 14QAM<br>14QAM<br>8QAM | 14QAM<br>8QAM<br>2QAM |
| 4.666··· | 4 | 14 | 28QAM | 16<br>8<br>4 | 28QAM<br>28QAM<br>16QAM | 28QAM<br>16QAM<br>4QAM |
| 5.666··· | 5 | 17 | 56QAM | 32<br>16<br>8 | 56QAM<br>56QAM<br>32QAM | 56QAM<br>32QAM<br>8QAM |
| 6.666··· | 6 | 20 | 112QAM | 64<br>32<br>16 | 112QAM<br>112QAM<br>64QAM | 112QAM<br>64QAM<br>16QAM |
| 7.666··· | 7 | 23 | 224QAM | 128<br>64<br>32 | 224QAM<br>224QAM<br>128QAM | 224QAM<br>128QAM<br>32QAM |

FIG. 23

| INPUT SIGNAL NUMBER | VALUES THE MODULATION SYMBOLS MAY TAKE ON | | | | SUM |
|---|---|---|---|---|---|
| | FIRST MODULATION SYMBOL | SECOND MODULATION SYMBOL | THIRD MODULATION SYMBOL | FOURTH MODULATION SYMBOL | |
| 1 ~ 64000 | 1~16 | 1~30 | 1~30 | 1~24 | 345600 |
| 64001 ~ 102400 | 17~24 | 1~30 | 1~24 | 1~24 | 138240 |
| 102401 ~ 122880 | 25~28 | 1~24 | 1~24 | 1~16 | 36864 |
| 122881 ~ 131072 | 29~30 | 1~16 | 1~14 | 1~8 | 3584 |
| | | SUM (524288=2^19) | | | 524288 |

FIG. 25

| TRANSMISSION CAPACITY (bits/Symbol) | p | 4p+3 | PARAMETERS OF 2**(4P+3)/QAM | | MODULATION SYMBOLS | | | |
|---|---|---|---|---|---|---|---|---|
| | | | | FIRST | SECOND | THIRD | FOURTH |
| 3.75 | 3 | 15 | 15QAM | 8 | 15QAM | 15QAM | 12QAM |
| | | | | 4 | 15QAM | 12QAM | 12QAM |
| | | | | 2 | 12QAM | 12QAM | 8QAM |
| | | | | 1 | 8QAM | 7QAM | 4QAM |
| 4.75 | 4 | 19 | 30QAM | 16 | 30QAM | 30QAM | 24QAM |
| | | | | 8 | 30QAM | 24QAM | 24QAM |
| | | | | 4 | 24QAM | 24QAM | 16QAM |
| | | | | 2 | 16QAM | 14QAM | 8QAM |
| 5.75 | 5 | 23 | 60QAM | 32 | 60QAM | 60QAM | 48QAM |
| | | | | 16 | 60QAM | 48QAM | 48QAM |
| | | | | 8 | 48QAM | 48QAM | 32QAM |
| | | | | 4 | 32QAM | 28QAM | 16QAM |
| 6.75 | 6 | 27 | 120QAM | 64 | 120QAM | 120QAM | 96QAM |
| | | | | 32 | 120QAM | 96QAM | 96QAM |
| | | | | 16 | 96QAM | 96QAM | 64QAM |
| | | | | 8 | 64QAM | 56QAM | 32QAM |
| 7.75 | 7 | 31 | 240QAM | 128 | 240QAM | 240QAM | 192QAM |
| | | | | 64 | 240QAM | 192QAM | 192QAM |
| | | | | 32 | 192QAM | 192QAM | 128QAM |
| | | | | 16 | 128QAM | 112QAM | 64QAM |

MULTI-LEVEL DEMODULATION PROGRAM

MULTI-LEVEL MODULATION APPARATUS, MULTI-LEVEL DEMODULATION APPARATUS, MULTI-LEVEL MODULATION/DEMODULATION COMMUNICATION SYSTEM, PROGRAM AND MODULATION/DEMODULATION METHOD

FIELD OF THE INVENTION

This invention relates to a multi-level modulation/demodulation technique and, more particularly, to a multi-level modulation apparatus, a multi-level demodulation apparatus, a multi-level modulation/demodulation communication system, a program and a modulation/demodulation method.

BACKGROUND OF THE INVENTION

The multi-level modulation technique has so far been put to use especially in e.g., digital microwave communication. In particular, $2^n$ QAM (quadrature amplitude modulation) system, where n is a natural number, exemplified by 4QAM, 16QAM, 32QAM, 64QAM, 128QAM and 256QAM, is preferentially used. Up to now, these modulation systems have been in use generally because of simplicity in circuitry. Recently, however, there is a strong demand for effective utilization of the frequency and the transmission power. Thus, it is strongly desired to achieve the required data transmission capacity without waste as the frequency bandwidth to be secured and as the digital microwave communication network is kept to as small a value as possible, in order to combat such exemplary situation in which, in case the 32QAM system is adopted to realize the data transmission capacity that is not possible to achieve with the 16QAM system, there is sufficient allowance in the data transmission capacity with the 32QAM system, such that the frequency bandwidth is taken up wastefully.

SUMMARY OF THE DISCLOSURE

In order to meet this demand, there is proposed in e.g., JP Patent Kokai Publication JP-A-4-196945 a general structure in which one input data is allocated to two or more modulation symbols. In this JP Patent Kokai Publication JP-A-4-196945, there is disclosed a method for multi-level modulation, in which, with M and N each being an integer not less than 2, P being an integer such that $1 \leq P < N$ and with Q being an integer such that $1 \leq Q$, one or more input binary data string is converted to M×N+P strings, in which, with N values $A_1, A_2, \ldots A_N$ each being approximately equal to $2^{M+P/N}$ and with the product of $A_1$ to $A_N$ being equal to $2^{M \times N+P}$, (M×N+P) strings of binary data are converted so as to be represented by the combination of (M+Q) strings of N sets of binary data strings associated with the values of $A_1$ to $A_N$, N sets of (M+Q) strings of binary data are converted to one set of (M+Q) strings of binary data, a set of (M+Q) string of the binary data is input, and in which a number of signal inputs corresponding to the values of $A_1$ to $A_N$ are arrayed at each time instant on the phase plane in order to effect multi-level modulation. In a preferred embodiment of the aforesaid publication, N=2, M=4, P=1, Q=1, A1=24 and A2=24.

However, in the aforesaid JP Patent Kokai Publication JP-A-4-196945, only a generalized structure is shown, while their lacks explanation on the specified structure in which the input signal string is allocated to plural modulation symbols. For example, if the n-ary number is desired to be set to approximately $2^{(p+2/3)}$, where p is an optional integer, it is not shown in the JP Patent Kokai Publication JP-A-4-196945 how this specified structure may be achieved.

That is, there is no suggestion as to means or structure for achieving an QAM system where the level of modulation may be set freely.

If the n-ary number is desired to be set to approximately $2^{(p+2/3)}$, where p is an optional integer, it is not shown in the JP Patent Kokai Publication JP-A-4-196945 how the specified structure is achieved.

If the n-ary number is desired to be set to approximately $2^{(p+0.75)}$, where p is an integer not less than 3, it is not shown in the JP Patent Kokai Publication JP-A-4-196945 how the specified structure is achieved.

Accordingly, it is an object of the present invention to provide a multi-level modulation/demodulation technique and, more particularly, to a multi-level modulation apparatus, a multi-level demodulation apparatus, a multi-level modulation/demodulation communication system, a program and a modulation/demodulation method, in which the modulation frequency may be set more flexibly.

It is another object of the present invention to provide a multi-level modulation/demodulation technique and, more particularly, to a multi-level modulation apparatus, a multi-level demodulation apparatus, a multi-level modulation/demodulation a communication system, a program and a modulation/demodulation method, in which the frequency may be exploited effectively and in which $2^{(n-2/3)}$QAM may be achieved with a lesser value of the required S/N than in the $2^n$QAM system.

It is another object of the present invention to provide a multi-level modulation/demodulation technique and, more particularly, to a multi-level modulation apparatus, a multi-level demodulation apparatus, a multi-level modulation/demodulation a communication system, a program and a modulation/demodulation method, in which the frequency may be exploited effectively and in which $2^{(n-1/3)}$QAM may be achieved with a lesser value of the required S/N.

It is a further object of the present invention to provide a multi-level modulation/demodulation technique and, more particularly, to a multi-level modulation apparatus, a multi-level demodulation apparatus, a multi-level modulation/demodulation a communication system, a program and a modulation/demodulation method, in which the frequency may be exploited effectively and in which $2^{(n-0.25)}$QAM may be achieved with a lesser value of the required S/N than with $2^n$.

For accomplishing at least one of the above objects, the present invention provides a multi-level modulation apparatus for multi-level modulation of an input data string to output a communication signal, comprising a data string number conversion circuit for converting the input data string into an input data signal made up by (3p+1) strings of binary signals, where p is an integer not less than 3, a first data conversion circuit supplied with the input data signal output from the data string number conversion circuit for converting the input data signal to output the converted input data signal, a second data conversion circuit supplied with the input data signal output from the data string number conversion circuit and with an output signal of the first data conversion circuit to convert the supplied signal into three sets of output signals, termed first, second and third output signals, each being a (p+1) string output signal, a parallel-to-serial conversion circuit, supplied with and time-division multiplexing the three sets of (p+1) string output signals, output by the second data conversion circuit, to output resulting output signals, and a multi-level modulating unit supplied with the output signal of the parallel-to-serial conversion circuit to effect multi-level modulation to output the resulting communication signals.

The first data conversion circuit outputs signals indicating values from 1 to $(11/8) \times 2^p$, depending on the value of the input data signal. If the output signal of the first data conversion circuit takes on a value from 1 to $8 \times 2^{(p-3)}$, the second data conversion circuit sets, based on the input data signal, the value of the output signal of the first data conversion circuit as the first output signal and outputs signals representing predetermined $(11/8) \times 2^p$ and $(10/8) \times 2^p$ values as the second and third signals, respectively, whereas, if the output signal of the first data conversion circuit takes on a value from $1+8 \times 2^{(p-3)}$ to $8 \times 2^{(p-3)} + 3 \times 2^{(p-3)}$, the second data conversion circuit sets the value of the output signal of the first data conversion circuit as the first output signal and outputs signals representing predetermined $(8/8) \times 2^p$ and $(6/8) \times 2^p$ values as the second and third signals, respectively.

In another aspect, the present invention provides a multi-level demodulating apparatus for demodulating a communication signal to output a demodulated data signal of 3p+1 strings, where p is an integer not less than 3, said apparatus comprising: a multi-level demodulating unit for demodulating said communication signal to output a demodulated received data string signal; a serial-to-parallel conversion circuit, for receiving and time-division demultiplexing said received demodulated data string signal to output first, second and third demodulated data string signals; and a data inverse-conversion circuit, receiving said first, second and third demodulated data string signals to output said demodulated data signal of (3p+1) strings. If said first demodulated data string signal takes on a value from 1 to $8 \times 2^{(p-2)}$, said data inverse-conversion circuit receives signals representing predetermined $(11/8) \times 2^p$ and $(10/8) \times 2^p$ values, as second and third demodulated data string signals, respectively; if said first demodulated data string signal takes on a value from $1+8 \times 2^{(p-3)}$ to $8 \times 2^{(p-3)} + 3 \times 2^{(p-3)}$, said data inverse-conversion circuit receives signals representing predetermined $(8/8) \times 2^p$ and $(6/8) \times 2^p$ values, as second and third demodulated data string signals, respectively; and said data inverse-conversion circuit outputs the demodulated data taking on predetermined value, based on the values indicated by said first, second and third demodulated data string signals, as said (3p+1) strings of said demodulated data.

In still another aspect, the present invention provides a computer program product (which may be stored in a medium which is accessible by a computer), which cause a computer composing a multi-level modulation apparatus to perform the processing of multi-level modulation of 3p+1 strings of an input data signal, where p is an integer not less than 3. The program causes the computer to execute the processing of converting the input data signal into first, second and third converted data in such a manner that the first conversion data takes on a value from 1 to $(11/8) \times 2^p$ depending on the value of the input data signals, and that, if the first conversion data takes on a value from 1 to $8 \times 2^{(p-3)}$, the second and third conversion data takes on predetermined $(11/8) \times 2^p$ and $(18/8) \times 2^p$ values, depending on the value of the input data signal, respectively, whereas, if the first conversion data takes on a value from $1+8 \times 2^{(p-2)}$ to $8 \times 2^{(p-2)} + 3 \times 2^{(p-2)}$ values, the second and third conversion data takes on predetermined $(8/8) \times 2^p$ and $(6/8) \times 2^p$ values, respectively, depending on the value of the input data signal.

The program causes the computer to execute the processing of sequentially outputting the first to third conversion data to a multi-level demodulating unit.

In still another aspect, the present invention provides a program causing a computer composing a multi-level modulation apparatus to perform the processing of performing multi-level demodulation of communication signal and outputting a demodulated data signal of (3p+1) strings, where p is an integer not less than 3. The program causes the computer to perform the processing in which the communication signals are received as first to third data string signals for demodulation and converted into the (3p+1) data demodulated signals, $(11/8) \times 2^p$ values are received as the first demodulated data string signals, and in which, if the first demodulated data string signal takes on a value from 1 to $8 \times 2^{(p-3)}$, predetermined $(11/8) \times 2^p$ and $(10/8) \times 2^p$ values are received as the second and third demodulated data string signals, respectively, whereas, if the first demodulated signal takes on a value from $1+8 \times 2^{(p-3)}$ to $8 \times 2^{(p-3)} + 3 \times 2^{(p-3)}$, predetermined $(8/8) \times 2^p$ and $(6/8) \times 2^p$ values are received as the second and third demodulated data string signals, respectively, with predetermined demodulated data values being taken on based on the values indicated by the first to third demodulated data string signals; the demodulated data values being output as (3p+1) strings of demodulated data signals.

In yet another aspect, the present invention provides a multi-level modulating/demodulating method for allocating (3p+1) strings of an input signal to three modulation symbols, where p is an integer not less than 3, in which the first modulation symbol uses $(11/8) \times 2^p$ signal points, if the first modulation symbol takes 1 to $8 \times 2^{(p-3)}$ signal points, $(11/8) \times 2^p$ and $(10/8) \times 2^p$ signal points, predetermined in association with the input signal, are used as the second and third modulation symbols, whereas, if the first modulation symbol takes $1+8 \times 2^{(p-3)}$ to $8 \times 2^{(p-3)} + 3 \times 2^{(p-3)}$ points, $(8/8) \times 2^p$ and $(6/8) \times 2^p$ signal points, predetermined in association with the input signal, are used as the second and third modulation symbols, respectively.

In the multi-level modulation apparatus of the present invention, (3p+1) strings of an input data signal, where p is an integer not less than 2, are converted to three (p+1) strings of signals, each of which is allocated to one independent phase plane. The three phase planes are time-division multiplexed as a set and subjected to multi-level modulation. The resulting multi-level modulated signals are transmitted. By allocating the coordinate points to the three phase planes of the set, (p+1/3) bits may be allocated to the single modulation symbol.

If the (p+1/3) bits are allocated to one modulation symbol, the number of signals is $2^{(p+1/3)}$. However, if a single modulation symbol is used, $2^{(p+1/3)}$ becomes an irrational number so that modulation cannot be achieved as actual number of signal points.

Thus, the present invention is configured so that the three phase planes are multi-level modulated as a set, and so that the respective signal points of the three phase planes are controlled.

This achieves the operation as if (p+1/3) bits are allocated to one modulation symbol, whereby the n-ary number in the QAM system may be approximately $2^{(n+1/3)}$.

For accomplishing at least one of the above objects, the present invention provides a multi-level modulation apparatus for multi-level modulation of an input data string to output a communication signal, comprising a data string number conversion circuit for converting the input data string into an input data signal made up by 3p+2 strings of binary signals, where p is an integer not less than 2, a first data conversion circuit supplied with the input data signal output from the data string number conversion circuit for converting the input data signal to output the converted input data signal, a second data conversion circuit supplied with the input data signal output from the data string number conversion circuit and with an output signal of the first data conversion circuit to convert the input signal into three sets of output signals, termed first, second and third output signals, each being a (p+1) string output signal, a parallel-to-serial conversion circuit, supplied with the three sets of (p+1) string output signals, output by the second data conversion circuit, and a multi-level modulating unit supplied with an output signal of the parallel-to-serial conversion circuit to effect multi-level modulation to output the resulting communication signals. The first data conversion circuit outputs signals indicating values from 1 to $(7/4) \times 2^p$, responsive to the value of the input data signal. If the output signal of the first data conversion circuit takes on a value from 1 to $4 \times 2^{(p-2)}$, the second data conversion circuit sets, based on the input data signal, the value of the output signal of the first data conversion circuit as the first output signal and outputs signals representing predetermined $(7/4) \times 2^p$ and $(7/4) \times 2^p$ values as the second and third signals, respectively, whereas, if the output signal of the first data conversion circuit takes on a value from $1+4 \times 2^{(p-2)}$ to $4 \times 2^{(p-2)} + 2 \times 2^{(p-2)}$, the second data conversion circuit sets the value of the output signal of the first data conversion circuit as the first output signal and outputs signals representing predetermined $(7/4) \times 2^p$ and $1 \times 2^p$ values as the second and third signals, respectively and, if the output signal of the first data conversion circuit takes on a value from $1+4 \times 2^{(p-2)}+2 \times 2^{(p-2)}$ to $4 \times 2^{(p-2)}+2 \times 2^{(p-2)}+1 \times 2^{(p-2)}$, the second data conversion circuit sets the value of the output signal of the first data conversion circuit as the first output signal and outputs signals representing predetermined $1 \times 2^p$ and $(1/4) \times 2^p$ values as the second and third signals, respectively.

In another aspect, the present invention provides a multi-level demodulating apparatus for demodulating a communication signal to output a demodulated data signal of (3p+2) string, where p is an integer not less than 2, comprising a multi-level demodulating unit for demodulating the communication signal to output a demodulated received data string signal, a serial-to-parallel conversion circuit for receiving and time-division demultiplexing the demodulated received data string signal to output first, second and third demodulated data string signals, and a data inverse-conversion circuit supplied with the first, second and third demodulated data string signals to output the 3p+2 strings of demodulated data signals. If the first demodulated data string signal takes on a value from 1 to $4 \times 2^{(p-2)}$, the data inverse-conversion circuit receives signals representing predetermined $(7/4) \times 2^p$ values as second and third demodulated data string signals. If the first demodulated data string signal takes on a value from $1+4 \times 2^{(p-2)}$ to $4 \times 2^{(p-2)}+2 \times 2^{(p-2)}$, the data inverse-conversion circuit receives signals representing predetermined $(7/4) \times 2^p$ and $1 \times 2^p$ values, as second and third demodulated data string signals, respectively, whereas, if the first demodulated data string signal takes on a value from $1+4 \times 2^{(p-2)}++2 \times 2^{(p-2)}$ to $4 \times 2^{(p-2)}+2 \times 2^{(p-2)}+1 \times 2^{(p-2)}$, the data inverse-conversion circuit receives signals representing predetermined $1 \times 2^p$ and $(1/4) \times 2^p$ values, as second and third demodulated data string signals, respectively, the data inverse-conversion circuit taking on predetermined demodulated data values, based on the values indicated by the first, second and third demodulated data string signals, to output the demodulated data values as the 3p+2 demodulated data signal string.

In a further aspect, the present invention provides a multi-level modulating/demodulating method for allocating (3p+2) strings of an input signal to three modulation symbol, where p is an integer not less than 2, wherein the first modulation symbol uses $(7/4) \times 2^p$ signal points. If the first modulation symbol takes 1 to $4 \times 2^{(p-3)}$ signal points, $(7/4) \times 2^p$ signal points, predetermined in association with the input signal are used as the second and third modulation symbol. If the first modulation symbol takes $1+4 \times 2^{(p-3)}$ points, $(7/4) \times 2^p$ values and $1 \times 2^p$ signal points, predetermined in association with the input signal, are used as the second and third modulation symbols, respectively, whereas, if the first modulation symbol takes $1+4 \times 2^{(p-2)}+2 \times 2^{(p-2)}$ to $4 \times 2^{(p-2)}+2 \times 2^{(p-2)}+1 \times 2^{(p-2)}$ signal points, $1 \times 2^p$ and $(1/4) 2^p$ signal points, predetermined in association with the input signal, are used as the second and thirds symbols, respectively.

In the multi-level modulation apparatus of the present invention, (3p+2) strings of an input data signal, where p is an integer not less than 2, are converted to three (p+1) strings of signals, each of which is allocated to one independent phase plane. The three phase planes are time-division multiplexed as a set and subjected to multi-level modulation and the resulting multi-level modulated signals are transmitted. By allocating the coordinate points to the three phase planes of the set, (p+2/3) bits may be allocated to the single modulation symbol.

If the (p+2/3) bits are allocated to one modulation symbol, the number of signals is $2^{(p+2/3)}$. However, if a single modulation symbol is used, $2^{(p+2/3)}$ becomes an irrational number so that modulation cannot be achieved as actual number of signal points.

Thus, the present invention is configured so that the three phase planes are multi-level modulated as a set and the respective signal points of the three phase planes are controlled. This achieves the operation as if (p+2/3) bits are allocated to one modulation symbol, whereby the n-ary number in the QAM system may be approximately $2^{(n+2/3)}$.

For accomplishing at least one of the above objects, the present invention provides a multi-level modulation apparatus for multi-level modulation of an input data string to output a communication signal, comprising: a data string number conversion circuit for converting the input data string into an input data signal made up by 4p+3 strings of binary signals, where p is an integer not less than 3, a first data conversion circuit supplied with the input data signal output from the data string number conversion circuit for converting the input data signal to output the converted input data signal, a second data conversion circuit supplied with the input data signal output from the data string number conversion circuit and with an output signal of the first data conversion circuit to convert the input signal into four sets of output signals, termed first, second, third and fourth output signals, each being a (p+3) string output signal, a parallel-to-serial conversion circuit, supplied with and time-division multiplexing the four sets of (p+1) string output signals, output by the second data conversion circuit, to output resulting output signals, and a multi-level modulating unit supplied with the output signal of the parallel-to-serial conversion circuit to effect multi-level modulation to output the resulting communication signals. The first data conversion circuit outputs signals indicating values from 1 to $15 \times 2^{(p-3)}$, responsive to the value of the input data signal. If the output signal of the first data conversion circuit takes on a value from 1 to $8 \times 2^{(p-3)}$, the second data conversion circuit sets, based on the input data signal, the value of the output signal of the first data conversion circuit as the first output signal and outputs signals representing predetermined $15 \times 2^{(p-3)}$, $15 \times 2^{(p-3)}$ and $12 \times 2^{(p-3)}$ values as the second, third and fourth signals, respectively. If the output signal of the first data conversion circuit takes on a value from $8 \times 2^{(p-3)}+1$ to $8 \times 2^{(p-3)}+4 \times 2^{(p-3)}$, the second data conversion circuit sets the value of the output signal of the first data conversion circuit as the first output signal and outputs signals representing predetermined $15 \times 2^{(p-3)}$, $12 \times 2^{(p-3)}$ and $12 \times 2^{(p-3)}$ values as the second, third and fourth output signals, respectively. If the output signal of the first data conversion circuit takes on a value from $8 \times 2^{(p-3)}+4 \times 2^{(p-3)}+1$ to $8 \times 2^{(p-3)}+4 \times 2^{(p-3)}+2 \times 2^{(p-3)}$, the second data conversion circuit sets the value of the output signal of the first data conversion circuit as the first output signal and outputs signals representing predetermined $12 \times 2^{(p-3)}$, $12 \times 2^{(p-3)}$ and $8 \times 2^{(p-3)}$ values as the second, third and fourth signals, respectively and, if the output signal of the first data conversion circuit takes on a value from $8 \times 2^{(p-3)}+4 \times 2^{(p-3)}+2 \times 2^{(p-3)}+1$ to $8 \times 2^{(p-3)}+4 \times 2^{(p-3)}+2 \times 2^{(p-3)}+1 \times 2^{(p-3)}$, the second data conversion circuit sets the value of the output signal of the first data conversion circuit as the first output signal and outputs signals representing predetermined $8 \times 2^{(p-3)}$, $7 \times 2^{(p-3)}$ and $4 \times 2^{(p-3)}$ values as the second, third and fourth signals, respectively.

In another aspect, the present invention provides a multi-level demodulating apparatus for demodulating a communication signal to output a demodulated data signal of (4p+3) strings, where p is an integer not less than 3, comprising a multi-level demodulating unit for demodulating the communication signal to output a demodulated received data string signal, a serial-to-parallel conversion circuit for receiving and time-division demultiplexing the demodulated received data string signal for modulation to output first, second, third and fourth demodulated data string signals, and a data inverse-conversion circuit supplied with the first, second, third and fourth demodulated data string signals to output the demodulated data signal of 4p+3 strings. If the first demodulated data string signal takes on a value from 1 to $8 \times 2^{(p-3)}$, the data inverse-conversion circuit receives signals representing predetermined $15 \times 2^{(p-3)}$, $15 \times 2^{(p-3)}$ and $12 \times 2^{(p-3)}$ values as second, third and fourth demodulated data string signals. If the first demodulated data string signal takes on a value from $8 \times 2^{(p-3)}+1$ to $8 \times 2^{(p-3)}+4 \times 2^{(p-3)}$, the data inverse-conversion circuit receives signals representing predetermined $15 \times 2^{(p-3)}$, $12 \times 2^{(p-3)}$ and $12 \times 2^{(p-3)}$ values, as second, third and fourth demodulated data string signals, respectively. If the first demodulated data string signal takes on a value from $8 \times 2^{(p-3)}+4 \times 2^{(p-3)}+1$ to $8 \times 2^{(p-3)}+4 \times 2^{(p-3)}+2 \times 2^{(p-3)}$, the data inverse-conversion circuit receives signals representing predetermined $12 \times 2^{(p-3)}$, $12 \times 2^{(p-3)}$ and $8 \times 2^{(p-3)}$ values, as second, third and fourth demodulated data string signals, respectively. If the first demodulated data string signal takes on a value from $8 \times 2^{(p-3)}+4 \times 2^{(p-3)}+2 \times 2^{(p-3)}+1$ to $8 \times 2^{(p-3)}+4 \times 2^{(p-3)}+2 \times 2^{(p-3)}+1 \times 2^{(p-3)}$, the data inverse-conversion circuit receives signals representing predetermined $8 \times 2^{(p-3)}$, $7 \times 2^{(p-3)}$ and $4 \times 2^{(p-3)}$ values, as second, third and fourth demodulated data string signals, respectively. The data inverse-conversion circuit takes on predetermined demodulated data values, based on the values indicated by the first, second, third and fourth demodulated data string signals, to output the demodulated data values as the 4p+3 demodulated data signal string.

In still another aspect, the present invention provides a multi-level modulating/demodulating method for allocating (4p+3) strings of an input signal to four modulation symbols, where p is an integer not less than 3, wherein the first modulation symbol uses $15 \times 2^{(p-3)}$ signal points. If the first modulation symbol takes 1 to $8 \times 2^{(p-3)}$ signal points, $15 \times 2^{(p-3)}$, $15 \times 2^{(p-3)}$ and $12 \times 2^{(p-3)}$ signal points, predetermined in association with the input signal, are used as the second, third and fourth modulation symbols. If the first modulation symbol takes $8 \times 2^{(p-3)}+1$ to $8 \times 2^{(p-3)}+4 \times 2^{(p-3)}$ signal points, $15 \times 2^{(p-3)}$, $15 \times 2^{(p-3)}$ and $12 \times 2^{(p-3)}$ signal points, predetermined in association with the input signal, are used as the second, third and fourth modulation symbols respectively. If the first modulation symbol takes $8 \times 2^{(p-3)}+4 \times 2^{(p-3)}+1$ to $8 \times 2^{(p-3)}+4 \times 2^{(p-3)}+2 \times 2^{(p-3)}$ signal points, $12 \times 2^{(p-3)}$, $12 \times 2^{(p-3)}$ and $8 \times 2^{(p-3)}$ signal points, predetermined in association with the input signal, are used as the second, third and fourth modulation symbols, respectively. If the first modulation symbol takes $8 \times 2^{(p-3)}+4 \times 2^{(p-3)}+2 \times 2^{(p-3)}+1$ to $8 \times 2^{(p-3)}+4 \times 2^{(p-3)}+2 \times 2^{(p-3)}+1 \times 2^{(p-3)}$ signal points, $8 \times 2^{(p-3)}$, $7 \times 2^{(p-3)}$ and $4 \times 2^{(p-3)}$ signal points, predetermined in association with the input signal, are used as the second, third and fourth modulation symbols, respectively.

In still another aspect, the present invention provides a computer program product causing a computer composing a multi-level modulation apparatus to perform the processing of multi-level modulation of 4p+3 strings of an input data signal, where p is an integer not less than 3. The program allows the computer to execute the processing of converting the input data signal into first, second, third and fourth converted data in such a manner that the first conversion data takes on a value from 1 to $15 \times 2^{(p-3)}$ depending on the value of the input data signals, and that, if the first conversion data takes on a value from 1 to $8 \times 2^{(p-3)}$, the second, third and fourth conversion data take on predetermined $15 \times 2^{(p-3)}$, $12 \times 2^{(p-3)}$ and $12 \times 2^{(p-3)}$ values, depending on the value of the input data signal, respectively. If the first conversion data takes on a value from $8 \times 2^{(p-3)}+1$ to $8 \times 2^{(p-3)}+4 \times 2^{(p-3)}$ values, the second, third and fourth conversion data take on predetermined $15 \times 2^{(p-3)}$, $12 \times 2^{(p-3)}$ and $12 \times 2^{(p-3)}$ values, respectively, depending on the value of the input data signal, whereas, if the first conversion data takes on a value from $8 \times 2^{(p-3)}+4 \times 2^{(p-3)}+1$ to $8 \times 2^{(p-3)}+4 \times 2^{(p-3)}+2 \times 2^{(p-3)}$ values, the second, third and fourth conversion data take on predetermined $12 \times 2^{(p-3)}$, $12 \times 2^{(p-3)}$ and $8 \times 2^{(p-3)}$ values, respectively, depending on the value of the input data signal. If the first conversion data takes on a value from $8 \times 2^{(p-3)}+4 \times 2^{(p-3)}+2 \times 2^{(p-3)}+1$ to $8 \times 2^{(p-3)}+4 \times 2^{(p-3)}+2 \times 2^{(p-3)}+1 \times 2^{(p-3)}$ values, the second, third and fourth conversion data take on predetermined $8 \times 2^{(p-3)}$, $7 \times 2^{(p-3)}$ and $4 \times 2^{(p-3)}$ values, respectively, depending on the value of the input data signal. The program allows the computer to execute the processing of sequentially outputting the first to fourth conversion data to a multi-level demodulating unit.

In a further aspect, the present invention provides a program causing a computer composing a multi-level modulation apparatus to perform the processing of multi-level demodulation of communication signals and outputting (4p+3) strings of demodulated data signals, where p is an integer not less than 3. The program allows the computer to perform the processing in which the communication signals are received as first to fourth data string signals for demodulation and converted into the (4p+3) data demodulated signals, in which $15 \times 2^{(p-3)}$ values are received as the first demodulated data string signals, predetermined $15 \times 2^{(p-3)}$, $15 \times 2^{(p-3)}$ and $12 \times 2^{(p-3)}$ values are received as the second, third and fourth demodulated data string signals, if the first demodulated signal takes on a value from 1 to $8 \times 2^{(p-3)}$, in which predetermined $15 \times 2^{(p-3)}$, $12 \times 2^{(p-3)}$ and $12 \times 2^{(p-3)}$ values are received as the second, third and fourth demodulated data string signals, respectively, if the first demodulated signal takes on a value from $8 \times 2^{(p-3)}+1$ to $8 \times 2^{(p-3)}$ to $4 \times 2^{(p-3)}$, in which predetermined $15 \times 2^{(p-3)}$, $15 \times 2^{(p-3)}$ and $12 \times 2^{(p-3)}$ values are received as the second, third and fourth demodulated data string signals, respectively, if the first demodulated signal takes on a value from $8 \times 2^{(p-3)}$ to $4 \times 2^{(p-3)}+1$ to $8 \times 2^{(p-3)}$ to $4 \times 2^{(p-3)}+2 \times 2^{(p-2)}$ and in which predetermined $8 \times 2^{(p-3)}$, $7 \times 2^{(p-3)}$ and $4 \times 2^{(p-3)}$ values are received as the second, third and fourth demodulated data string signals, respectively, if the first demodulated signal takes on a value from $8 \times 2^{(p-3)}$ to $4 \times 2^{(p-3)}+2 \times 2^{(p-2)}+1$ to $8 \times 2^{(p-3)}$ to $4 \times 2^{(p-3)}+2 \times 2^{(p-2)}+1 \times 2^{(p-2)}$, to output predetermined demodulated data values based on the values indicated by the first to fourth demodulated data string signals, the demodulated data values being output as (4p+3) strings of demodulated data signals.

In the multi-level modulation apparatus of the present invention, (4p+3) strings of input data signals, where p is an integer not less than 3, are converted into four (p+1) strings of signals, which are then allocated to respective independent phase planes. These four planes are tine-division multiplexed as a set, multi-level modulated and output. By allocating coordinate points of the four phase planes of the set, (p+0.75) bits are allocated to one modulation symbol.

If the (p+3/4) bits are allocated to one modulation symbol, the number of signals is $2^{(p+3/4)}$. However, if a single modulation symbol is used, $2^{(p+3/4)}$ becomes an irrational number so that modulation cannot be achieved as actual number of signal points.

Thus, the present invention is configured so that the four phase planes are multi-level modulated as a set and the respective signal points of the three phase planes are controlled. This achieves the operation as if (p+3/4) bits are allocated to one modulation symbol, whereby the n-ary number in the QAM system may be approximately $2^{(n+0.75)}$.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 4 illustrates the structure of data conversion tables of the first and second data conversion circuits in the multi-level modulation apparatus according to the present invention.

FIG. 5 illustrates coordinate points that can be assumed by respective modulation symbols in phase planes of n-ary signals for modulation in the embodiment.

FIG. 6 illustrates specified examples of parameters forming another QAM modulation system in a modification.

FIG. 14 illustrates the structure of data conversion tables of the first and second data conversion circuits in the multi-level modulation apparatus according to the present invention.

FIG. 15 illustrates coordinate points that can be assumed by respective modulation symbols in phase planes of n-ary signals for modulation in the embodiment.

FIG. 16 illustrates specified examples of parameters forming another QAM modulation system in a modification.

FIG. 23 illustrates the structure of data conversion tables of the first and second data conversion circuits in the multi-level modulation apparatus according to the present invention.

FIG. 25 illustrates specified examples of parameters forming another QAM modulation system in a modification.

PREFERRED EMBOSIMENTS OF THE INVENTION

Figure 1:
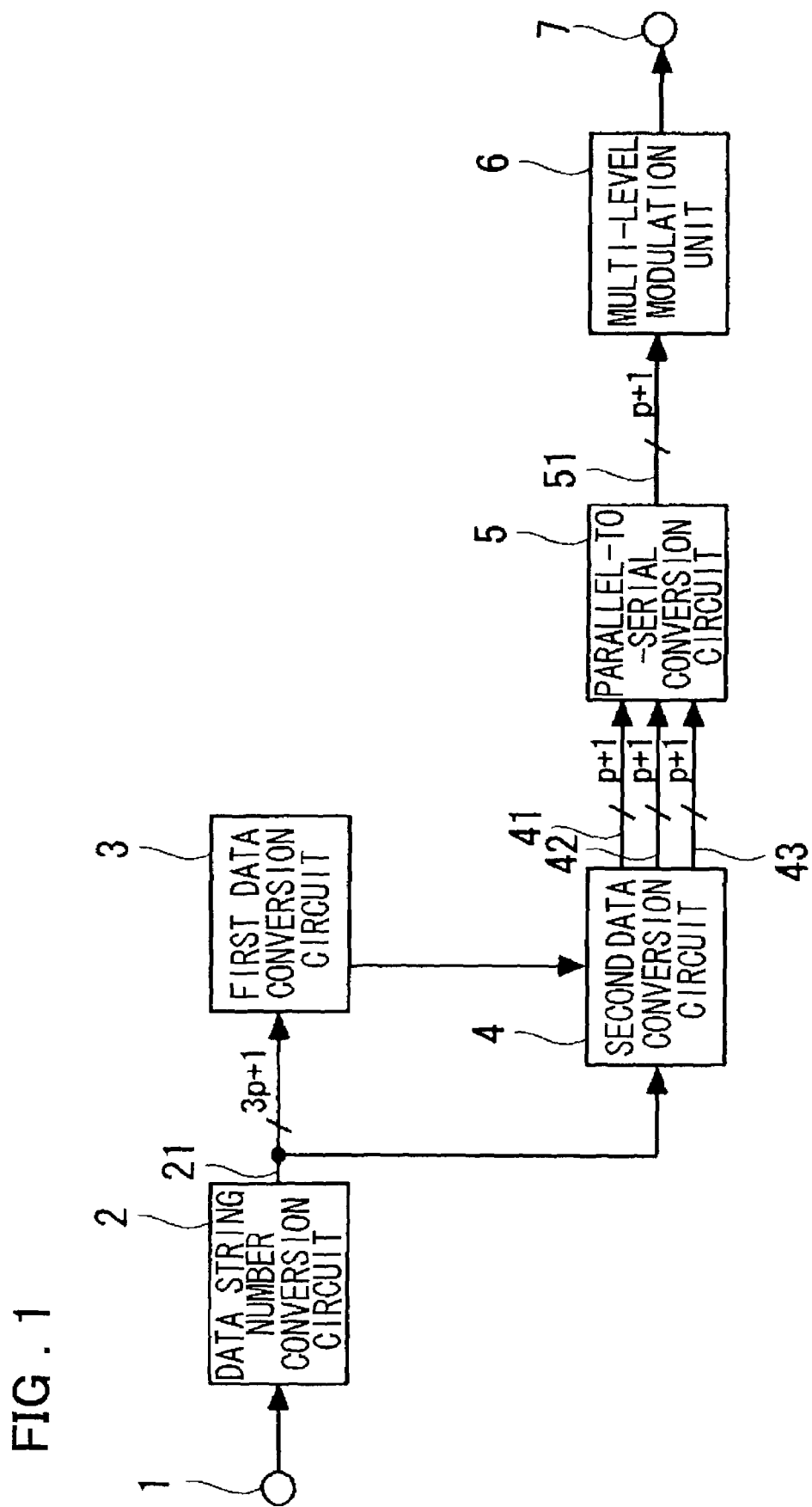
FIG. 1 shows the structure of a multi-level modulation apparatus according to an embodiment of the present invention.

An embodiment of the present invention is hereinafter explained. According to an embodiment of the present invention, a multi-level modulating/demodulating method for allocating (3p+1) strings of an input signal to three modulation symbols, where p is an integer not less than 2. A first modulation symbol uses $(11/8) \times 2^p$ signal points. If the first modulation symbol takes 1 to $8 \times 2^{(p-3)}$ signal points, $(11/8) \times 2^p$ and $(10/8) \times 2^p$ signal points, predetermined in association with the input signal, are used as second and third modulation symbols. If the first modulation symbol takes $1+8 \times 2^{(p-3)}$ to $8 \times 2^{(p-3)} + 3 \times 2^{(p-3)}$ signal points, $(8/8) \times 2^p$ and $(6/8) \times 2^p$ values, predetermined in association with the input signal, are used as the second and third modulation symbols, respectively, whereas, if the first modulation symbol takes $1+4 \times 2^{(p-3)} + 2 \times 2^{(p-3)}$ to $4 \times 2^{(p-3)} + 2 \times 2^{(p-3)} + 1 \times 2^{(p-3)}$ signal points, $(8/8) \times 2^p$ values and $(6/8) \times 2^p$ signal points, predetermined in association with the input signal, are used as the second and third modulation symbol, respectively.

A modulation apparatus according to an embodiment of the present invention, comprises converting means supplied with an input signal that takes on a value from 1 to a (3p+1) power of 2, where p is an integer not less than 3, to generate and output first to third converted data based on the input signal, and means supplied with the first to third converted data to effect multi-level modulation thereon to output the resulting data. The converting means classifies the input signal, depending on the values thereof, into two predetermined groups not having common elements. The converter means includes means for executing conversion such that, when the input signal belongs to the first group, the first converted data takes on a value from 1 to $8 \times 2^{(p-3)}$, depending on the value of the input signals, the second and third converted data taking on $(11/8) \times 2^p$ and $(10/8) \times 2^p$ values, allocated depending on the value of the input signal, respectively, and that, when the input signal belongs to the second group, the first converted data takes on a value from $1+8 \times 2^{(p-2)}$ to $8 \times 2^{(p-2)} + 3 \times 2^{(p-2)}$, depending on the value of the input signals, with the second and third converted data taking on $(8/8) \times 2^p$ and $(6/8) \times 2^p$ values, allocated depending on the value of the input signal, respectively.

The operating principle of modulation of the present invention is that, with p being an integer not less than 3, we have the following equation (1):

$$2^{(3p+1)} = \{(11/8 \times 2^p) \times \{(10/8) \times 2^p\} \times \{8 \times 2^{(p-2)}\}\} + \quad (1)$$
$$\{(8/8) \times 2^p\} \times \{(6/8 \times 2^p\} \times \{3 \times 2^{(p-3)}\} +$$
$$\{1 \times 2^p\} \times \{(1/4) \times 2^p\} \times \{1 \times 2^{(p-3)}\}$$

The first term of the right side of the equation (1) indicates that, in the $(11/8) \times 2^p$ QAM of the first signal, $8 \times 2^{(p-2)}$ number of times, the second and third signals are $(11/8) \times 2^p$ QAM and $(6/8) \times 2^p$ QAM, respectively. The second term of the right side of the equation (1) indicates that $3 \times 2^{(p-2)}$ number of times the second and third signals are $(8/8) \times 2^p$ QAM and $(6/8) \times 2^p$ QAM, respectively.

In the above equation (1), the total number of the first signals is $(7/4) \times 2^p$.

That is, the operation in which (p+1/3) bits are equivalently allocated to one modulation symbol is executed. From this, it may be seen that the n-ary number in the QAM system may be set to approximately $2^{(n+1/3)}$.

FIG. 1 is a block diagram showing the structure of a multi-level modulation apparatus according to a first embodiment of the present invention. Referring to FIG. 1, a multi-level modulation apparatus of the present embodiment includes an input terminal 1, a conversion circuit 2 for converting the number of data strings, a first data conversion circuit 3, a second data conversion circuit 4, a parallel-to-serial conversion circuit 5, a multi-level modulation unit 6 and an output terminal 7.

The first data conversion circuit 3 and the second data conversion circuit 4 receive an input data signals 21, which is made up by 3p+1 strings, and which is output from the data string number conversion circuit 2, to convert the received signal.

The first data conversion circuit 3 is responsive to the value of the 3p+1 strings input data signal 21 to output a signal of (p+1) strings indicating $(11/8) \times 2^p$ values.

The second data conversion circuit 4 receives the output signal from the first data conversion circuit 3 and refers to the value of the input signal 21 to output three (p+1) strings of signals 41, 42, and 43.

If the first data conversion circuit 3 outputs a value from 1 to $8 \times 2^{(p-3)}$, the second data conversion circuit 4 sets this value as a first output signal 41, while outputting signals indicating predetermined $(11/8) \times 2^p$ and $(10/8) \times 2^p$ kinds of values as second and third output signals 42 and 43, respectively.

If the first data conversion circuit 3 outputs a value from $1+8 \times 2^{(p-2)}$ to $8 \times 2^{(p-2)} + 3 \times 2^{(p-2)}$, the second data conversion circuit 4 sets this value as a first output signal 41, while outputting signals indicating predetermined $(8/8) \times 2^p$ and $(8/8) \times 2^p$ kinds of values as second and third output signals 42 and 43, respectively.

The parallel-to-serial conversion circuit 5 is supplied with the first to third output signals 41 to 43 from the second data conversion circuit 4 and time-division multiplexes these signals to output (p+1) strings of a multiplexed signal 51.

The multi-level modulation unit 6 multi-level modulates the multiplexed signal 51 to output the modulated signal to the output terminal 7.

Figure 2:
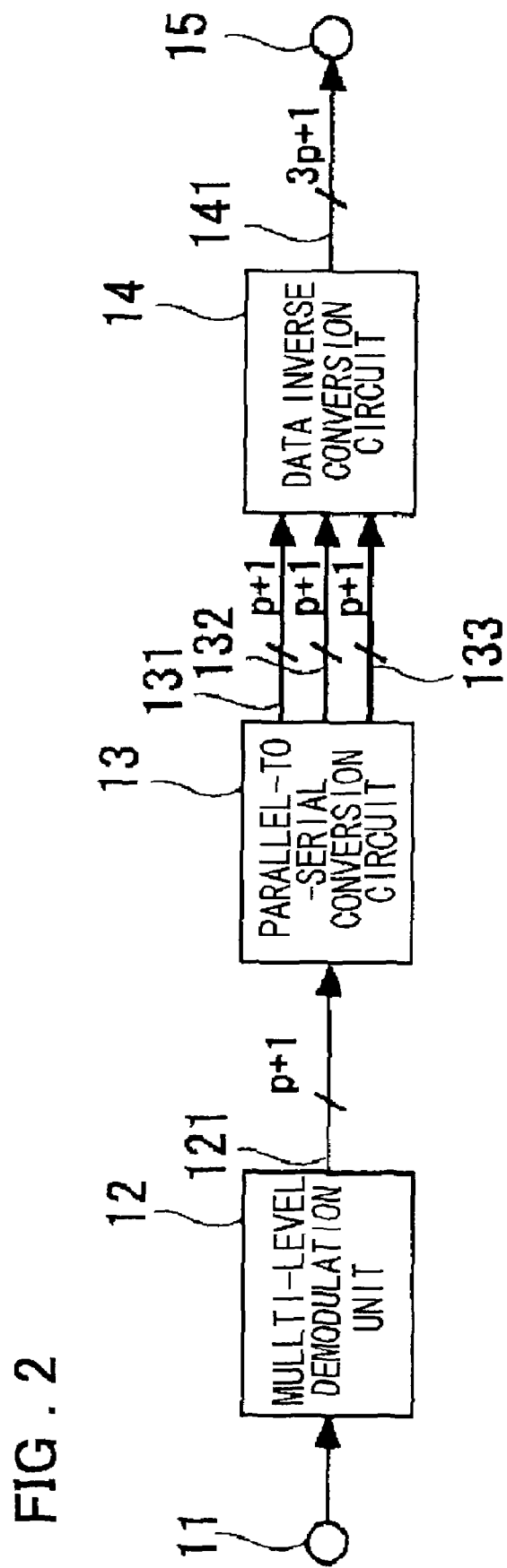
FIG. 2 shows the structure of a multi-level demodulation apparatus according this embodiment.

FIG. 2 shows the structure of a multi-level demodulating apparatus for executing the operation of receiving signals output from the multi-level modulation apparatus of FIG. 1 (communication signals) to demodulate the signals. Referring to FIG. 2, the multi-level demodulating apparatus of the present embodiment includes an input terminal 11, a multi-level demodulating unit 12, a serial-to-parallel conversion circuit 13, a data inverse-conversion circuit 14, and an output terminal 15.

The multi-level demodulating unit 12 demodulates a communication signal, supplied to the input terminal 11, to output a received demodulated data signal of (p+1) strings 121.

The serial-to-parallel conversion circuit 13 time-division demultiplexes the received demodulated data string signal 121 to output first to third demodulated data string signals 131 to 133, each being mad up of (p+1) strings.

The data inverse-conversion circuit 14 is supplied with the first to third demodulated data string signals 131 to 133 to output a demodulated data signal of (3p+1) strings 141.

If the first demodulated data string signals take on the values from 1 to $8 \times 2^{(p-3)}$, the data inverse-conversion circuit 14 receives signals indicating predetermined $(11/8) \times 2^p$ and $(10/8) \times 2^p$ kinds of values, as second and third demodulated data string signals, respectively.

If the first demodulated data string signals take on values of $1+8 \times 2^{(p-2)}$ to $8 \times 2^{(p-2)}+3 \times 2^{(p-2)}$, the data inverse-conversion circuit 14 receives signals indicating predetermined $(8/8) \times 2^p$ kinds of values and signals indicating $(6/8) \times 2^p$ values, as the second and third demodulated data string signals, respectively.

Based on the values specified by the first to third demodulated data string signals 131 to 133, the data inverse-conversion circuit 14 generates a predetermined demodulated data value and output the demodulated data value as a demodulated data signal of (3p+2) strings.

A multi-level modulation/demodulation communication system according to the present invention is made up by the multi-level modulation apparatus, shown in FIG. 1, and te multi-level demodulation apparatus, shown in FIG. 2.

Referring to the drawings, the operation of the multi-level modulation apparatus and the multi-level demodulation apparatus, shown in FIGS. 1 and 2, respectively, is now explained in detail.

Figure 3:
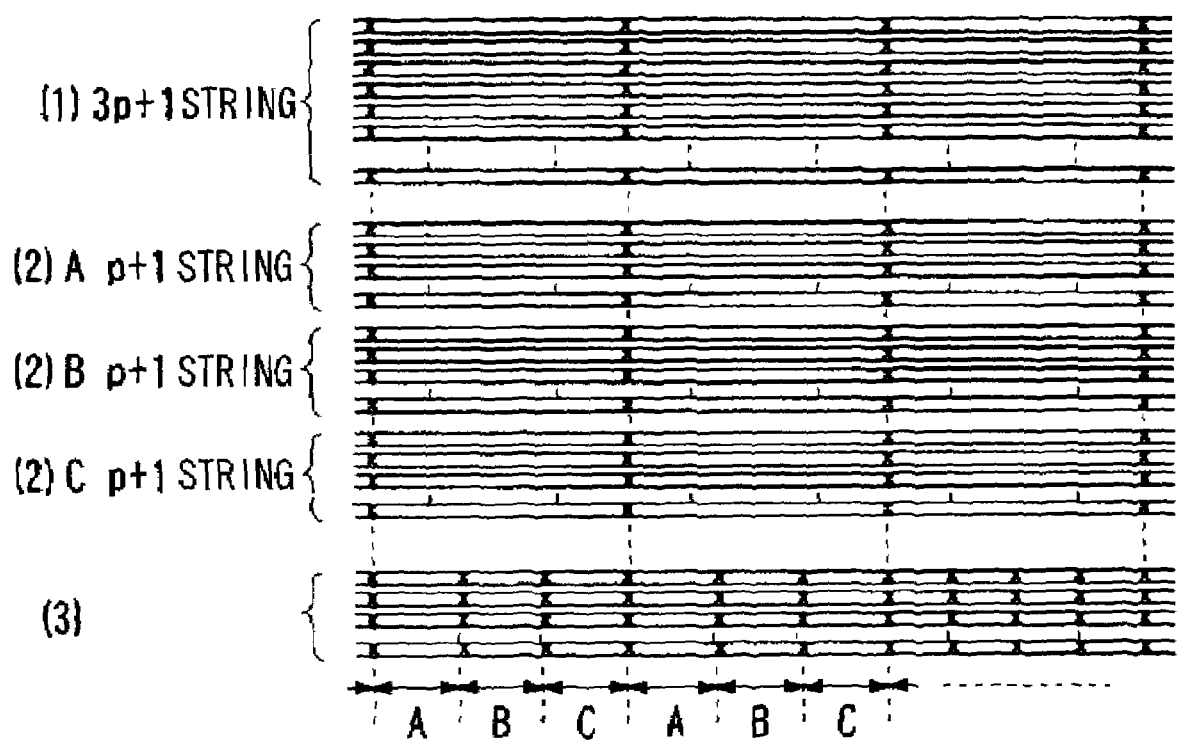
FIG. 3 is a timing chart for illustrating signal conversion in various portions of the multi-level modulation apparatus according to the embodiment.

FIG. 3 shows a timing chart illustrating signal conversion in respective portions in the multi-level modulation apparatus according to the present embodiment. FIG. 3(1) shows an input data signal 21 of FIG. 1. The abscissa of FIG. 3 is a time axis, indicating that the input data signal 21 is changed every preset time interval. FIGS. 3(2)A, (2)B and (2)C depict first to third output signals 41 to 43 output by the second data conversion circuit 4 of FIG. 1. FIG. 3(3) shows the multiplexed signal 51, output by the parallel-to-serial conversion circuit 5 of FIG. 1. FIG. 3(3) shows the manner in which the signals of FIGS. 3(2)A, (2)B and (2)C are time-division multiplexed, with the signal of (2)A being output during the period of (3)A, the signal of (2)B being output during the period of (3)B and with the signal of (2)C being output during the period of (3)C.

FIG. 4 shows the correspondence between the values of input data signal of 3p+1 strings (binary signals) (the column of "number of the input signal" of FIG. 4) and the values of the signals output at the output terminal 7 (the column of "the values the modulation symbols may take on" of FIG. 4) for an exemplary case of p=4 (with the input data signal 21 being 13 strings, that is of a 13-bit configuration). Meanwhile, FIG. 4 shows an example of data conversion by a data conversion table (not shown) in the first and second data conversion circuits 3 and 4 in the present embodiment.

Referring to FIG. 4, the first one of three modulation symbols takes on a value from 1 to 22. When the value of the first modulation symbol is from 1 to 16, the second and third modulation symbols take on values from 1 to 22 and from 1 to 20, whereas, when the value of the first modulation symbol is from 17 to 22, the second and third modulation symbols take on values from 1 to 16 and from 1 to 12, respectively.

It is noted that the signals that may be expressed by the three modulation symbols are as indicated by the following equation (2):

$$16 \times 22 \times 20 + 6 \times 16 \times 12 = 8192 (=2^{13}) \quad (2)$$

In the above equation (2), 16 of $16 \times 22 \times 20$ of the first term of the left side indicates that the first modulation symbol takes on the values of from 1 to 16, while $22 \times 20$ indicates that the second and third modulation symbols take on the values of from 1 to 22 and 1 to 20 for each of 1 to 16 of the values of the first symbol, respectively.

In the above equation (2), 6 of $6 \times 16 \times 12$ of the second term of the left side indicates that the first modulation symbol takes on the values of from 17 to 22, while $16 \times 12$ indicates that the second and third modulation symbols take on the values of from 1 to 16 and 1 to 12, for each of 17 to 22 of the values of the first modulation symbol, respectively.

Since the correspondence between the input data signals 21 and the values of the first to third modulation symbols can be determined uniquely, in this manner, each of the first and second data conversion circuits 3, 4 can be implemented by a configuration in which a preset data table is stored in a ROM (read-only memory). Although FIG. 4 shows the case of p=4, the present invention is valid for p as an integer not less than 3, and hence the present invention is not limited to a case of p=4.

Figure 5:
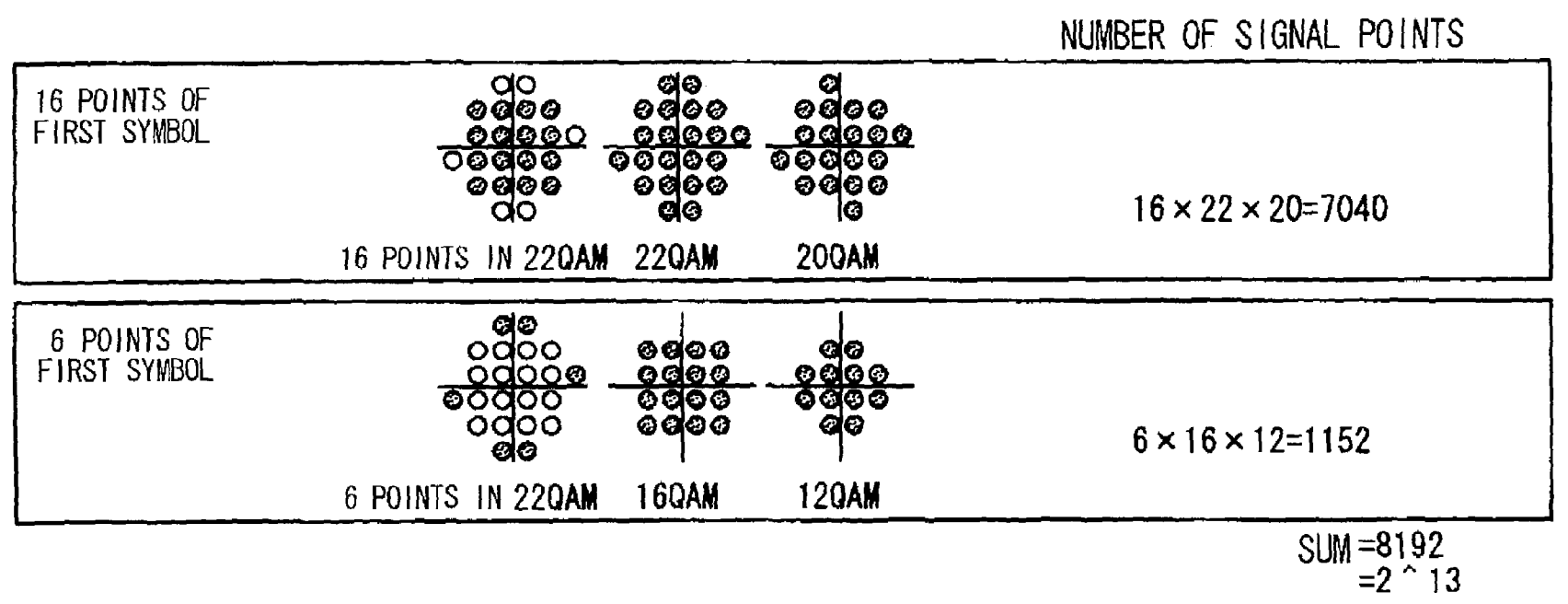

FIG. 5 depicts a signal diagram in which the first to third modulation symbols of the modulated signals output by the multi-level modulation unit 6 are represented as a so-called constellation (signal arraying points of the digital modulated wave) on the phase plane. In FIG. 5, the coordinate points that can be taken on by the first to third symbols, in the first to third terms of the left side of the above equation (2), are indicated by black dots. That is, "16 points of the first symbol" of FIG. 5 indicate, beginning from the left end, the coordinate points that can be assumed by the first to third symbols in the first term of the left side of the above equation (2), by black dots (dots confined within circles). Similarly, the "six dots of the first symbol" indicate, beginning from the left end, the coordinate points that can be assumed by the first to third symbols, in the second term of the left side of the above equation (2), by black dots.

Another embodiment of the present invention is now explained. The present invention shows a method for construction in a generalized form that can be worked out for an integer p not less than 3. As an instance of application, FIG. 6, specifies parameter values for the respective modulation systems for p=3 to 7, that is for 11QAM, 22QAM, 44QAM, 88QAM and 176QAM.

FIG. 6 shows the n-ary numbers of the first to third symbols and the numbers of repetition thereof. For example, if it is desired to have communication at a transmission rate 155 [M symbols/sec], that is mega (one million) symbols/sec, but there is only the frequency bandwidth equivalent to 36 [M symbols/sec] (mega (one million) symbols/sec), bandwidth redundancy becomes significant with 32QAM with the frequency bandwidth of 31 [M symbols/sec]. On the other hand, with 16QAM, with the frequency bandwidth of 38.7 [M symbols/sec], the bandwidth is in shortage.

If, in such case, the 22QAM shown in FIG. 6 is applied, the modulation rate of 35.769 [M symbols/sec] may be obtained, thus assuring transmission with a satisfactory bandwidth utilization efficiency.

In the conventional 16QAM, 20.9 dB of the required C/N (carrier to noise ratio) is retained to be necessary for achieving the symbol error rate of $1 \times 10^{-6}$ in order to realize the code error rate of $10^{-6}$. On the other hand, the required C/N in case of using the 11QAM of the present invention is 19.0 dB. That is, with the present invention, transmission may meritoriously be achieved with the same quality as that with the conventional 16QAM, even if the transmission power is diminished by 1.9 dB. Thus, the power may be exploited more effectively.

Moreover, in general, the required C/N for achieving the symbol error rate of 1×10⁻⁶ with the 16QAM, 32QAM, 64QAM, 128QAM and 256QAM is 20.9 dB, 23.9 dB, 27.2 dB, 30.1 dB and 33.3 dB, respectively. On the other hand, the required C/N for the cases of using the 11QAM, 22QAM, 44QAM, 88QAM and 176QAM according to the present invention is 19.0 dB, 22.1 dB, 25.0 dB, 28.1 dB and 31.1 dB, thus improved by approximately 2 dB, even though the transmission bandwidth is increased.

Figure 7:
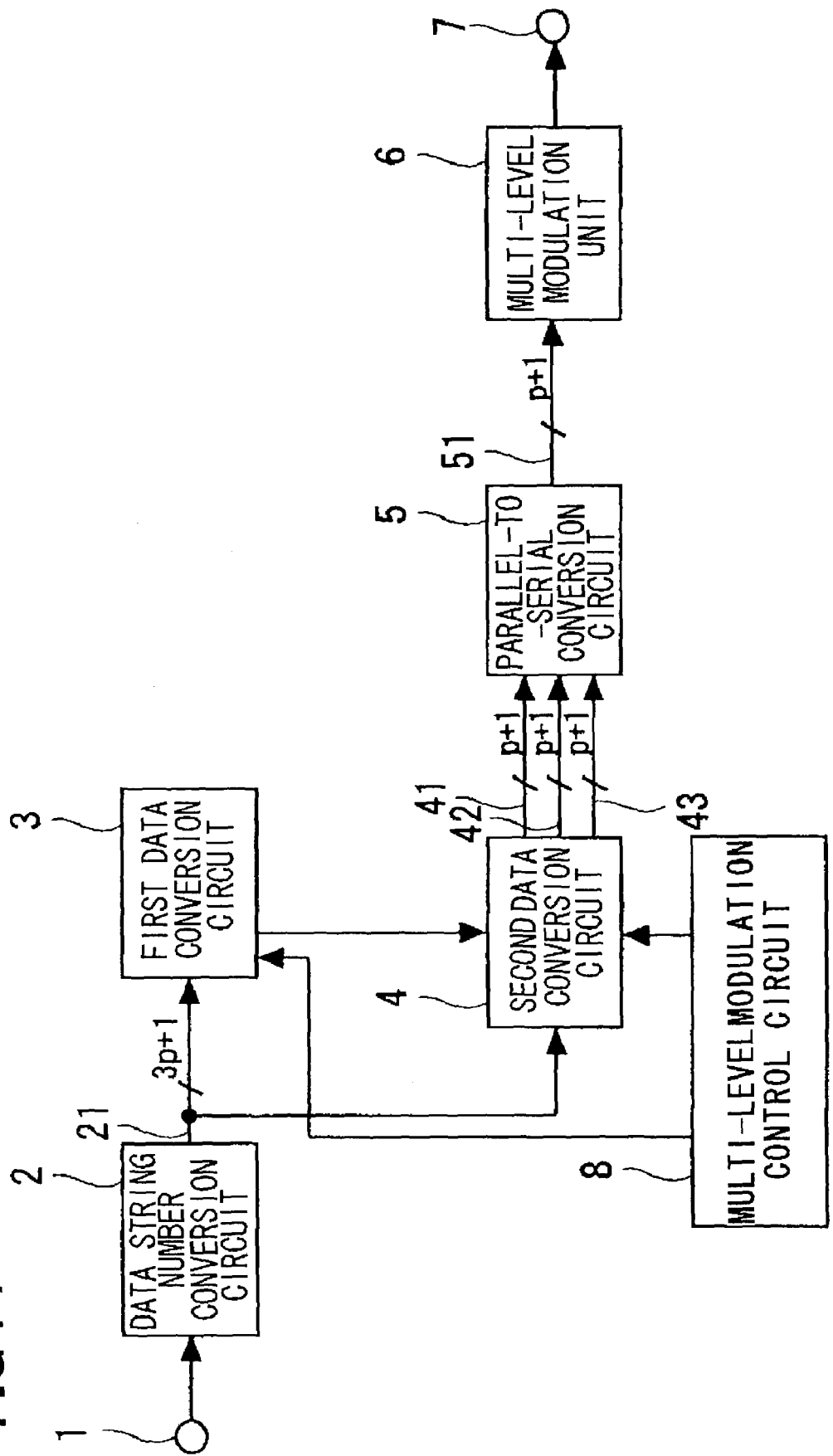
FIG. 7 illustrates the structure of a multi-level modulation apparatus according to another modification.

A further embodiment of the present invention is now explained. FIG. 7 shows the structure of this further embodiment. In this figure, the same elements as those shown in FIG. 1 are denoted by the same reference numerals. In this embodiment, the multi-level modulation apparatus and the multi-level demodulation apparatus are provided with controlling means, while data conversion tables in the multi-level modulation apparatus and the multi-level demodulation apparatus are formed by RAM (random access memory) devices. The data conversion tables stored in the RAM device may be changed by controlling means. By changing the data conversion tables of the multi-level modulation apparatus and the multi-level demodulation apparatus (provided within the data conversion circuit and in the data inverse-conversion circuit) correlatively with each other, it becomes possible to change the relationship between the values of the data transmitted or received and the communication signals (coordinate points on the constellation). This structure helps improve the confidential character of the data transmitted or received as well as to improve the reliability of the communication system.

Referring to FIG. 7, the multi-level modulation apparatus of the present embodiment is composed of the multi-level modulation apparatus of FIG. 1 added by multi-level modulation controlling means 8. This multi-level modulation controlling means 8 controls the first data conversion circuit 3 and the second data conversion circuit 4 to change the data conversion tables, not shown, provided to these circuits.

Figure 8:
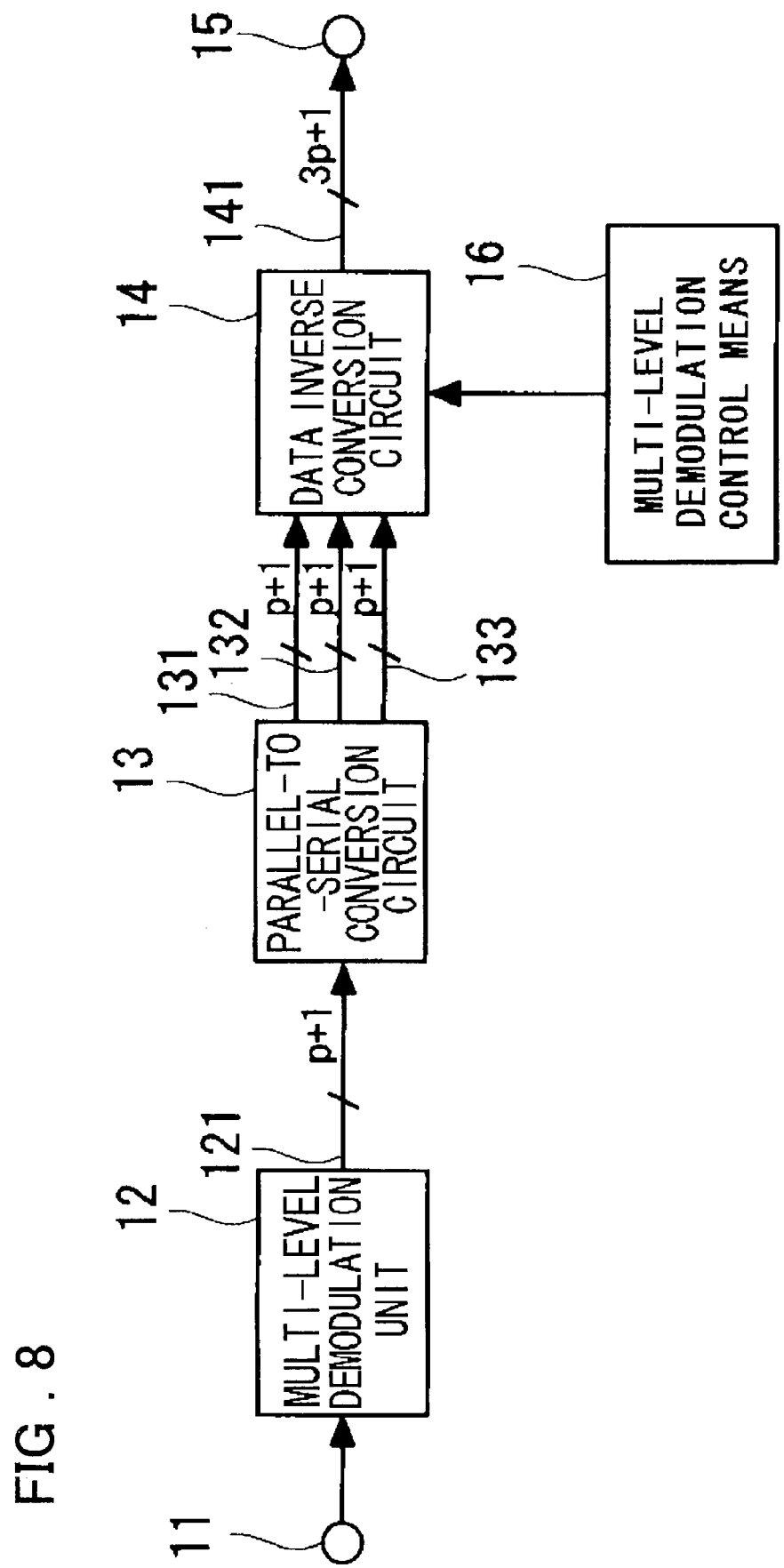
FIG. 8 illustrates the structure of a multi-level demodulation apparatus according to still another modification.

FIG. 8 shows the structure of the multi-level demodulation apparatus of the present modification. In FIG. 8, the same elements as those shown in FIG. 2 are depicted by the same reference numerals. Referring to FIG. 8, the multi-level modulation apparatus of the present embodiment is composed of the multi-level modulation apparatus of FIG. 2 added by multi-level modulation controlling means 16. This multi-level modulation controlling means 16 controls data inverse-conversion circuit 14 to change the inverse data conversion tables, not shown, provided to this conversion circuit 14.

The multi-level modulation/demodulation communication system of the present invention may also be provided with the multi-level modulation apparatus shown in FIG. 7 and with the multi-level demodulation apparatus shown in FIG. 8.

The first data conversion circuit 3 and the second data conversion circuit 4 of FIG. 7 may be constituted as an input/output device for the multi-level modulation controlling means 8, such that data conversion processing by the first data conversion circuit 3 and by the second data conversion circuit 4 is carried out by a computer of the multi-level modulation controlling means 8. In this case, the control program of the multi-level modulation controlling means 8 is designed to perform the processing for substituting the data conversion circuits 3 and 4.

Figure 9:
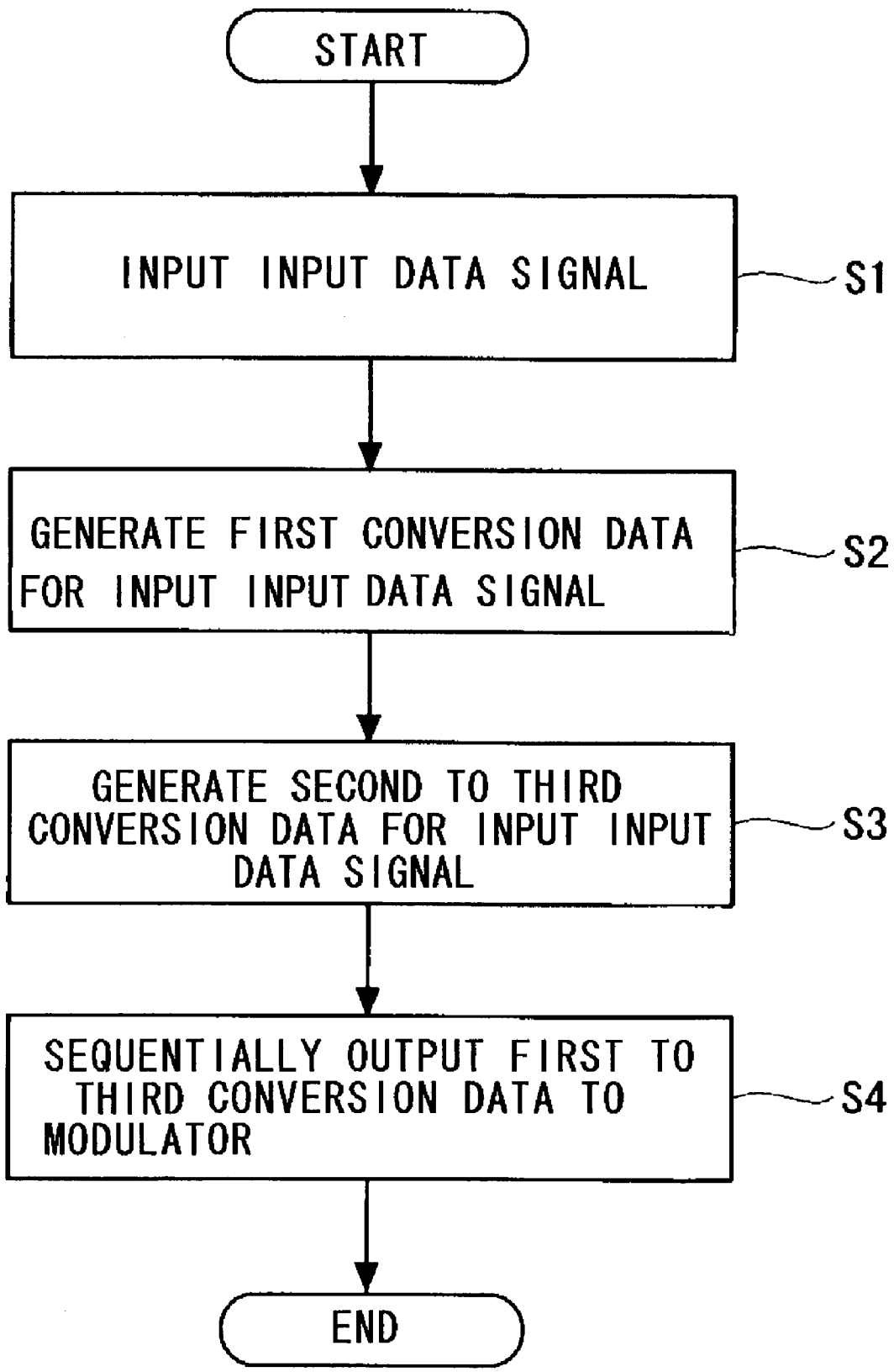
FIG. 9 is a flow diagram showing an example of a processing sequence of a program to be executed by a computer forming multi-level modulation controlling means of a multi-level modulation apparatus according to still another modification.

FIG. 9 depicts a flowchart of a program to be executed by a computer of the multi-level modulation controlling means 8. In a step S1, the input data signal 21 is input to the multi-level modulation controlling means 8. In the next step S2, first conversion data corresponding to the values of the input data signal 21 is generated.

In the next step S3, second and third conversion data are generated. These conversion data may for example be constituted as shown for example in FIG. 4.

In the next step S4, the first to third conversion data are sequentially output to the multi-level modulation unit 6.

Although FIG. 9 shows the processing for converting one input data, the input data signals are supplied sequentially, as indicated by the timing chart of FIG. 3. By iteratively performing the processing, shown in the flowchart of FIG. 9, as the input data signal is sequentially input, modulated signals may be sequentially transmitted in a controlled fashion.

In similar manner, the data inverse-conversion circuit 14 of FIG. 8 may be formed as an input/output device of the multi-level demodulation controlling means 16, such that the inverse conversion function of the data inverse-conversion circuit 14 is implemented by a computer forming the multi-level demodulation controlling means 16. In this case, the control program of the multi-level demodulation controlling means 16 is designed such as to take charge of the function of the data inverse-conversion circuit 14.

Figure 10:
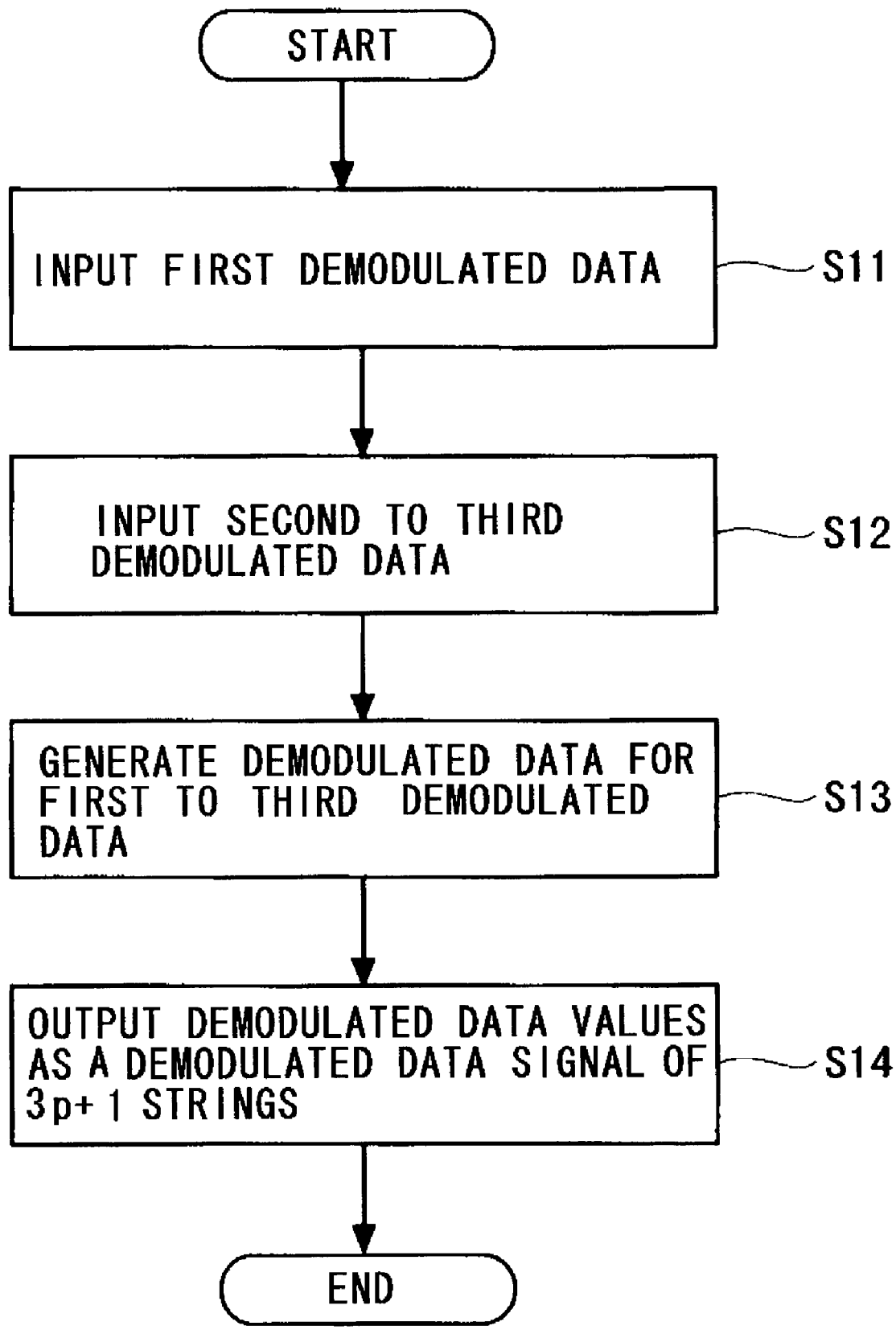
FIG. 10 is a flow diagram showing an example of a processing sequence of a program to be executed by a computer forming multi-level demodulation controlling means of a multi-level demodulation apparatus according to yet another modification.

FIG. 10 depicts a flowchart of a program to be executed by the computer of the multi-level demodulation controlling means 16. In a step S11, first demodulated data is input. In the next step S12, second and third modulated data are input.

In the next step S13, demodulated data values, corresponding to the first to third demodulated data, are generated. These demodulated data may be formed by preparing an inverse conversion table in accordance with the instance shown in FIG. 4.

In the next step S14, demodulated data values are output as (3p+2) strings of a demodulated data signal. In FIG. 10, the processing for inputting a set of the demodulated data for back conversion is shown. However, it is of course possible to manage control in such a fashion that, by iteratively performing the processing, shown in the flowchart of FIG. 10, as the demodulated data signal is sequentially input, demodulated signals may be sequentially output in a controlled manner.

In FIGS. 1 and 7, referred to in the explanation of the above embodiments, there is shown a structure in which the first and second data conversion circuits 3, 4 are designed as two circuit blocks. However, it is of course possible to construct these data conversion circuits as a single circuit. Although certain preferred embodiments of the present invention have been described in the above-described embodiments, the present invention is not to be limited to these particular embodiments and may include various modifications or corrections as may be worked out by those ordinarily skilled in the art within the scope of the appended claims.

The meritorious effects of the present invention are summarized as follows.

According to the present invention, as described above, (3p+1) strings of input data are allocated to three modulation symbols, which are then multiplexed in the time domain to a single modulation symbol to transmit (p+1/3) strings of binary data, so that the n-ary number of the QAM system may approximately be $2^{(p+1/3)}$. Thus, in such a case where there is allowance in the frequency bandwidth with $2^n$QAM but the required frequency bandwidth is exceeded with $2^{(n-1)}$QAM, it is possible to provide a modulation system which represents a compromise between the two QAM systems.

As a consequence, not only the frequency may be utilized effectively, but also the $2^{(n-2/3)}$QAM may be realized with the required signal to noise ratio which is smaller than is possible with the $2^n$QAM, thus assuring effective power utilization.

Moreover, the present invention provides a constructing method in a generalized form with an optional integer not less than 3 and hence may be applied to a number of QAM modulation systems, in addition to 11QAM, 22QAM, 44QAM, 88QAM or 176QAM systems.

Another embodiment of the present invention is hereinafter explained. According to the embodiment of the present invention, a multi-level modulating/demodulating method for allocating (3p+2) strings of an input signal to three modulation symbol, where p is an integer not less than 2, wherein the first modulation symbol uses $(7/4)\times 2^p$ signal points. If the first modulation symbol takes 1 to $4\times 2^{(p-3)}$ signal points, $(7/4)\times 2^p$ signal points, predetermined in association with the input signal, are used as the second and third modulation symbol. If the first modulation symbol takes $1+4\times 2^{(p-2)}$ to $4\times 2^{(p-2)}+2\times 2^{(p-2)}$ signal points, $(7/4)\times 2^p$ values and $1\times 2^p$ signal points, predetermined in association with the input signal, are used as the second and third modulation symbols, respectively, whereas, if the first modulation symbol takes $1+4\times 2^{(p-2)}+2\times 2^{(p-2)}$ to $4\times 2^{(p-2)}+2\times 2^{(p-2)}+1\times 2^{(p-2)}$ signal points, $1\times 2^p$ values and $(1/4)\times 2^p$ signal points, predetermined in association with the input signal, are used as the second and third modulation symbols, respectively.

A modulation apparatus according to the present embodiment comprises converting means supplied with an input signal that takes on a value from 1 to a (3p+2) power of 2, where p is an integer not less than 2, to generate and output first to third converted data based on the input signal, and means supplied with the first to third converted data to effect multi-level modulation thereon to output the resulting data. The converting means classifies the input signal, depending on its values, into three predetermined groups not having common elements. The converter means includes converting means operating such that, when the input signal belongs to the first group, the first converted data takes on a value form 1 to $4\times 2^{(p-2)}$, depending on the value of the input signals, the second and third converted data taking on $(7/4)\times 2^p$ and $(7/4)\times 2^p$ values, allocated depending on the value of the input signal, respectively. When the input signal belongs to the second group, the first converted data takes on a value from $1+4\times 2^{(p-2)}$ to $4\times 2(p-2)+2\times 2^{(p-2)}$, depending on the value of the input signals, the second and third converted data taking on $(7/4)\times 2^p$ and $1\times 2^p$ values, allocated depending on the value of the input signal, respectively, whereas, when the input signal belongs to the third group, the first converted data takes on a value from $1+4\times 2^{(p-2)}+2\times 2^{(p-2)}$ to $4\times 2^{(p-2)}+2\times 2^{(p-2)}+1\times 2^{(p-2)}$, depending on the value of the input signals, the second and third converted data taking on $(1/2)\times 2^p$ and $(1/4)\times 2^p$ values, allocated depending on the value of the input signal, respectively.

The operating principle of modulation of the second embodiment of the present invention is that, with p being an integer not less than 2, we have the following equation (3):

$$2^{(3p+2)} = \{(7/4\times 2^p)\times\{(7/4)\times 2^p\}\times\{4\times 2^{(p-2)}\} + \qquad (3)$$
$$\{(7/4)\times 2^p\}\times\{(1\times 2^p)\times\{2\times 2^{(p-2)}\} +$$
$$\{1\times 2^p\}\times\{(1/4)\times 2^p\}\times\{1\times 2^{(p-2)}\}.$$

The first term of the right side of the equation (3) indicates that, in the $(7/4)\times 2^p$ QAM of the first signal, $4\times 2^{(p-2)}$ number of times, the second and third signals are $(7/4)\times 2^p$QAM and $(7/4)\times 2^p$QAM, respectively.

The second term of the right side of the equation (3) indicates that $2\times 2^{(p-2)}$ number of times are the second and third signals $(7/4)\times 2^p$QAM and $1\times 2^p$QAM, respectively.

The third term of the right side of the equation (3) indicates that $1\times 2^{(p-2)}$ number of times, as to the second and third signals, $1\times 2^p$QAM and $(1/4)\times 2^p$QAM are to be executed, respectively. Of course, the total number of the first signals is $(7/4)\times 2^p$.

Meanwhile, it is possible that the third term of the right side of the equation (3) is made to be $\{(1/2)\times 2^p\}\times\{(1/2)\times 2^p\}\times\{1\times 2^{(p-2)}\}$, which indicates that as to the second and third signals, $1\times 2^{(p-2)}$ number of times, $(1/2)$QAM$\times 2^p$QAM and $(1/2)\times 2^p$QAM, are executed respectively.

In the above equation (3), the total number of the first signals is $(7/4)\times 2^p$.

That is, the operation in which (p+2/3) bits are allocated to one modulation symbol is executed. From this, it may be seen that the n-ary number in the QAM system may be set to approximately $2^{(n+2/3)}$.

Figure 11:
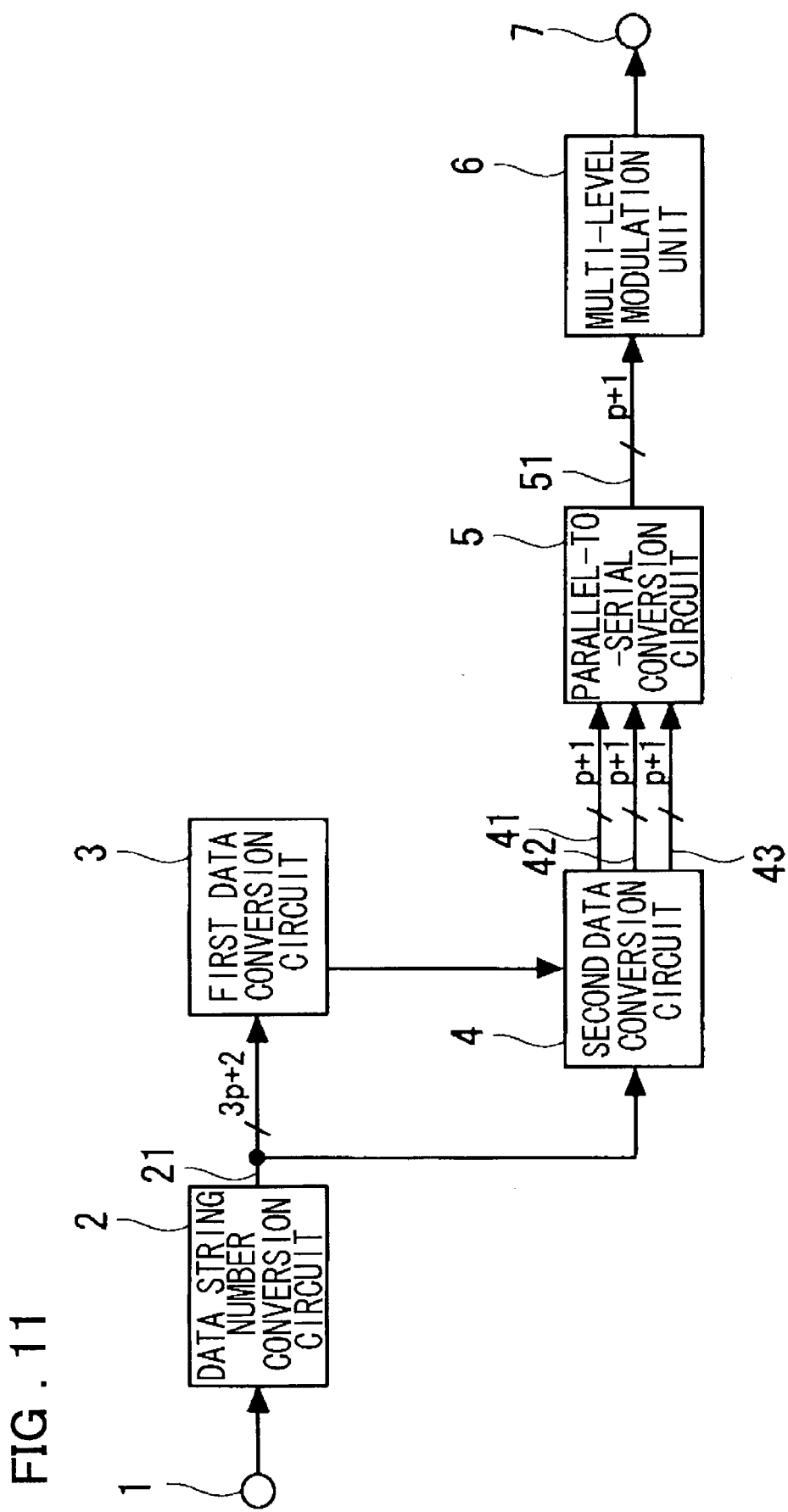
FIG. 11 shows the structure of a multi-level modulation apparatus according to an embodiment of the present invention.

FIG. 11 is a diagram showing the configuration of a multi-level modulation apparatus according to the present embodiment is the same shown in FIG. 11. Referring to FIG. 11, a multi-level modulation apparatus of the present embodiment includes an input terminal 1, a conversion circuit 2 for converting the number of data strings, a first data conversion circuit 3, a second data conversion circuit 4, a parallel-to-serial conversion circuit 5, a multi-level modulation unit 6 and an output terminal 7.

The first data conversion circuit 3 and the second data conversion circuit 4 receive an input data signal 21 which is made up by 3p+2 strings, and which is output from the data string number conversion circuit 2, to output converted signals.

The first data conversion circuit 3 is responsive to the value of the input data signal 21 to output a signal of (p+1) strings indicating $(7/4)\times 2^p$ values.

The second data conversion circuit 4 receives the output signal from the first data conversion circuit 3 and refers to the value of the input signal 21 to output three set of signals 41, 42, and 43, each being p+1 strings.

If the first data conversion circuit 3 outputs a value from 1 to $4\times 2^{(p-2)}$ the second data conversion circuit 4 sets this value as a first output signal 41, while outputting signals indicating predetermined $(7/4)\times 2^p$ kinds of values as second and third output signals 42 and 43.

If the first data conversion circuit 3 outputs a value from $1+4\times 2^{(p-2)}$ to $4\times 2^{(p-2)}+2\times 2^{(p-2)}$, the second data conversion circuit 4 sets this value as a first output signal 41, while outputting signals indicating predetermined $(7/4)\times 2^p$ kinds of values and signals indicating predetermined $1\times 2^p$ values, as second and third output signals 42, 43, respectively.

If the first data conversion circuit 3 outputs a value from $1+4\times 2^{(p-2)}+2\times 2^{(p-2)}$ to $4\times 2^{(p-2)}+2\times 2^{(p-2)}+1\times 2^{(p-2)}$, the second data conversion circuit 4 sets this value as a first output signal 41, while outputting signals indicating predetermined $1\times 2^p$ kinds of values and signals indicating predetermined $(1\times 4)\times 2^p$ kinds of values, as the second and third output symbols 42 and 43, respectively. Meanwhile, when the first data conversion circuit 3 outputs a value from $1+4\times 2^{(p-2)}+2\times 2^{(p-2)}$ to $4\times 2^{(p-2)}+2\times 2^{(p-2)}+1\times 2^{(p-2)}$, the second data conversion circuit 4 may set this value as a first output signal 41 and outputs signals indicating predetermined $(1/2)\times 2^p$ kinds of values and signals indicating predetermined $(1/2)\times 2^p$ kinds of values as second and third output signals 42 and 43, respectively.

The parallel-to-serial conversion circuit 5 is supplied with the first to third output signals 41 to 43 from the second data conversion circuit 4 and time-division multiplexes these signals to output (p+1) strings of a multiplexed signal 51.

The multi-level modulation unit 6 performs multi-level modulation of the multiplexed signals 51 to deliver the modulated signals to the output terminal 7.

Figure 12:
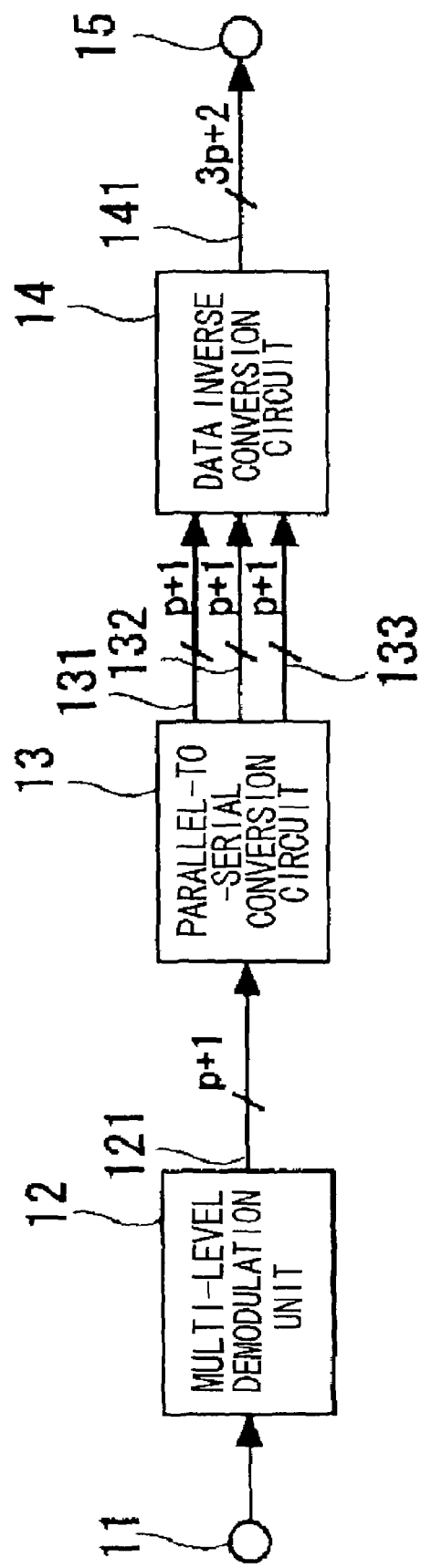
FIG. 12 shows the structure of a multi-level demodulation apparatus according this embodiment.

FIG. 12 shows the structure of a multi-level demodulating apparatus for executing the operation of receiving signals output from the multi-level modulation apparatus of FIG. 11 (communication signals) to demodulate the signals. Referring to FIG. 12, the multi-level demodulating apparatus of the present embodiment includes an input terminal 11, a multi-level demodulating unit 12, a serial-to-parallel conversion circuit 13, a data inverse-conversion circuit 14, and an output terminal 15.

The multi-level demodulating unit 12 demodulates a communication signal, supplied to the input terminal 11, to output a received demodulated data string signal of (p+1) strings 121. The serial-to-parallel conversion circuit 13 time-division demultiplexes the received demodulated data string signal 121 to output first to third demodulated data string signals 131 to 133, each being (p+1) strings. The data inverse-conversion circuit 14 is supplied with the first to third demodulated data string signals 131 to 133 to output a demodulated data signal of (3P+2) strings 141.

If the first demodulated data string signals take on the values from 1 to $4\times 2^{(p-2)}$, the data inverse-conversion circuit 14 receives signals indicating predetermined $(7/4)\times 2^p$ values, as second and third demodulated data string signals.

If the first demodulated data string signals take on values of $1+4\times 2^{(p-2)}$ to $4\times 2^{(p-2)}+2\times 2^{(p-2)}$, the data inverse-conversion circuit 14 receives signals indicating predetermined $(7/4)\times 2^p$ kinds of values and signals indicating $1\times 2^p$ kinds of values, as the second and third demodulated data string signals, respectively.

If the first demodulated data string signals take on values from $1+4\times 2^{(p-2)}+2\times 2^{(p-2)}$ to $4\times 2^{(p-2)}+2\times 2^{(p-2)}+1\times 2^{(p-2)}$, the data inverse-conversion circuit 14 receives signals indicating predetermined $1\times 2^p$ kinds of values and signals indicating predetermined $(1/4)\times 2^p$ kinds of values, as the second and third demodulated data string signals, respectively. Meanwhile, if the first demodulated data string signals take on values from $1+4\times 2^{(p-2)}+2\times 2^{(p-2)}$ to $4\times 2^{(p-2)}+2\times 2^{(p-2)}+1\times 2^{(p-2)}$, the data inverse-conversion circuit 14 may receive signals indicating predetermined $(1/2)\times 2^p$ kinds of values and $(1/2)\times 2^p$ kinds of values, as the second and third demodulated data string signals, respectively.

Based on the values specified by the first to third demodulated data string signals 131 to 133, a predetermined demodulated data value is generated and output as a demodulated data signal of (3p+2) strings.

A multi-level modulation/demodulation communication system according to the present invention is made up by the multi-level modulation apparatus, shown in FIG. 11, and the multi-level demodulation apparatus, shown in FIG. 12.

Referring to the drawings, the operation of the multi-level modulation apparatus and the multi-level demodulation apparatus, shown in FIGS. 11 and 12, respectively, is now explained in detail.

Figure 13:
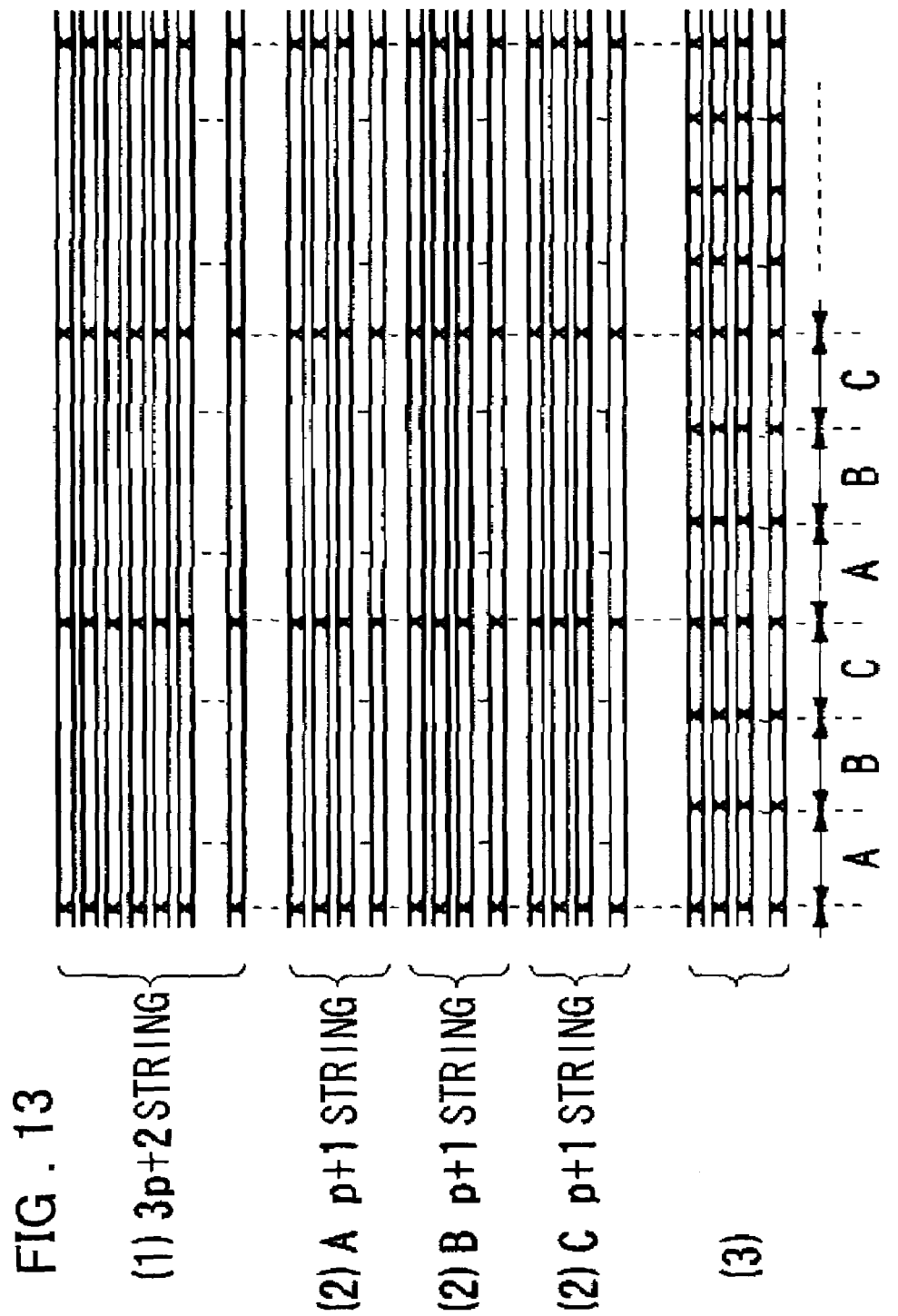
FIG. 13 is a timing chart for illustrating signal conversion in various portions of the multi-level modulation apparatus according to the embodiment.

FIG. 13 shows a timing chart illustrating signal conversion in the respective portions in the multi-level modulation apparatus according to the embodiment of the present invention. FIG. 13(1) shows an input data signal 21 of FIG. 11. The abscissa of FIG. 13 is a time axis, indicating that the input data signal 21 is changed at a preset time interval. FIGS. 13 (2)A, (2)B and (2)C depict first to third output signals 41 to 43 output by the second data conversion circuit 4 of FIG. 11. FIG. 13(3) shows the first to third output signals 41 to 43, output by the second data conversion circuit 4 of FIG. 11, respectively. FIG. 13(3) shows the multiplexed signal 51, output by the parallel-to-serial conversion circuit 5 of FIG. 11. FIG. 13(3) shows the manner in which the signals of FIGS. 13(2)A, (2)B and (2)C are time-division multiplexed, with the signal of (2)A being output during the period of (3)A, the signal of (2)B being output during the period of (3)B and with the signal of (2)C being output during the period of (3)C.

FIG. 14 shows the correspondence between the values of the 3p+2 strings of input data signals (binary signals) (the column of [number of the input signal] of FIG. 14) and the values of the signals output at the output terminal 7 (the column of [the values the modulation symbols may take on] of FIG. 14) for an exemplary case of p–4 (with the input data signal 21 being 14 strings, that is of a 14-bit configuration). Meanwhile, FIG. 14 shows an example of data conversion by a data conversion table (not shown) in the first and second data conversion circuits 3, 4 in the present embodiment.

Referring to FIG. 14, the first one of three modulation symbols takes on a value from 1 to 28. When the value of the first modulation symbol is from 1 to 16, the second and third modulation symbols take on values from 1 to 28.

As long as the value of the first modulation symbol is from 17 to 24, the second and third modulation symbols may take on values from 1 to 28 and values from 1 to 16, respectively.

As long as the value of the first modulation symbol is from 25 to 28, the second and third modulation symbols take on values from 1 to 16 and values from 1 to 4, respectively. Meanwhile, when the value of the first modulation symbol is from 25 to 28, the second and third modulation symbols may take on values from 1 to 8 and values from 1 to 8, respectively.

It is noted that the signals that may be expressed by the three modulation symbols are as indicated by the following equation (4):

$$16\times 28\times 28+8\times 28\times 16+4\times 16\times 4 (\text{or } 4\times 8\times 8)=16384(=2^{14}) \quad (4)$$

In the above equation (4), 16 of $16\times 28\times 28$ of the first term of the left side indicates that the first modulation symbol takes on the values of from 1 to 16, while $28\times 28$ indicates that the second and third modulation symbols take on the values of from 1 to 28 for each of 1 to 16 of the values of the first symbol.

In the above equation (4), 8 of $8\times 28\times 16$ of the second term of the left side indicates that the first modulation symbol takes on the values of from 17 to 24, while $28\times 16$ indicates that the second and third modulation symbols take on the values of from 1 to 28 and 1 to 16, for each of 17 to 24 of the values of the first modulation symbol, respectively.

In the above equation (4), 4 of $4\times 16\times 4$ of the third term of the left side indicates that the first modulation symbol takes on the values of from 25 to 28, while $16\times 4$ indicates that the second and third modulation symbols take on the values of from 1 to 16 and 1 to 4 for each of 25 to 28 of the values of the first modulation symbol, respectively.

Since the correspondence between the input data signals 21 and the values of the first to third modulation symbols can be determined uniquely, in this manner, each of the first and second data conversion circuits 3, 4 can be implemented by a configuration in which a preset data table is stored in a ROM (read-only memory). Although FIG. 14 shows the case of p=4, the present invention is valid for p as an integer not less than 2, and hence the present invention is not limited to a case of p=4.

FIG. 15 depicts a signal diagram in which the first to third modulation symbols of the modulated signals output by the multi-level modulation unit 6 are represented as a so-called constellation (signal arraying points of the digital modulated wave) on the phase plane. In FIG. 15, the coordinate points that can be taken on by the first to third symbols, in the first to third terms of the left side of the above equation (4), are indicated by black dots. That is, "16 points of the first symbol" of FIG. 15 indicate, beginning from the left end, the coordinate points that can be assumed by the first to third symbols in the first term of the left side of the above equation (4), by black dots (dots confined within circles). Similarly, the "eight dots of the first symbol" indicate, beginning from the left end, the coordinate points that can be assumed by the first to third symbols, in the second term of the left side of the above equation (4), by black dots, while the "four dots of the first symbol" indicate, beginning from the left end, the coordinate points that can be assumed by the first to third symbols, in the third term of the left side of the above equation (4) by black dots.

A modified embodiment of the present invention is now explained. The present invention shows a method for construction in a generalized form that can be worked out for an integer p not less than two. As an instance of application, FIG. 16, specifies parameter values for the respective modulation systems for p=2 to 6, that is for 7QAM and 7PSH (phase shift keying), 14QAM, 28QAM, 56QAM and 112QAM, are shown.

FIG. 16 shows the n-ary numbers and the numbers of repetition thereof. For example, if it is desired to have communication at a transmission rate 150 [Mbps], but there is only the frequency bandwidth equivalent to 41 [M symbols/sec] (mega (one million) symbols/sec), bandwidth redundancy becomes significant with 16QAM with the frequency bandwidth of 37.5 [M symbols/sec]. On the other hand, with 8PSK, with the frequency bandwidth of 50.0 [M symbols/sec], the bandwidth is in shortage.

If, in such case, the 14QAM shown in FIG. 16 is applied, the modulation rate of 40.9 [M symbols/sec] may be obtained, thus assuring transmission with a satisfactory bandwidth utilization efficiency.

In the conventional 16QAM, 20.9 dB of the required C/N (carrier to noise ratio) is retained to be necessary for achieving the symbol error rate of $1\times10^{-6}$ in order to realize the code error rate of $10^{-6}$. On the other hand, the required C/N in case of using the 14QAM of the present invention is 20.0 dB. That is, with the present invention, transmission may meritoriously be achieved with the same quality as that with the conventional 16QAM, even if the transmission power is diminished by 0.9 dB, with the result that the power may be exploited more effectively.

Moreover, in general, the required C/N for achieving the symbol error rate of $1\times10^{-6}$ for satisfying the symbol error rate of $1\times10^{-6}$ with the 16QAM, 32QAM, 64QAM and 128QAM is 20.9 dB, 23.9 dB, 27.2 dB and 30.1 dB, respectively.

On the other hand, the required C/N for the cases of using the 14QAM, 28QAM, 56QAM and 112QAM according to the present invention is 20.0 dB, 23.0 dB, 26.0 dB and 29.1 dB, thus improved by approximately 1 dB, even though the transmission bandwidth is increased.

Figure 17:
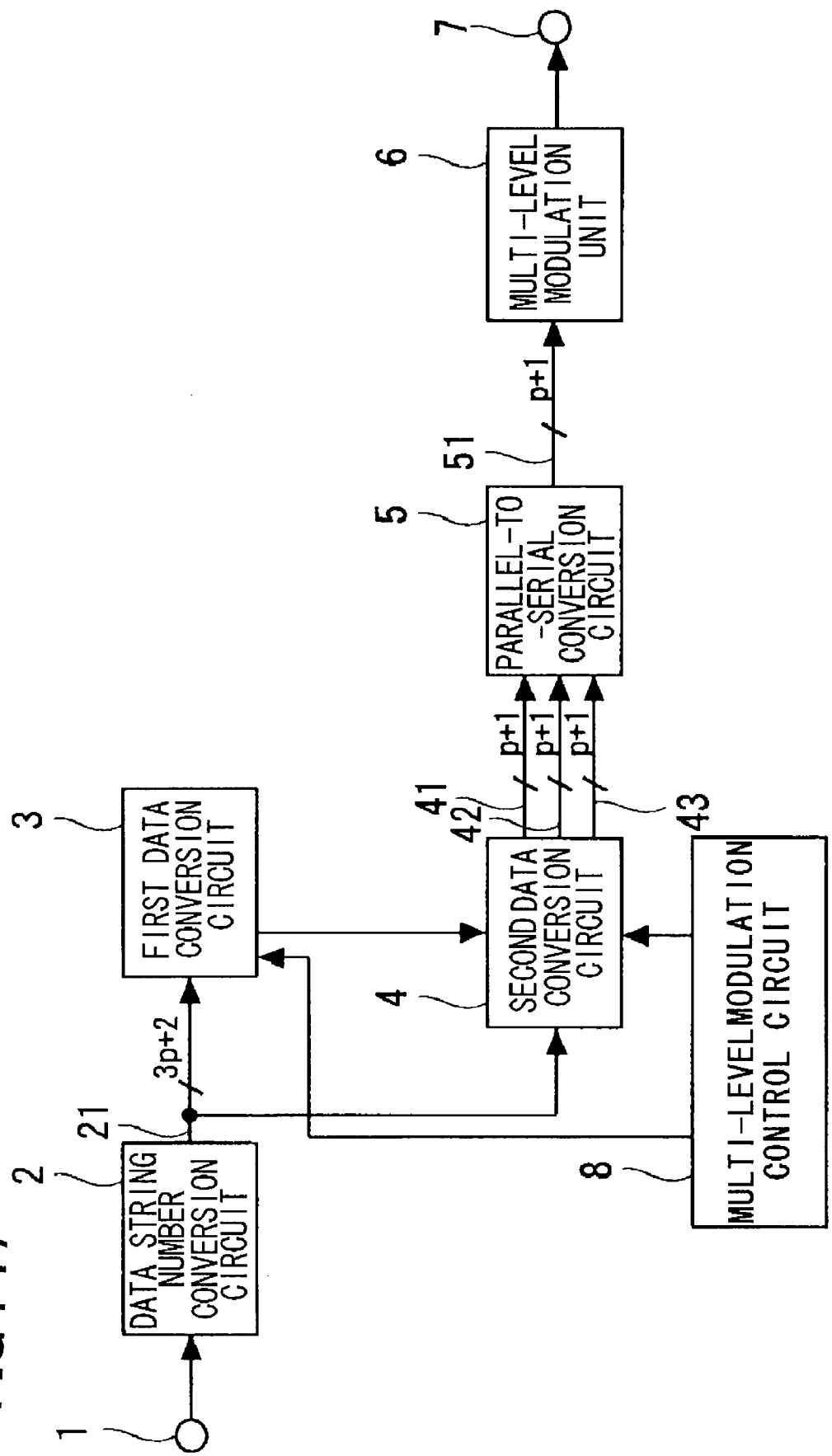
FIG. 17 illustrates the structure of a multi-level modulation apparatus according to another modification.

A further embodiment of the present invention is now explained. FIG. 17 shows the structure of this further embodiment. In this figure, the same elements as those shown in FIG. 11 are denoted by the same reference numerals. In this embodiment, the multi-level modulation apparatus and the multi-level demodulation apparatus are provided with controlling means, while data conversion tables in the multi-level modulation apparatus and the multi-level demodulation apparatus are formed by RAM (random access memory) devices. The data conversion tables stored in the RAM device may be changed by controlling means. By changing the data conversion tables of the multi-level modulation apparatus and the multi-level demodulation apparatus (provided within the data conversion circuit and in the data inverse-conversion circuit) correlatively with each other, it becomes possible to change the relationship between the values of the data transmitted or received and the communication signals (coordinate points on the constellation). This structure helps improve the confidential character of the data transmitted or received as well as to improve the reliability of the communication system.

Referring to FIG. 17, the multi-level modulation apparatus of the present embodiment is composed of the multi-level modulation apparatus of FIG. 11 added by multi-level modulation controlling means 8. This multi-level modulation controlling means 8 controls the first data conversion circuit 3 and the second data conversion circuit 4 to change the data conversion tables, not shown, provided to these circuits.

Figure 18:
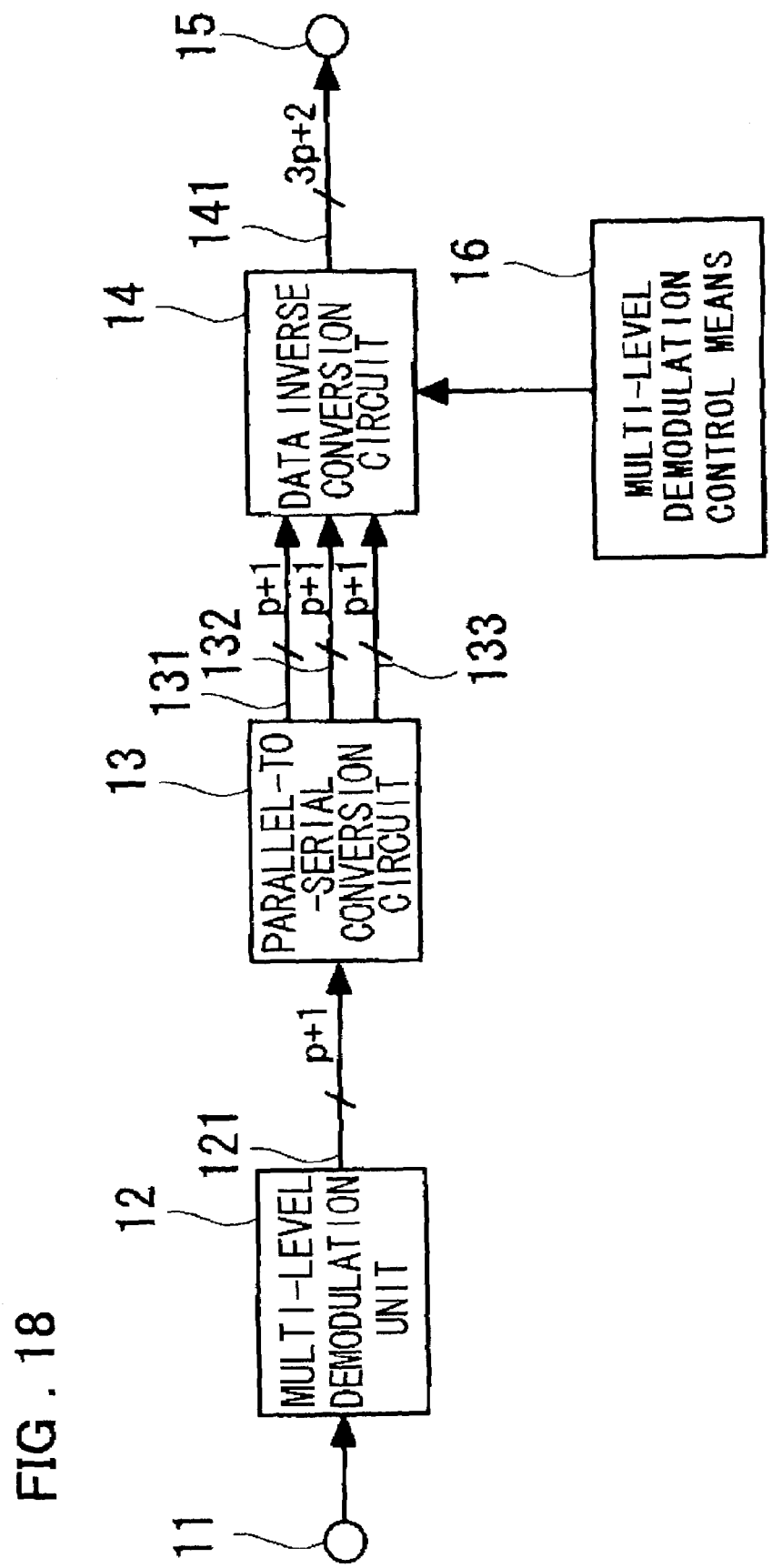
FIG. 18 illustrates the structure of a multi-level demodulation apparatus according to still another modification.

FIG. 18 shows the structure of the multi-level demodulation apparatus of the present modification. In FIG. 18, the same elements as those shown in FIG. 12 are depicted by the same reference numerals. Referring to FIG. 18, the multi-level modulation apparatus of the present embodiment is composed of the multi-level modulation apparatus of FIG. 12 added by multi-level modulation controlling means 16. This multi-level modulation controlling means 16 controls data inverse-conversion circuit 14 to change the inverse data conversion tables, not shown, provided to this conversion circuit 14.

The multi-level modulation/demodulation communication system of the present invention may also be provided with the multi-level modulation apparatus shown in FIG. 17 and with the multi-level demodulation apparatus shown in FIG. 18.

The first data conversion circuit 3 and the second data conversion circuit 4 of FIG. 17 may be constituted as an input/output device for the multi-level modulation controlling means 8, such that data conversion processing by the first data conversion circuit 3 and the second data conversion circuit 4 is carried out by a computer of the multi-level modulation controlling means 8. In this case, the control program of the multi-level modulation controlling means 8 is designed to perform the processing for substituting the data conversion circuits 3 and 4.

FIG. 9 depicts a flowchart of a program to be executed by a computer of the multi-level modulation controlling means 8 shown in FIG. 17.

In a step S1, the input data signal 21 is input to the multi-level modulation controlling means 8. In the next step S2, first conversion data corresponding to the values of the input data signal 21 is generated.

In the next step S3, second and third conversion data are generated. These conversion data may for example be constituted as shown for example in FIG. 14.

In the next step S4, the first to third conversion data are output sequentially to the multi-level modulation unit 6.

Although FIG. 9 shows the processing for converting one input data, the input data signals are supplied sequentially, as indicated by the timing chart of FIG. 13. By iteratively performing the processing, shown in the flowchart of FIG. 9, as the input data signal is sequentially input, modulated signals may be sequentially transmitted in a controlled fashion.

In similar manner, the data inverse-conversion circuit 14 of FIG. 18 may be formed as an input/output device of the multi-level demodulation controlling means 16, such that the inverse conversion function of the data inverse-conversion circuit 14 is implemented by a computer forming the multi-level demodulation controlling means 16. In this case, the control program of the multi-level demodulation controlling means 16 is designed such as to take charge of the function of the data inverse-conversion circuit 14.

Figure 19:
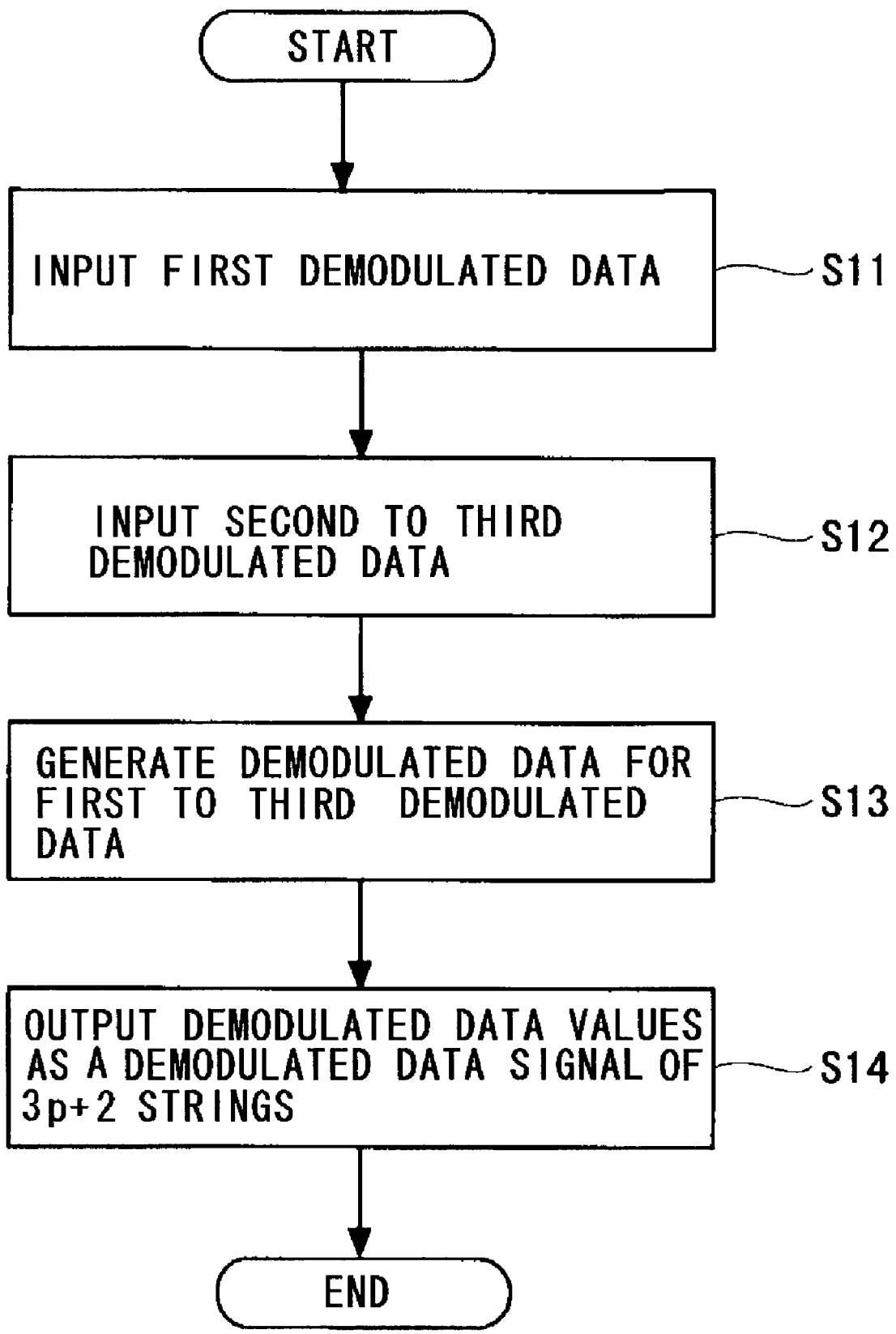
FIG. 19 is a flow diagram showing an example of a processing sequence of a program to be executed by a computer forming multi-level demodulation controlling means of a multi-level demodulation apparatus according to yet another modification.

FIG. 19 depicts a flowchart of a program to be executed by the computer of the multi-level demodulation controlling means 16.

In a step S11, first demodulated data is input. In the next step S12, second and third modulated data are input.

In the next step S13, demodulated data values, corresponding to the first to third demodulated data, are generated. These demodulated data may be formed by preparing an inverse conversion table in accordance with the instance shown in FIG. 14.

In the next step S14, demodulated data values are output as (3p+2) strings of demodulated data signals. In FIG. 19, the processing for inputting a set of the demodulated data for back conversion is shown. However, it is of course possible to exercise control in such a manner that, by iteratively performing the processing, shown in the flowchart of FIG. 19, as the demodulated data signal is sequentially input, demodulated signals may be sequentially output in a controlled fashion.

In FIGS. 11 and 17, referred to in the explanation of the above embodiments, there is shown a structure in which the first and second data conversion circuits 3 and 4 are designed as two circuit blocks. However, it is of course possible to construct these data conversion circuits as a single circuit. Although certain preferred embodiments of the present invention have been described in the above-described embodiments, the present invention is not to be limited to these particular embodiments and may include various modifications or corrections as may be worked out by those ordinarily skilled in the art within the scope of the appended claims.

The meritorious effects of the present invention are summarized as follows.

According to the present invention, as described above, (3p+2) strings of input data are allocated to three modulation symbols, which are then multiplexed on the time domain to a single modulation symbol to transmit (p+2/3) strings of binary data, so that the n-ary number of the QAM system may approximately be $2^{(p+2/3)}$. Thus, in such a case where there is allowance in the frequency bandwidth with $2^n$QAM but the required frequency bandwidth is exceeded with $2^{(n-1)}$QAM, it is possible to provide a modulation system which represents a compromise between the two QAM systems.

As a consequence, such a merit may be derived that not only the frequency may be utilized effectively, but also the $2^{(n-1/3)}$QAM may be realized with the required signal to noise ratio which is smaller than is possible with the $2^n$QAM, thus assuring effective power utilization.

Moreover, the present invention provides a constructing method in a generalized form with an optional integer not less than 2 and hence may be applied to a number of QAM modulation systems, in addition to 7QAM, 14QAM, 28QAM, 56QAM or 112QAM systems.

According to a further embodiment of the present invention, there is provided a multi-level modulating/demodulating method for allocating (4p+3) strings of an input signal to four modulation symbols, where p is an integer not less than 3, wherein a first modulation symbol uses $15 \times 2^{(p-3)}$ signal points. If the first modulation symbol takes 1 to $8 \times 2^{(p-3)}$ signal points, $15 \times 2^{(p-3)}$, $15 \times 2^{(p-3)}$ and $12 \times 2^{(p-3)}$ signal points, predetermined in association with the input signal, are used as second, third and fourth modulation symbol. If the first modulation symbol takes $8 \times 2^{(p-3)}+1$ to $8 \times 2^{(p-3)}+4 \times 2^{(p-3)}$ signal points, $15 \times 2^{(p-3)}$, $15 \times 2^{(p-3)}$ and $12 \times 2^{(p-3)}$ signal points, predetermined in association with the input signal, are used as the second, third and fourth modulation symbol, respectively, whereas, if the first modulation symbol takes $8 \times 2^{(p-3)}+4 \times 2^{(p-3)}+1$ to $8 \times 2^{(p-3)}+4 \times 2^{(p-3)}+2 \times 2^{(p-3)}$ signal points, $12 \times 2^{(p-3)}$, $12 \times 2^{(p-3)}$ and $8 \times 2^{(p-3)}$ signal points, predetermined in association with the input signal, are used as the second, third and fourth modulation symbols, respectively. If the first modulation symbol takes $8 \times 2^{(p-3)}+4 \times 2^{(p-3)}+ 2 \times 2^{(p-3)}+1$ to $8 \times 2^{(p-3)}+4 \times 2^{(p-3)}+2 \times 2^{(p-3)}+1 \times 2^{(p-3)}$ signal points, $8 \times 2^{(p-3)}$, $7 \times 2^{(p-3)}$ and $4 \times 2^{(p-3)}$ signal points, predetermined in association with the input signal, are used as the second, third and fourth modulation symbol, respectively.

A modulation apparatus according to the embodiment of the present invention comprises converting means supplied with an input signal that takes on a value from 1 to a (4p+3) power of 2, where p is an integer not less than 3, to generate and output first to third converted data based on the input signal, and means supplied with the first to third converted data to effect multi-level modulation thereon to output the resulting data. The converting means classifies the input signal, depending on its values, into three predetermined groups not having common elements.

(a) When the input signal belongs to the first group, the first converted data takes on a value from 1 to $8 \times 2^{(p-3)}$, depending on the value of the input signals, the second, third and fourth converted data take on $12 \times 2^{(p-3)}$, $12 \times 2^{(p-3)}$ and $8 \times 2^{(p-3)}$ values, allocated depending on the value of the input signal, respectively.

(b) When the input signal belongs to the second group, the first converted data takes on a value from $8 \times 2^{(p-3)}+1$ to $8 \times 2^{(p-3)}+4 \times 2^{(p-3)}$, depending on the value of the input signals, the second, third and fourth converted data taking on $12 \times 2^{(p-3)}$, $12 \times 2^{(p-3)}$ and $8 \times 2^{(p-3)}$ values, allocated depending on the value of the input signal, respectively.

(c) When the input signal belongs to the third group, the first converted data takes on a value from $8 \times 2^{(p-3)}+4 \times 2^{(p-3)}+1$ to $8 \times 2^{(p-3)}+4 \times 2^{(p-3)}+2 \times 2^{(p-3)}$, depending on the value of the input signals, the second, third and fourth converted data taking on $12 \times 2^{(p-3)}$, $12 \times 2^{(p-3)}$ and $8 \times 2^{(p-3)}$ values, allocated depending on the value of the input signal, respectively.

(d) When the input signal belongs to the fourth group, the first converted data takes on a value from $8 \times 2^{(p-3)}+ 4 \times 2^{(p-3)}+2 \times 2^{(p-3)}+1$ to $8 \times 2^{(p-3)}+4 \times 2^{(p-3)}+2 \times 2^{(p-3)}+ 1 \times 2^{(p-3)}$, depending on the value of the input signals, the second, third and fourth converted data taking on $8 \times 2^{(p-3)}$, $7 \times 2^{(p-3)}$ and $4 \times 2^{(p-3)}$ values, allocated depending on the value of the input signal, respectively.

The operating principle of modulation of the present embodiment is that, with p being an integer not less than 3, we have the following equation (5):

$$2^{(4p+3)} = \{8 \times 2^{(p-3)}\} \times \{15 \times 2^{(p-3)}\} \times \{15 \times 2^{(p-3)}\} \times \{12 \times 2^{(p-3)}\} + \qquad (5)$$
$$\{4 \times 2^{(p-3)}\} \times \{15 \times 2^{(p-3)}\} \times \{12 \times 2^{(p-3)}\} \times \{12 \times 2^{(p-3)}\} +$$
$$\{2 \times 2^{(p-3)}\} \times \{12 \times 2^{(p-3)}\} \times \{12 \times 2^{(p-3)}\} \times \{8 \times 2^{(p-3)}\} +$$
$$\{1 \times 2^{(p-3)}\} \times \{8 \times 2^{(p-3)}\} \times \{7 \times 2^{(p-3)}\} \times \{4 \times 2^{(p-3)}\}.$$

The first term of the right side of the equation (5) indicates that, in the $15 \times 2^{(p-3)}$ QAM of the first signal, $8 \times 2^{(p-3)}$ number of times, the second, third and fourth signals, are $15 \times 2^{(p-3)}$QAM, $15 \times 2^{(p-3)}$QAM and $12 \times 2^{(p-3)}$QAM, respectively.

The second term of the right side of the equation (5) indicates that $4 \times 2^{(p-3)}$ number of times, the second, third and fourth signals are $15 \times 2^{(p-3)}$QAM, $12 \times 2^{(p-3)}$QAM and $12 \times 2^{(p-3)}$QAM, respectively.

The third term of the right side of the equation (5) indicates that $2 \times 2^{(p-3)}$ number of times, are the second, third and fourth signals are $12 \times 2^{(p-3)}$QAM, $12 \times 2^{(p-3)}$QAM and $8 \times 2^{(p-3)}$QAM, respectively.

The fourth term of the right side of the equation (5) indicates that $1 \times 2^{(p-3)}$ number of times, as to the second, third and fourth signals, $8 \times 2^{(p-3)}$QAM, $7 \times 2^{(p-3)}$QAM and $4 \times 2^{(p-3)}$QAM are to be executed, respectively.

The total number of the first signals is $15 \times 2^{(p-3)}$ in the above equation (5).

That is, the operation in which (p+3/4) bits (=p+0.75 bits) are allocated to one modulation symbol is executed.

From this, it may be seen that the n-ary number in the QAM system may be set to approximately $2^{(n+0.75)}$.

Figure 20:
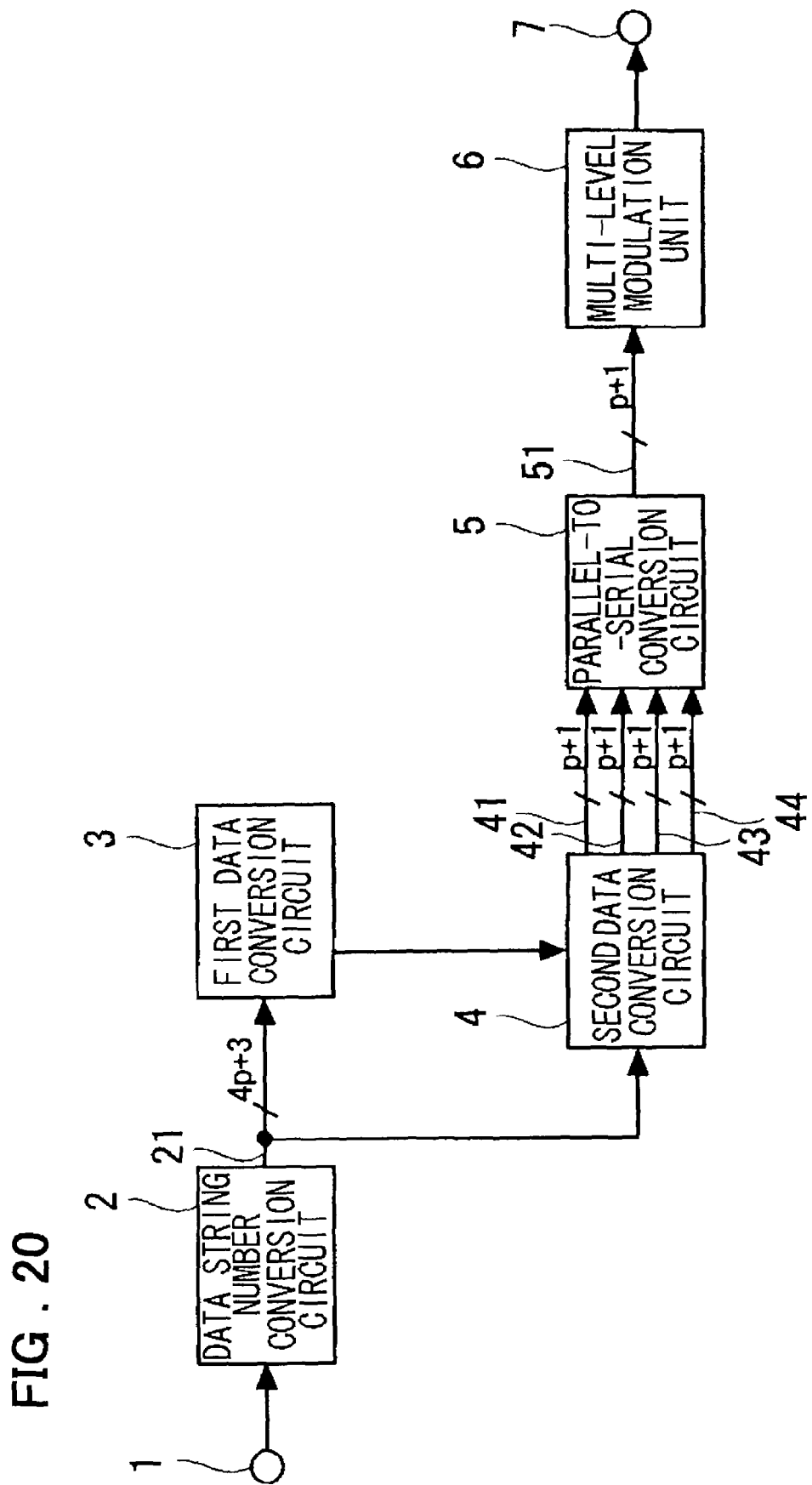
FIG. 20 shows the structure of a multi-level modulation apparatus according to an embodiment of the present invention.

FIG. 20 is a block diagram showing the structure of a multi-level modulation apparatus according to an embodiment of the present invention. Referring to FIG. 20, a multi-level modulation apparatus of the present embodiment includes an input terminal 1, a conversion circuit 2 for converting the number of data strings, a first data conversion circuit 3, a second data conversion circuit 4, a parallel-to-serial conversion circuit 5, a multi-level modulation unit 6 and an output terminal 7.

The first data conversion circuit 3 and the second data conversion circuit 4 receive an input data signal 21, which is mad up by 4p+3 strings and which is output from the data string number conversion circuit 2, to output converted signals.

The first data conversion circuit 3 is responsive to the value of the input data signal 21 of (4p+3) strings to output a signal of four (p+1) strings indicating $15 \times 2^{(p-3)}$ kinds of values.

The second data conversion circuit 4 receives the output signal from the first data conversion circuit 3 and refers to the value of the input signal 21 to output four sets of signals 41, 42, 43 and 44, each being (p+1) strings.

If the first data conversion circuit 3 outputs a value from 1 to $8 \times 2^{(p-3)}$, the second data conversion circuit 4 sets this value as a first output signal 41, while outputting signals indicating predetermined $15 \times 2^{(p-3)}$, $15 \times 2^{(p-3)}$ and $12 \times 2^{(p-3)}$ kinds of values as second, third and fourth output signals 42, 43 and 44.

If the first data conversion circuit 3 outputs a value from $8 \times 2^{(p-3)}+1$ to $8 \times 2^{(p-3)}+4 \times 2^{(p-3)}$, the second data conversion circuit 4 sets this value as a first output signal 41, while outputting signals indicating predetermined $15 \times 2(p-3)$, $12 \times 2^{(p-3)}$ and $12 \times 2^{(p-3)}$ kinds of values as second, third and fourth output signals 42, 43 and 44.

If the first data conversion circuit 3 outputs a value from $8 \times 2^{(p-3)}+4 \times 2^{(p-3)}+1$ to $8 \times 2^{(p-3)}+4 \times 2^{(p-3)}+2 \times 2^{(p-3)}$, the second data conversion circuit 4 sets this value as a first output signal 41, while outputting signals indicating predetermined $12 \times 2^{(p-3)}$, $12 \times 2^{(p-3)}$ and $8 \times 2^{(p-3)}$ kinds of values as second, third and fourth output signals 42, 43 and 44.

If the first data conversion circuit 3 outputs a value from $8 \times 2^{(p-3)}+4 \times 2^{(p-3)}+2 \times 2^{(p-3)}+1$ to $8 \times 2^{(p-3)}+4 \times 2^{(p-3)}+2 \times 2^{(p-3)}+1 \times 2^{(p-3)}$ the second data conversion circuit 4 sets this value as a first output signal 41, while outputting signals indicating predetermined $7 \times 2^{(p-3)}$, $4 \times 2^{(p-3)}$ and $2 \times 2^{(p-3)}$ kinds of values as second, third and fourth output signals 42, 43 and 44.

If the first data conversion circuit 3 outputs a value from $8 \times 2^{(p-3)}+4 \times 2^{(p-3)}+2 \times 2^{(p-3)}+1$ to $8 \times 2^{(p-3)}+4 \times 2^{(p-3)}+$ qj$2 \times 2^{(p-3)}+1 \times 2^{(p-3)}$, the second data conversion circuit 4 sets this value as a first output signal 41, while outputting signals indicating predetermined $4 \times 2^{(p-3)}$, $14 \times 2^{(p-3)}$ and $4 \times 2^{(p-3)}$ values or predetermined $14 \times 2^{(p-3)}$, $8 \times 2^{(p-3)}$ and $2 \times 2^{(p-3)}$ kinds of values as second, third and fourth output signals 42, 43 and 44.

The parallel-to-serial conversion circuit 5 is supplied with the first to third output signals 41 to 44 from the second data conversion circuit 4 and time-division multiplexes these signals to output (p+1) strings of a multiplexed signal 51.

The multi-level modulation unit performs 6 multi-level modulation of the multiplexed signal 51 to output the modulated signal to the output terminal 7.

In the present embodiment, when the values of the output signals of from 1 to $15 \times 2^{(p-3)}$ as the output signal of the first data conversion circuit 3 are classified responsive to the value of the input data signal 21, the $8 \times 2^{(p-3)}+4 \times 2^{(p-3)}+2 \times 2^{(p-3)}+1 \times 2^{(p-3)}$, as the output signals of the first data conversion circuit 3, may be output as the sequence thereof is optionally interchanged. The plural values predetermined as the second to fourth output signals may also be output by the second data conversion circuit 4 as the sequence thereof is similarly interchanged.

Figure 21:
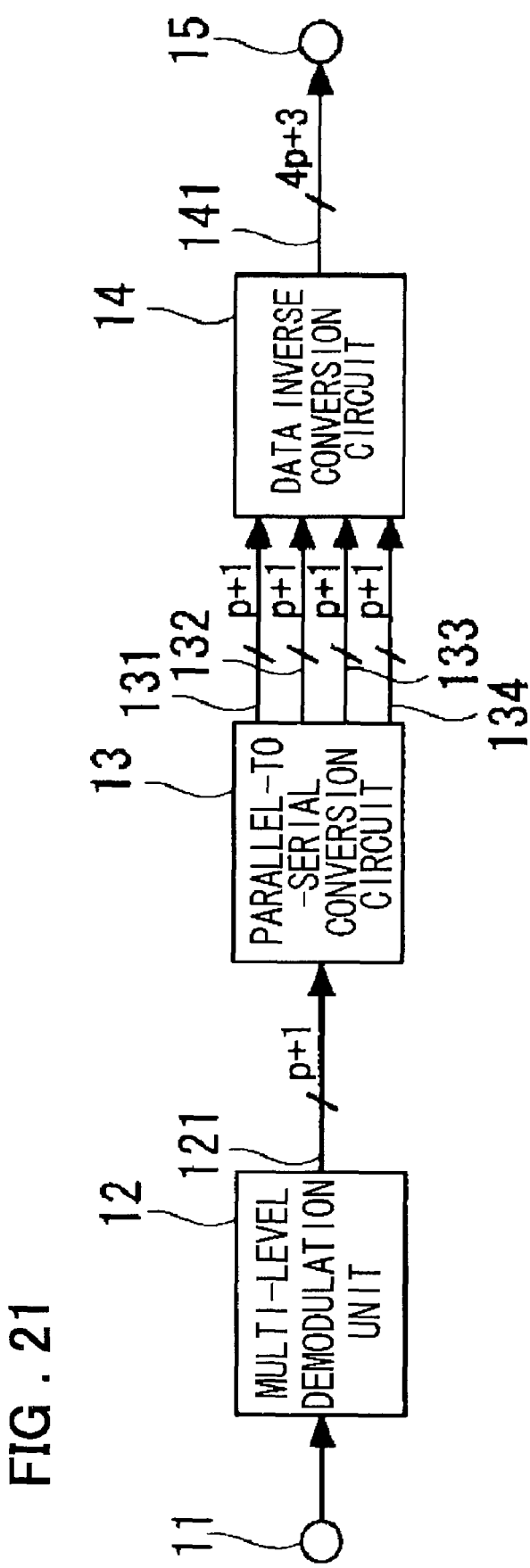
FIG. 21 shows the structure of a multi-level demodulation apparatus according this embodiment.

FIG. 21 shows the structure of a multi-level demodulating apparatus for executing the operation of receiving signals output from the multi-level modulation apparatus of FIG. 20 (communication signals) to demodulate the signals. Referring to FIG. 21, the multi-level demodulating apparatus of the present embodiment includes an input terminal 11, a multi-level demodulating unit 12, a serial-to-parallel conversion circuit 13, a data inverse-conversion circuit 14, and an output terminal 15.

The multi-level demodulating unit 12 demodulates a communication signal, supplied to the input terminal 11, to output a received demodulated data signal 121 of (p+1) strings.

The serial-to-parallel conversion circuit 13 time-division demultiplexes the received demodulated data string signals 121 to output first to fourth demodulated data string signals 131 to 134, each being a (p+1) string.

The data inverse-conversion circuit 14 is supplied with the first to fourth demodulated data string signals 131 to 133 to output (4p+3) strings of demodulated data signals 141.

If the first demodulated data string signals take on the values from $1+8 \times 2^{(p-3)}$, the data inverse-conversion circuit 14 receives signals indicating predetermined $15 \times 2^{(p-3)}$, $15 \times 2^{(p-3)}$ and $12 \times 2^{(p-3)}$ kinds of values, as second, third and fourth demodulated data string signals.

If the first demodulated data string signals take on values of $8 \times 2^{(p-3)}+1$ to $8 \times 2^{(p-3)}+4 \times 2^{(p-3)}$, the data inverse-conversion circuit 14 receives signals indicating predetermined $15\times2^{(p-3)}$, $15\times2^{(p-3)}$ and $12\times2^{(p-3)}$ kinds of values, as the second, third and fourth demodulated data string signals, respectively.

If the first demodulated data string signals take on values of $8\times2^{(p-3)}+4\times2^{(p-3)}+1$ to $8\times2^{(p-3)}+4\times2^{(p-3)}+2\times2^{(p-3)}$, the data inverse-conversion circuit 14 receives signals indicating predetermined $12\times2^{(p-3)}$, $12\times2^{(p-3)}$ and $8\times2^{(p-3)}$ kinds of values and signals indicating $1\times2^p$ kinds of values, as the second, third and fourth data string signals, respectively.

If the first demodulated data string signals take on values of $8\times2^{(p-3)}+4\times2^{(p-3)}+2\times2^{(p-3)}+1$ to $8\times2^{(p-3)}+4\times2^{(p-3)}+2\times2^{(p-3)}+1\times2^{(p-3)}$, the data inverse-conversion circuit 14 receives signals indicating predetermined $8\times2^{(p-3)}$, $7\times2^{(p-3)}$ and $4\times2^{(p-3)}$ kinds of values and signals, as the second, third and fourth demodulated data string signals, respectively.

Based on the values specified by the first to third demodulated data string signals 131 to 133, the data inverse-conversion circuit 14 generates a predetermined demodulated data value and outputs the demodulated data value as (4p+3) strings of a demodulated data signal 141.

A multi-level modulation/demodulation communication system according to the present invention is made up by the multi-level modulation apparatus, shown in FIG. 20, and the multi-level demodulation apparatus, shown in FIG. 21.

Referring to the drawings, the operation of the multi-level modulation apparatus and the multi-level demodulation apparatus, shown in FIGS. 20 and 21, respectively, is now explained in detail.

Figure 22:
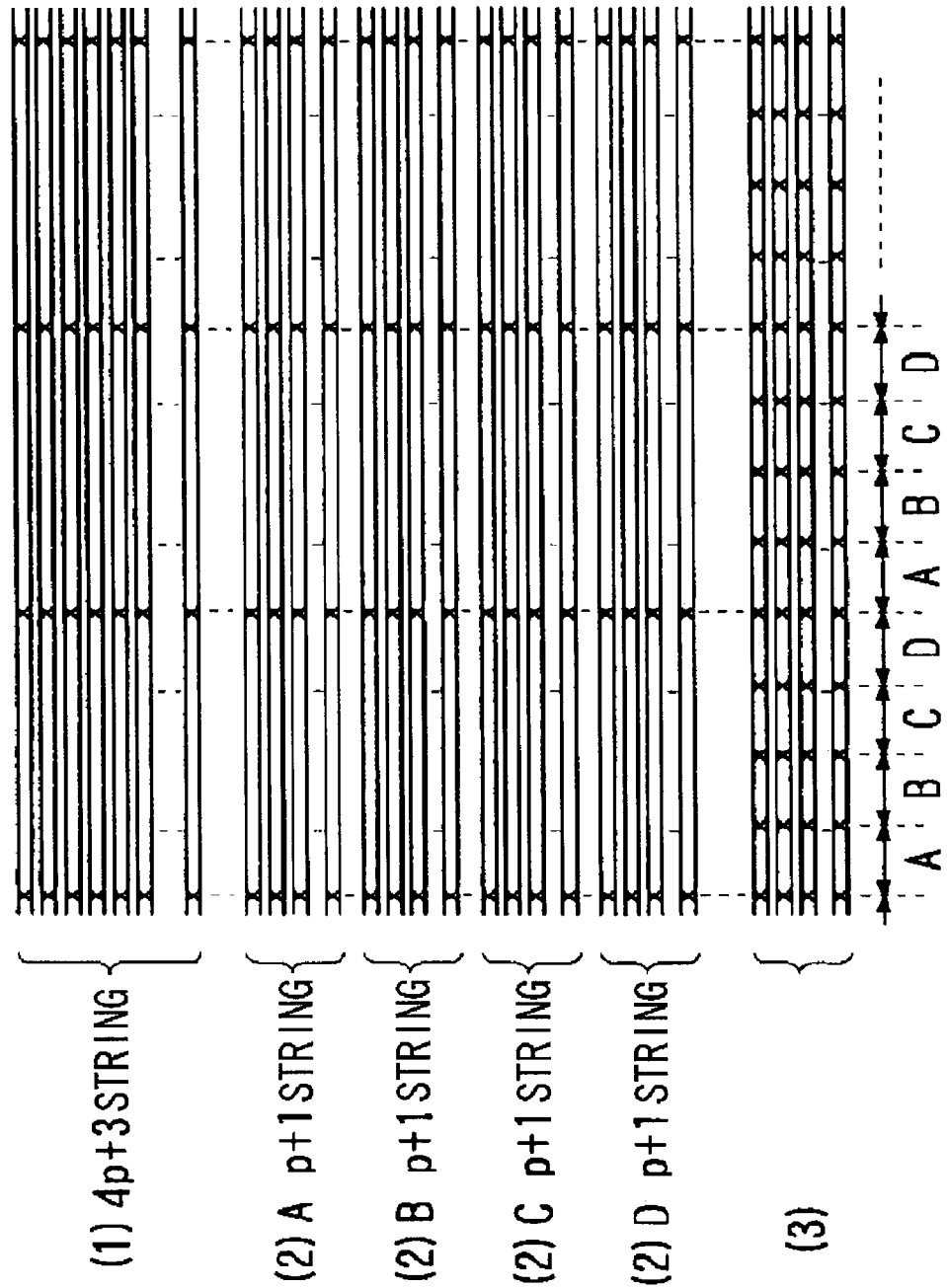
FIG. 22 is a timing chart for illustrating signal conversion in various portions of the multi-level modulation apparatus according to the embodiment.

FIG. 22 shows a timing chart illustrating signal conversion in the respective portions in the multi-level modulation apparatus according to the embodiment of the present invention. FIG. 22(1) shows an input data signal 21 of FIG. 20. The abscissa of FIG. 22 is a time axis, indicating that the input data signal 21 is changed at a preset time interval. FIGS. 22(2)A, (2)B, 2(C) and 2(D) depict first to fourth output signals 41 to 44 output by the second data conversion circuit 4 of FIG. 20. FIG. 21(3) shows the first to third output signals 41 to 43, output by the second data conversion circuit 4 of FIG. 20, respectively. FIG. 21(3) shows the multiplexed signal 51, output by the parallel-to-serial conversion circuit 5 of FIG. 20. FIG. 21(3) shows the manner in which the signals of FIGS. 21 (2)A, (2)B, (2)C and (2)D are time-division multiplexed, with the signals of (2)A being output during the period of (3)A, the signal of (2)B being output during the period of (3)B, the signal of (2)C being output during the period of (3)C and with the signal of (2)D being output during the period of (3)D.

FIG. 23 shows the correspondence between the values of the input data signal of (4p+3) strings (binary signals) (the column of "number of the input signal" of FIG. 23) and the values of the signals output at the output terminal 7 (the column of "the values the modulation symbol may take on" of FIG. 23) for an exemplary case of p=4 (with the input data signal 21 being 19 strings, that is of a 19-bit configuration). Meanwhile, FIG. 23 shows an example of data conversion by a data conversion table (not shown) in the first and second data conversion circuits 3 and 4 in the present embodiment.

Referring to FIG. 23, the first one of four modulation symbols takes on a value from 1 to 30. When the value of the first modulation symbol is from 1 to 16, the second, third and fourth modulation symbols take on values from 1 to 30, from 1 to 30 and from 1 to 24, respectively.

As long as the value of the first modulation symbol is from 17 to 24, the second, third and fourth modulation symbols may take on values from 1 to 30, values from 1 to 24 and from 1 to 24, respectively.

As long as the value of the first modulation symbol is from 25 to 28, the second, third and fourth modulation symbols take on values from 1 to 24, from 1 to 24 and values from 1 to 4, respectively.

When the value of the first modulation symbol is from 29 to 30, the second, third and fourth modulation symbols may take on values from 1 to 16, from 1 to 14 and from 1 to 8, respectively.

It is noted that the signals that may be expressed by the four modulation symbols are as indicated by the following equation (6):

$$16\times30\times30\times24+8\times30\times30\times24+4\times24\times24\times16+2\times16\times14\times8=524288(=2^{19}) \quad (6)$$

In the above equation (6), 16 of $16\times30\times30\times24$ of the first term of the left side indicates that the first modulation symbol takes on the values of from 1 to 16, while $30\times30\times24$ indicates that the second, third and fourth modulation symbol take on the values of from 1 to 30, 1 to 30 and from 1 to 24 for each of 1 to 16 of the values of the first modulation symbol, respectively.

In the above equation (6), 8 of $8\times30\times30\times24$ of the second term of the left side indicates that the first modulation symbol takes on the values of from 17 to 24, while $30\times30\times24$ indicates that the second, third and fourth modulation symbol take on the values of from 1 to 30, 1 to 24 and from 1 to 24 for each of 17 to 24 of the values of the first modulation symbol, respectively.

In the above equation (6), 4 of $4\times24\times24\times16$ of the third term of the left side indicates that the first modulation symbol takes on the values of from 25 to 28, while $24\times24\times16$ indicates that the second, third and fourth modulation symbols take on the values of from 1 to 24, 1 to 24 and from 1 to 6 for each of 1 to 16 of the values of the first modulation symbol, respectively.

In the above equation (6), 2 of $2\times16\times14\times8$ of the fourth term of the left side indicates that the first modulation symbol takes on the values of from 29 to 30, while $16\times14\times8$ indicates that the second, third and fourth modulation symbol take on the values of from 1 to 16, 1 to 14 and from 1 to 8 for each of 29 to 30 of the values of the first modulation symbol, respectively.

Since the correspondence between the input data signals and the values of the first to fourth modulation symbols can be determined uniquely, in this manner, each of the first and second data conversion circuits can be implemented by a configuration in which a preset data table is stored in a ROM (read-only memory). Although FIG. 23 shows the case of p=4, the present invention is valid for p as an integer not less than 4, and hence the present invention is not limited to a case of p=4.

Figure 24:
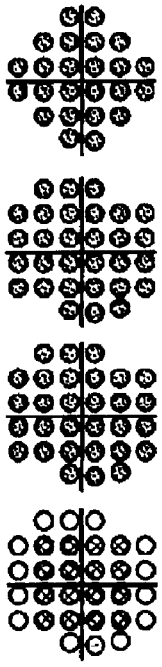
FIG. 24 illustrates coordinate points that can be assumed by respective modulation symbols in phase planes of n-ary signals for modulation in the embodiment.

FIG. 24 depicts a signal diagram in which the first to third modulation symbols of the modulated signals output by the multi-level modulation unit 6 are represented as a so-called constellation (signal arraying points of the digital modulated wave) on the phase plane. In FIG. 24, the coordinate points that can be taken on by the first to fourth symbols, in the first to fourth terms of the left side of the above equation (6), are indicated by black dots. That is, "16 points of the first symbol" of FIG. 24 indicate, beginning from the left end, the coordinate points that can be assumed by the first to fourth symbols in the first term of the left side of the above equation (6), by black dots (dots confined within circles). Similarly, the "8 points of the first symbol" indicate, beginning from the left end, the coordinate points that can be assumed by the first to fourth symbols, in the second term of the left side of the above equation (6), by black dots, while the "four points of the first symbol" indicate, beginning from the left end, the coordinate points that can be assumed by the first to fourth symbols, in the third term of the left side of the above equation (6) by black dots, and the "two points of the first symbol" indicate, beginning from the left end, the coordinate points that can be assumed by the first to fourth symbols, in the fourth term of the left side of the above equation (6) by black dots A further embodiment of the present invention is now explained. The present invention shows a method for construction in a generalized form that can be worked out for an integer p not less than 3. As an instance of application, FIG. 25 specifies parameter values for the respective modulation systems for p=3 to 7, that are for 15QAM, 30QAM, 60QAM, 120QAM and 240QAM, are shown.

FIG. 25 shows the n-ary numbers of the first to fourth modulation symbols and the numbers of repetition thereof. For example, if it is desired to have communication at a transmission rate 150 [Megabits/sec], but there is only the frequency bandwidth equivalent to 33 [M symbols/sec] (mega (one million) symbols/sec), bandwidth redundancy becomes significant with 32QAM with the frequency bandwidth of 31.2 [M symbols/sec]. On the other hand, with 16QAM, with the frequency bandwidth of 39.0 [M symbols/sec], the bandwidth is in shortage.

If, in such case, the 30QAM shown in FIG. 25 is applied, the modulation rate of 32.8 [M symbols/sec] may be obtained, thus assuring transmission with a satisfactory bandwidth utilization efficiency.

In the conventional 32QAM, 24.0 dB of the required C/N (carrier to noise ratio) is retained to be necessary for achieving the symbol error rate of $1 \times 10^{-6}$ in order to realize the code error rate of $10^{-6}$. On the other hand, the required C/N in case of using the 30QAM of the present invention is 23.2 dB. That is, with the present invention, transmission may meritoriously be achieved with the same quality as that with the conventional 32QAM, even if the transmission power is diminished by 0.8 dB, with the result that the power may be exploited more effectively.

Figure 26:
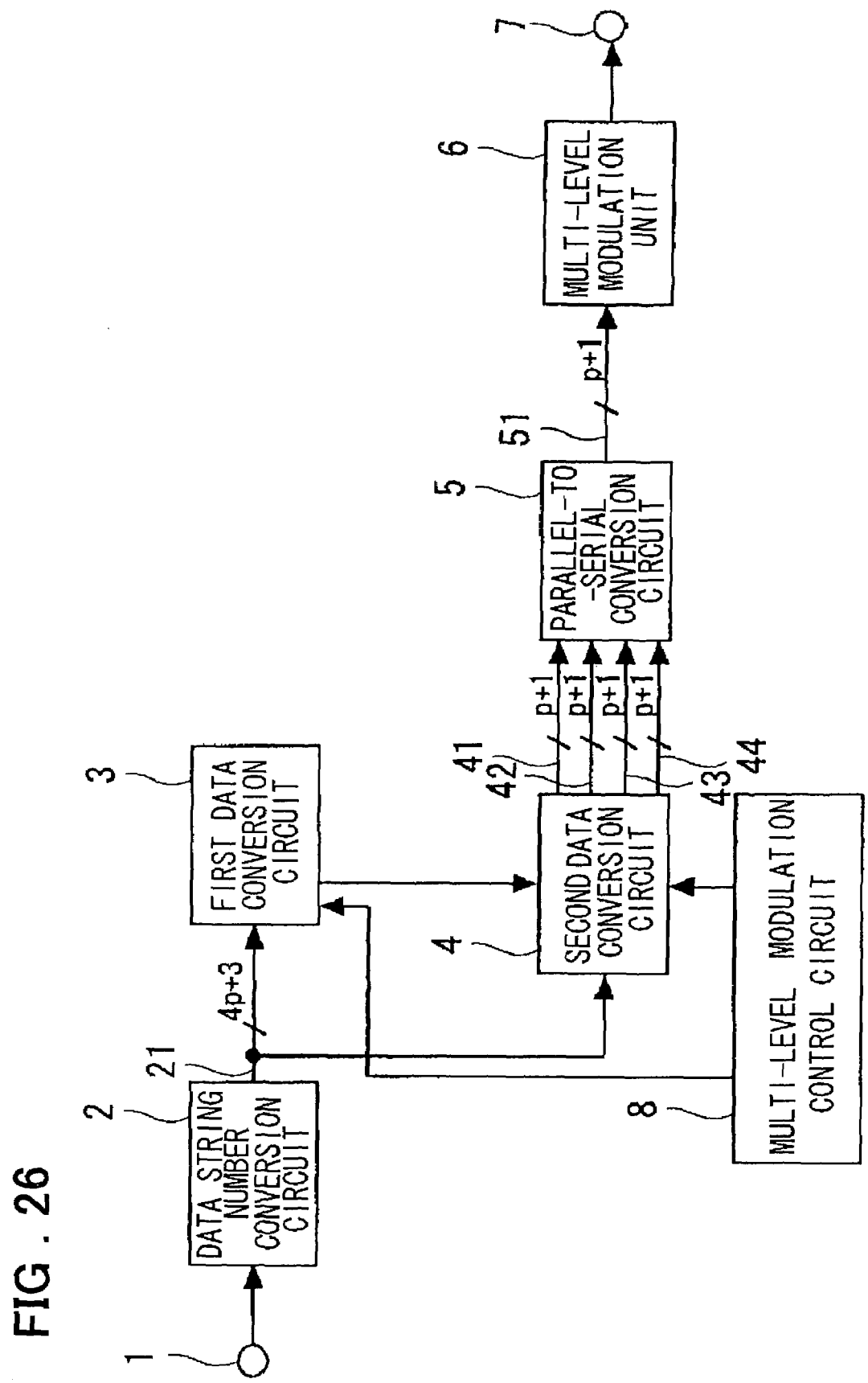
FIG. 26 illustrates the structure of a multi-level modulation apparatus according to another modification.

A further embodiment of the present invention is now explained. FIG. 26 shows the structure of this further embodiment. In this figure, the same elements as those shown in FIG. 20 are denoted by the same reference numerals. In this embodiment, the multi-level modulation apparatus and the multi-level demodulation apparatus are provided with controlling means, while data conversion tables in the multi-level modulation apparatus and the multi-level demodulation apparatus are formed by RAM (random access memory) devices. The data conversion tables stored in the RAM device may be changed by controlling means. By changing the data conversion tables of the multi-level modulation apparatus and the multi-level demodulation apparatus (provided within the data conversion circuit and in the data inverse-conversion circuit) correlatively with each other, it becomes possible to change the relationship between the values of the data transmitted or received and the communication signals (coordinate points on the constellation). This structure helps improve the confidential character of the data transmitted or received as well as to improve the reliability of the communication system.

Referring to FIG. 26, the multi-level modulation apparatus of the present embodiment is composed of the multi-level modulation apparatus of FIG. 20 added by multi-level modulation controlling means 8. This multi-level modulation controlling means 8 controls the first data conversion circuit 3 and the second data conversion circuit 4 to change the data conversion tables, not shown, provided to these circuits.

Figure 27:
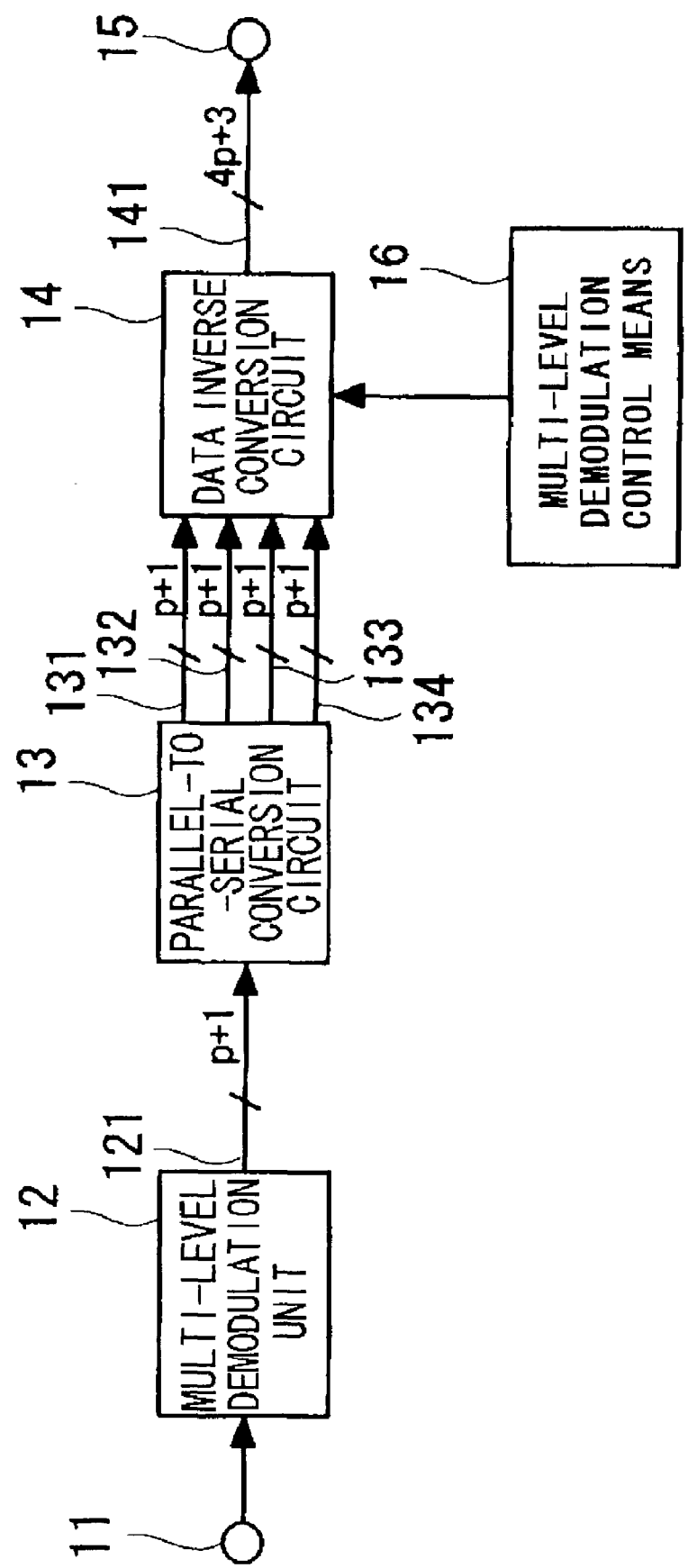
FIG. 27 illustrates the structure of a multi-level demodulation apparatus according to still another modification.

FIG. 27 shows the structure of the multi-level demodulation apparatus of the present modification. In FIG. 27, the same elements as those shown in FIG. 2 are depicted by the same reference numerals. Referring to FIG. 27, the multi-level modulation apparatus of the present embodiment is composed of the multi-level modulation apparatus of FIG. 21 added by multi-level modulation controlling means 16. This multi-level modulation controlling means 16 controls data inverse-conversion circuit 14 to change the inverse data conversion tables, not shown, provided to this conversion circuit 14.

The multi-level modulation/demodulation communication system of the present invention may also be provided with the multi-level modulation apparatus shown in FIG. 26 and with the multi-level demodulation apparatus shown in FIG. 27.

The first data conversion circuit 3 and the second data conversion circuit 4 of FIG. 26 may be constituted as an input/output device for the multi-level modulation controlling means 8, such that data conversion processing by the first data conversion circuit 3 and the second data conversion circuit 4 is carried out by a computer of the multi-level modulation controlling means 8. In this case, the control program of the multi-level modulation controlling means 8 is designed to perform the processing for substituting the data conversion circuits 3 and 4.

Figure 28:
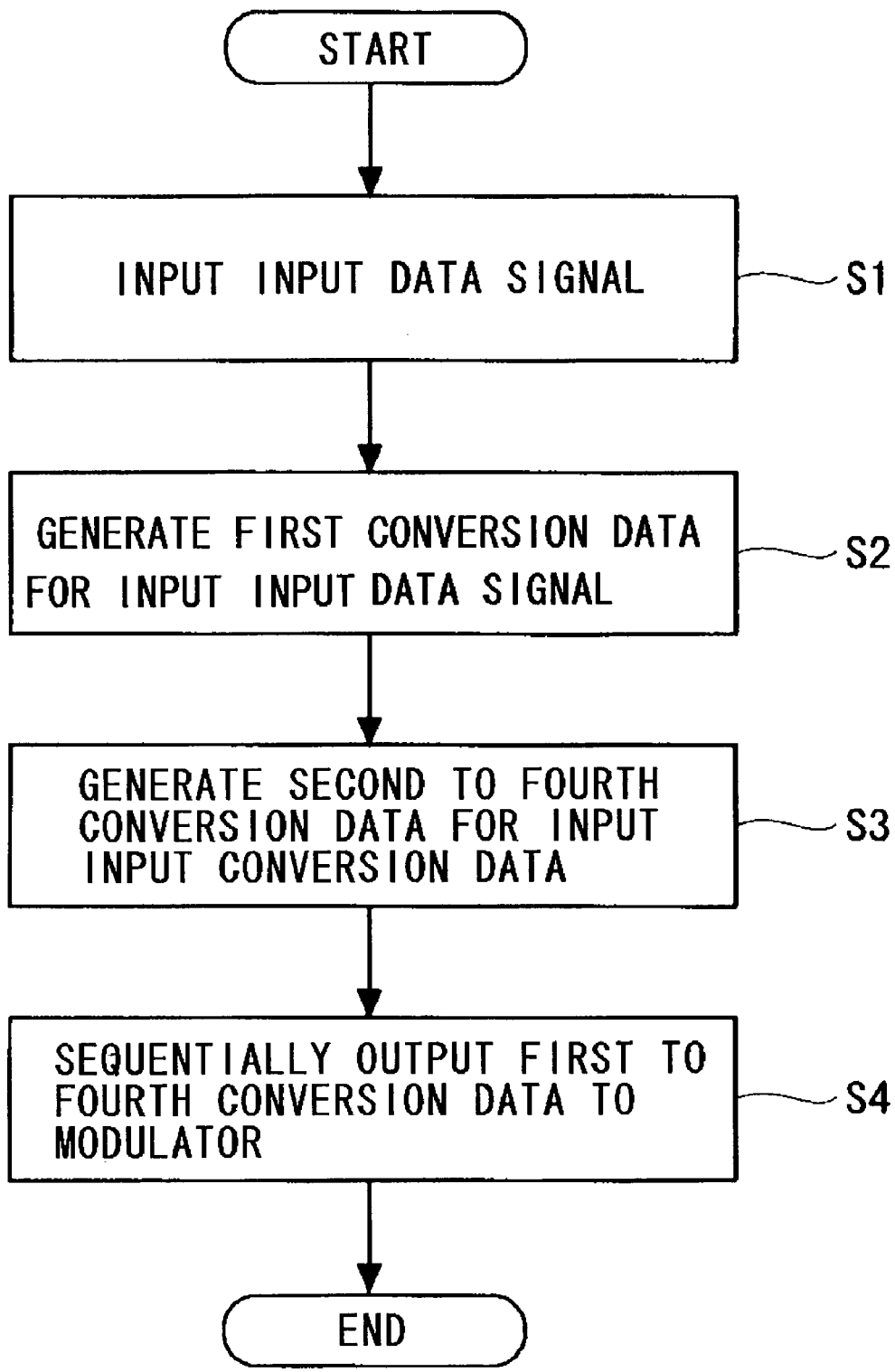
FIG. 28 is a flow diagram showing an example of a processing sequence of a program to be executed by a computer forming multi-level modulation controlling means of a multi-level modulation apparatus according to still another modification.

FIG. 28 depicts a flowchart of a program to be executed by a computer of the multi-level modulation controlling means 8 shown in FIG. 26. In a step S1, the input data signal 21 is input to the multi-level modulation controlling means 8. In the next step S2, first conversion data corresponding to the values of the input data signal 21 is generated.

In the next step S3, second, third and fourth conversion data are generated. These conversion data may for example be constituted as shown for example in FIG. 23.

In the next step S4, the first to fourth conversion data are output sequentially to the parallel-to-serial conversion unit 6.

Although FIG. 28 shows the processing for converting one input data, the input data signals are supplied sequentially, as indicated by the timing chart of FIG. 22. By iteratively performing the processing, shown in the flowchart of FIG. 22, as the input data signal is sequentially input, modulated signals may be sequentially transmitted in a controlled fashion.

In similar manner, the data inverse-conversion circuit 14 of FIG. 27 may be formed as an input/output device of the multi-level demodulation controlling means 16, such that the inverse conversion function of the data inverse-conversion circuit 14 is implemented by a computer forming the multi-level demodulation controlling means 16. In this case, the control program of the multi-level demodulation controlling means 16 is designed such as to take charge of the function of the data inverse-conversion circuit 14.

Figure 29:
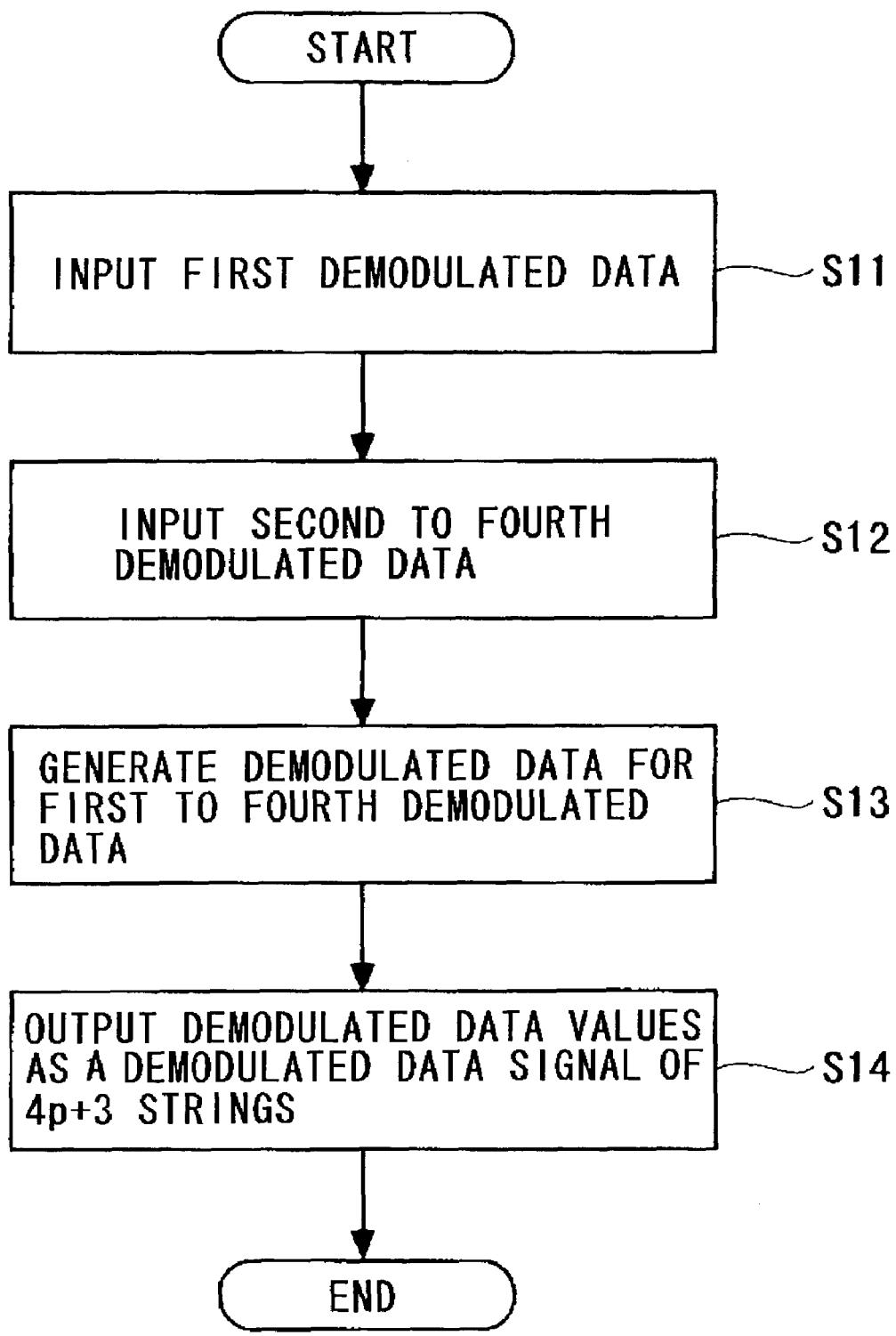
FIG. 29 is a flow diagram showing an example of a processing sequence of a program to be executed by a computer forming multi-level demodulation controlling means of a multi-level demodulation apparatus according to yet another modification.

FIG. 29 depicts a flowchart of a program to be executed by the computer of the multi-level demodulation controlling means 16 of FIG. 17. In a step S11, first demodulated data is input. In the next step S12, second, third and fourth modulated data are input. In the next step S13, demodulated data values, corresponding to the first to fourth demodulated data, are generated. These demodulated data may be formed by preparing an inverse conversion table in accordance with the instance shown in FIG. 23.

In the next step S14, demodulated data values are output as (4p+1) strings of demodulated data signals. In FIG. 29, the processing for inputting a set of the demodulated data for back conversion is shown. However, it is of course possible to exercise control in such a manner that, by iteratively performing the processing, shown in the flowchart of FIG. 29, as the demodulated data signal is sequentially input, demodulated signals may be sequentially output in a controlled fashion.

In FIGS. 20 and 26, referred to in the explanation of the above embodiments, there is shown a structure in which the first and second data conversion circuits 3 and 4 are designed as two circuit blocks. However, it is of course possible to construct these data conversion circuits as a single circuit. Although certain preferred embodiments of the present invention have been described in the above-described embodiments, the present invention is not to be limited to these particular embodiments and may include various modifications or corrections as may be worked out by those ordinarily skilled in the art within the scope of the appended claims.

The meritorious effects of the present invention are summarized as follows.

According to the present invention, as described above, (4p+3) strings of input data are allocated to three modulation symbols, which are then multiplexed on the time domain to a single modulation symbol to transmit (p+0.75) strings of binary data, so that the n-ary number of the QAM system may approximately be $2^{(p+0.75)}$. Thus, in such a case where there is allowance in the frequency bandwidth with $2^n$QAM but the required frequency bandwidth is exceeded with $2^{(n-1)}$QAM, it is possible to provide a modulation system which represents a compromise between the two QAM systems.

As a consequence, such a merit may be derived that not only the frequency may be utilized effectively, but also the $2^{(n-0.25)}$QAM may be realized with the required signal to noise ratio which is smaller than is possible with the $2^n$QAM, thus assuring effective power utilization.

Moreover, the present invention provides a constructing method in a generalized form with an optional integer p not less than 3 and hence may be applied to a number of QAM modulation systems, in addition to 15QAM, 30QAM, 50QAM, 60QAM, 120QAM or 240QAM systems.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An apparatus for performing multi-level modulation of an input data string to output a communication signal, said apparatus comprising:

a data string number conversion circuit for converting said input data string into an input data signal composed by (3p+1) strings of binary signals, where p is an integer not less than 3, and for outputting said input data signal;

a first data conversion circuit, receiving said input data signal output from said data string number conversion circuit, for converting said input data signal to output the converted input data signal;

a second data conversion circuit, receiving said input data signal output from said data string number conversion circuit and an output signal of said first data conversion circuit, for converting the received signal into three sets of output signals, termed first, second and third output signals, each being a (p+1) string output signal;

a parallel-to-serial conversion circuit, receiving and time-division multiplexing said three sets of (p+1) string output signals output from said second data conversion circuit, to output multiplexd signals; and a multi-level modulating unit, receiving said multiplexed signals of said parallel-to-serial conversion circuit, for effecting multi-level modulation to output the communication signal; wherein said first data conversion circuit outputs an output signal indicating a value from 1 to $(11/8)\times2^p$, depending on the value of said input data signal;

if the output signal of said first data conversion circuit takes on a value from 1 to $8\times2^{(p-3)}$, said second data conversion circuit sets, based on said input data signal, the value of the output signal of said first data conversion circuit as said first output signal and outputs signals representing predetermined $(11/8)\times2^p$ and $(10/8)\times2^p$ values as said second and third output signals, respectively; and if the output signal of said first data conversion circuit takes on a value from $1+8\times2^{(p-3)}$ to $8\times2^{(p-3)}+3\times2^{(p-3)}$, said second data conversion circuit sets the value of the output signal of said first data conversion circuit as said first output signal and outputs signals representing predetermined $(8/8)\times2^p$ and $(6/8)\times2^p$ values as said second and third output signals, respectively.

2. A multi-level modulation/demodulating communication system comprising:

said multi-level modulating apparatus for performing multi-level modulation to output a communication signal, said multi-level modulating apparatus being the apparatus as defined in claim 1; and a multi-level demodulating apparatus for performing multi-level demodulation of a received communication signal sent by the multi-level modulating apparatus.

3. The apparatus as defined in claim 1, further comprising multi-level modulation controlling means for controlling said first and second data conversion circuits for changing the correspondence between said input data signal supplied to said first and second data conversion circuits and output values of output signals from said first and second data conversion circuits.

4. A multi-level modulation/demodulating communication system comprising:

a multi-level modulating apparatus for performing multi-level modulation to output a communication signal, said multi-level modulating apparatus being the apparatus as defined in claim 3; and the multi-level demodulating apparatus for performing multi-level demodulation of a received communication signal sent by the multi-level modulating apparatus.

5. An apparatus for demodulating a communication signal to output a demodulated data signal of 3p+1 strings, where p is an integer not less than 3, said apparatus comprising:

a multi-level demodulating unit for demodulating said communication signal to output a demodulated received data string signal;

a serial-to-parallel conversion circuit, receiving and time-division demultiplexing said received demodulated data string signal, to output first, second and third demodulated data string signals; and a data inverse-conversion circuit, receiving said first, second and third demodulated data string signals to output said demodulated data signal of (3p+1) strings; wherein if said first demodulated data string signal takes on a value from 1 to $8 \times 2^{(p-2)}$, said data inverse-conversion circuit receives signals representing predetermined $(11/8) \times 2^p$ and $(10/8) \times 2^p$ values, as second and third demodulated data string signals, respectively;

if said first demodulated data string signal takes on a value from $1+8 \times 2^{(p-3)}$ to $8 \times 2^{(p-3)}+3 \times 2^{(p-3)}$, said data inverse-conversion circuit receives signals representing predetermined $(8/8) \times 2^p$ and $(6/8) \times 2^p$ values, as second and third demodulated data string signals, respectively; and said data inverse-conversion circuit outputs the demodulated data taking on a predetermined value, based on the values indicated by said first, second and third demodulated data string signals, as said (3p+1) strings of said demodulated data.

6. A multi-level modulation/demodulating communication system comprising:

a multi-level modulating apparatus for performing multi-level modulation to output a communication signal; and said multi-level demodulating apparatus for performing multi-level demodulation of a received communication signal sent by the multi-level modulating apparatus, said multi-level demodulating apparatus being the apparatus as defined in claim 5.

7. The apparatus as defined in claim 5, further comprising multi-level modulation controlling means for controlling said data inverse-conversion circuit for changing the correspondence between said first to third demodulated data string signals supplied to said data inverse-conversion circuit and an output value of an output signal from said data inverse-conversion circuit.

8. A multi-level modulation/demodulating communication system comprising:

a multi-level modulating apparatus for performing multi-level modulation to output a communication signal; and a multi-level demodulating apparatus for performing multi-level demodulation of a received communication signal sent by the multi-level modulating apparatus, said multi-level demodulating apparatus being the apparatus as defined in claim 7.

9. A computer readable medium encoded with a computer program, respective causing a computer composing a multi-level modulation apparatus to execute the processing of multi-level modulation of (3p+1) strings of an input data signal, where p is an integer not less than 3; said program causing said computer to execute the processing of converting said input data signal into first, second and third conversion data, in such a manner that said first conversion data takes on a value from 1 to $(11/8) \times 2^p$ depending on the value of said input data signal;

if said first conversion data takes on a value from 1 to $8 \times 2^{(p-3)}$, said second and third conversion data take on predetermined $(11/8) \times 2^p$ and $(t10/8) \times 2^p$ values, depending on the value of said input data signal, respectively; and if said first conversion data takes on a value from $1+8 \times 2^{(p-3)}$ to $8 \times 2^{(p-3)}+3 \times 2^{(p-3)}$ values, said second and third conversion data take on predetermined $(8/8) \times 2^p$ and $(6/8) \times 2^p$ values, respectively, depending on the value of said input data signal;

said program causing said computer to execute the processing of sequentially outputting said first to third conversion data to a multi-level demodulating unit.

10. A computer readable medium encoded with a computer program, respectively causing a computer composing a multi-level demodulation apparatus to perform the processing of multi-level demodulation of a communication signal and outputting a demodulated data signal of (3p+1) strings, where p is an integer not less than 3, said program causing said computer to execute a conversion process which receives said communication signal as demodulated first to third data string signals and converts the received signals into a demodulated signal of (3p+1) strings;

said, conversion process receiving $(11/8) \times 2^p$ values as said first demodulated data string signal;

if said first demodulated signal takes on a value from 1 to $8 \times 2^{(p-3)}$, said conversion process receiving predetermined $(11/8) \times 2^p$ and $(10/8) \times 2^p$ values as said second and third demodulated data string signals, respectively;

if said first demodulated signal takes on a value from $1+8 \times 2^{(p-3)}$ to $8 \times 2^{(p-3)}+3 \times 2^{(p-3)}$, said conversion process receiving predetermined $(8/8) \times 2^p$ and $(6/8) \times 2^p$ values as said second and third demodulated data string signals, respectively; and said conversion process outputting a demodulated data signal of (3p+1) strings, said demodulated data signal taking on a predetermined value, based on the values indicated by said first to third demodulated data string signals.

11. A method of performing multi-level modulating/demodulation in which (3p+1) strings of an input signal are allocated to three modulation symbols, where p is an integer not less than 3, said method comprising, the steps of:

allocating $(11/8) \times 2^p$ signal points as a first modulation symbol;

in case of said first modulation symbol taking 1 to $8 \times 2^{(p-3)}$ signal points, using $(11/8) \times 2^p$ and $(10/8) \times 2^p$ signal points, predetermined in association with said input signal as second and third modulation symbols; and in case of said first modulation symbol taking $1+8 \times 2^{(p-3)}$ to $8 \times 2^{(p-3)}+3 \times 2^{(p-3)}$ points, using $(8/8) \times 2^p$ and $(6/8) \times 2^p$ signal points, predetermined in association with said input signal, respectively, as said second and third modulation symbols.

12. A modulation apparatus comprising:

converting means, receiving an input signal that takes on a value from 1 to (3p+1) power of 2, where p is an integer not less than 3, to generate and output first to third converted data based on said input signal; and means, receiving said first to third converted data output from said converting means, to effect multi-level modulation thereon to output modulated data;

said converting means classifying said input signal, depending on the values thereof, into two predetermined groups not having common elements, said converter means having means for executing conversion such that if said input signal belongs to said first group, said first converted data takes on a value form 1 to $8 \times 2^{(p-3)}$, depending on the value of said input signal, said second and third converted data taking on predetermined $(11/8) \times 2^p$ and $(10/8) \times 2^p$ values, allocated depending on the value of said input signal, respectively; and if said input signal belongs to said second group, said first converted data takes on a value from $1+8\times2^{(p-3)}$ to $8\times2(p-3)+3\times2^{(p-3)}$, depending on the value of said input signals, said second and third converted data taking on $(8/8)\times2^p$ and $(6/8)\times2^p$ values, allocated depending on the value of said input signal, respectively.

13. A method of performing modulation, comprising the steps of:
converting a data signal of (3p+1) strings, where p is an integer not less than 3, to three signals, each being a (p+1) string and having a predetermined relation to one another,
allocating the three signal of (p+1) string separately to three phase planes, and
performing multi-level modulation, with the three phase planes as a set, by controlling respective numbers of signal points in the three phase planes; wherein an multi-level quadrature amplitude modulation (QAM) is carried out, in which equivalently (p+1/3) bits are allocated to each modulation symbol and the n-ary number is approximated to $2^{(p+1/3)}$.

14. An apparatus for performing multi-level modulation of an input data string to output a communication signal, said apparatus comprising:
a data string number conversion circuit for converting said input data string into an input data signal made up by 3p+2 strings of binary signals, where p is an integer not less than 2, and for outputting said input data signal;
a first data conversion circuit, receiving said input data signal output from said data string number conversion circuit, for converting said input data signal to output the converted input data signal;
a second data conversion circuit, receiving said input data signal output from said data string number conversion circuit and an output signal of said first data conversion circuit, for converting the received signals into three sets of output signals, termed first, second and third output signals, each being a (p+1) string output signal;
a parallel-to-serial conversion circuit, receiving said three sets of (p+1) string output signals output by said second data conversion circuit, for performing time-division multiplexing of said three sets of (p+1) string output signals to output multiplexed signals; and
a multi-level modulating unit, receiving said multiplexd signal of said parallel-to-serial conversion circuit, for effecting multi-level modulation to output the communication signal; wherein
said first data conversion circuit outputs an output signal indicating values from 1 to $(7/4)\times2^p$, responsive to the value of said input data signal;
if the output signal of said first data conversion circuit takes on a value from 1 to $4\times2^{(p-2)}$, said second data conversion circuit sets, based on said input data signal, the value of the output signal of said first data conversion circuit as said first output signal and outputs signals representing predetermined $(7/4)\times2^p$ and $(7/4)\times2^p$ values as said second and third output signals, respectively;
if the output signal of said first data conversion circuit takes on a value from $1+4\times2^{(p-2)}$ to $4\times2^{(p-2)}+2\times2^{(p-2)}$, said second data conversion circuit sets the value of the output signal of said first data conversion circuit as said first output signal and outputs signals representing predetermined $(7/4)\times2^p$ and $1\times2^p$ values as said second and third output signals, respectively; and if the output signal of said first data conversion circuit takes on a value from $1+4\times2^{(p-2)}+2\times2^{(p-2)}$ to $4\times2^{(p-2)}+2\times2^{(p-2)}+1\times2^{(p-2)}$, said second data conversion circuit sets the value of the output signal of said first data conversion circuit as said first output signal and outputs signals representing predetermined $1\times2^p$ and $(1/4)\times2^p$ values as said second and third output signals, respectively.

15. A multi-level modulation/demodulating communication system comprising:
a multi-level modulating apparatus for performing multi-level modulation to output a communication signal, said multi-level modulating apparatus being the apparatus as defined in claim 14; and
a multi-level demodulating apparatus for performing multi-level demodulating a communication signal sent by the multi-level modulating apparatus.

16. The apparatus as defined in claim 14, further comprising
multi-level modulation controlling means for controlling said first and second data conversion circuits for changing the correspondence between said input data signal supplied to said first and second data conversion circuits and output values of output signals from said first and second data conversion circuits.

17. A multi-level modulation/demodulating communication system comprising:
a multi-level modulating apparatus for performing multi-level modulation to output a communication signal, said multi-level modulating apparatus being the apparatus as defined in claim 16; and
a multi-level demodulating apparatus for performing multi-level demodulation of a received communication signal sent by the multi-level modulating apparatus.

18. An apparatus for performing multi-level modulation of an input data string to output a communication signal, said apparatus comprising:
a data string number conversion circuit for converting said input data string into an input data signal made up by (3p+2) strings of binary signals, where p is an integer not less than 2;
a first data conversion circuit, receiving said input data signal output from said data string number conversion circuit, for converting said input data signal to output the converted input data signal;
a second data conversion circuit, receiving said input data signal output from said data string number conversion circuit and an output signal of said first data conversion circuit, for converting the received signal into three sets of output signals, termed first, second and third output signals, each being a (p+1) string output signal;
a parallel-to-serial conversion circuit, receiving said three sets of (p+1) string output signals, output by said second data conversion circuit, for performing time-division multiplexing of said three sets of (p+1) string output signals to output multiplexed output signals; and
a multi-level modulating unit, receiving said multiplexed signal of said parallel-to-serial conversion circuit to effect multi-level modulation to output the communication signal; wherein
said first data conversion circuit outputs the output signal indicating values from 1 to $(7/4)\times2^p$, responsive to the value of said input data signal;
if the output signal of said first data conversion circuit takes on a value from 1 to $4\times2^{(p-2)}$, said second data conversion circuit sets, based on said input data signal, the value of the output signal of said first data conversion circuit as said first output signal, and outputs signals representing predetermined $(7/4)\times 2^p$ and $(7/4)\times 2^p$ values as said second and third output signals, respectively;

if the output signal of said first data conversion circuit takes on a value from $1+4\times 2^{(p-2)}$ to $4\times 2^{(p-2)}+2\times 2^{(p-2)}$, said second data conversion circuit sets the value of the output signal of said first data conversion circuit as said first output signal, and outputs signals representing predetermined $(7/4)\times 2^p$ and $1\times 2^p$ values as said second and third output signals, respectively; and if the output signal of said first data conversion circuit takes on a value from $1+4\times 2^{(p-2)}+2\times 2^{(p-2)}$ to $4\times 2^{(p-2)}+2\times 2^{(p-2)}+1\times 2^{(p-2)}$, said second data conversion circuit sets the value of the output signal of said first data conversion circuit as said first output signal and outputs signals representing predetermined $1\times 2^p$ and $(1/2)\times 2^p$ values as said second and third output signals, respectively.

19. A multi-level modulation/demodulating communication system comprising:
a multi-level modulating apparatus for performing multi-level modulation to output a communication signal, said multi-level modulating apparatus being the apparatus as defined in claim 18; and
a multi-level demodulating apparatus for performing multi-level demodulation of a received communication signal sent by the multi-level modulating apparatus.

20. The apparatus as defined in claim 18, further comprising
multi-level modulation controlling means for controlling said first and second data conversion circuits for changing the correspondence between said input data signal supplied to said first and second data conversion circuits and output values of output signals from said first and second data conversion circuits.

21. A multi-level modulation/demodulating communication system comprising:
a multi-level modulating apparatus for performing multi-level modulation to output a communication signal, said multi-level modulating apparatus being the apparatus as defined in claim 20; and
a multi-level demodulating apparatus for performing multi-level demodulation of a received communication signal sent by the multi-level modulating apparatus.

22. An apparatus for demodulating a communication signal to output a demodulated data signal of (3p+2) strings, where p is an integer not less than 2, said apparatus comprising:
a multi-level demodulating unit for demodulating said communication signal to output a received demodulated data string signal;
a parallel-to-serial conversion circuit, receiving and time-division demultiplexing said received demodulated data string signal to output first, second and third demodulated data string signals; and
a data inverse-conversion circuit, receiving said first, second and third demodulated data string signals and outputting said demodulated data signal of 3p+2 strings; wherein
if said first demodulated data string signal takes on a value from 1 to $4\times 2^{(p-2)}$, said data inverse-conversion circuit receives signals representing predetermined $(7/4)\times 2^p$ values as second and third demodulated data string signals;
if said first demodulated data string signal takes on a value from $1+4\times 2^{(p-2)}$ to $4\times 2^{(p-2)}+2\times 2^{(p-2)}$, said data inverse-conversion circuit receives signals representing predetermined $(7/4)\times 2^p$ and $1\times 2^p$ values, as second and third demodulated data string signals, respectively;

if said first demodulated data string signal takes on a value from $1+4\times 2^{(p-2)}+2\times 2^{(p-2)}$ to $4\times 2^{(p-2)}+2\times 2^{(p-2)}+1\times 2^{(p-2)}$, said data inverse-conversion circuit receives signals representing predetermined $1\times 2^p$ and $(1/4)\times 2^p$ values, as second and third demodulated data string signals, respectively, and said data inverse-conversion circuit outputs the demodulated data signal of (3p+2) strings, said demodulated data signal taking on a predetermined value, based on the values indicated by said first, second and third demodulated data string signals.

23. A multi-level modulation/demodulating communication system comprising:
a multi-level modulating apparatus for performing multi-level modulation to output a communication signal; and
a multi-level demodulating apparatus for performing multi-level demodulation of a received communication signal sent by the multi-level modulating apparatus, said multi-level demodulating apparatus being the apparatus as defined in claim 22.

24. The apparatus as defined in claim 22, further comprising
multi-level modulation controlling means for controlling said data inverse-conversion circuit for changing the correspondence between said first to third demodulated data string signals supplied to said data inverse-conversion circuit and an output value of said data inverse-conversion circuit.

25. The apparatus as defined in claim 22, further comprising
multi-level modulation controlling means for controlling said data inverse-conversion circuit for changing the correspondence between said first to third demodulated data string signals supplied to said data inverse-conversion circuit and an output value of said data inverse-conversion circuit.

26. A multi-level modulation/demodulating communication system comprising:
a multi-level modulating apparatus for performing multi-level modulation to output a communication signal; and
a multi-level demodulating apparatus for performing multi-level demodulation of a received communication signal sent by the multi-level modulating apparatus, said multi-level demodulating apparatus being the apparatus as defined in claim 24.

27. A multi-level modulation/demodulating communication system comprising:
a multi-level modulating apparatus for performing multi-level modulation to output a communication signal; and
a multi-level demodulating apparatus for performing multi-level demodulation of a received communication signal sent by the multi-level modulating apparatus, said multi-level demodulating apparatus being the apparatus as defined in claim 25.

28. An apparatus for demodulating a communication signal to output a demodulated data signal of (3p+2) strings, where p is an integer not less than 2, said apparatus comprising:
a multi-level demodulating unit for demodulating said communication signal to output a demodulated received data string signal;

a serial-to-parallel conversion circuit, receiving and time-division demultiplexing said received demodulated data string signal to output first, second and third demodulated data string signals; and a data inverse-conversion circuit, receiving said first, second and third demodulated data string signals and outputting said demodulated data signal of (3p+2) strings; wherein if said first demodulated data string signal takes on a value from 1 to $4 \times 2^{(p-2)}$, said data inverse-conversion circuit receives signals representing predetermined $(7/4) \times 2^p$ values as second and third demodulated data string signals;

if said first demodulated data string signal takes on a value from $1+4 \times 2^{(p-2)}$ to $4 \times 2^{(p-2)}+2 \times 2^{(p-2)}$, said data inverse-conversion circuit receives signals representing predetermined $(7/4) \times 2^p$ and $1 \times 2^p$ values, as second and third demodulated data string signals, respectively;

if said first demodulated data string signal takes on a value from $1+4 \times 2^{(p-2)}+2 \times 2^{(p-2)}$ to $4 \times 2^{(p-2)}+2 \times 2^{(p-2)}+1 \times 2^{(p-2)}$, said data inverse-conversion circuit receives signals representing predetermined $(1/2) \times 2^p$ and $(1/2) \times 2^p$ values, as second and third demodulated data string signals, respectively, and said data inverse-conversion circuit outputs the demodulated data signal of (3p+2) strings, said demodulated data signal taking on a predetermined value, based on the values indicated by said first, second and third demodulated data string signals.

29. A multi-level modulation/demodulating communication system comprising:

a multi-level modulating apparatus for performing multi-level modulation to output a communication signal; and a multi-level demodulating apparatus for performing multi-level demodulation of a received communication signal sent by the multi-level modulating apparatus, said multi-level demodulating apparatus being the apparatus as defined in claim 28.

30. A computer readable medium encoded with a computer program, respectively causing a computer composing a multi-level modulation apparatus to perform the processing of multi-level modulation of (3p+2) strings of an input data signal, where p is an integer not less than 2; said program causing said computer to execute the processing of converting said input data signal into first, second and third conversion data in such a manner that said first conversion data takes on a value from 1 to $(7/4) \times 2^p$ depending on the value of said input data signal;

if said first conversion data takes on a value from 1 to $4 \times 2^{(p-2)}$, said second and third conversion data takes on predetermined $(7/4) \times 2^p$ values, depending on the value of said input data signal;

if said first conversion data takes on a value from $1+4 \times 2^{(p-2)}$ to $4 \times 2^{(p-2)}+2 \times 2^{(p-2)}$ values, said second and third conversion data takes on predetermined $(7/4) \times 2^p$ and $1 \times 2^p$ values, respectively, depending on the value of said input data signal; and if said first conversion data takes on a value from $1+4 \times 2^{(p-2)}+2 \times 2^{(p-2)}$ to $4 \times 2^{(p-2)}+2 \times 2^{(p-2)}+1 \times 2^{(p-2)}$ values, said second and third conversion data takes on predetermined $1 \times 2^p$ and $(1/4) \times 2^p$ values, respectively, depending on the value of said input data signal;

said program causing said computer to execute the processing of sequentially outputting said first to third conversion data to a multi-level demodulating unit.

31. A computer readable medium encoded with a computer program, respectively causing a computer composing a multi-level demodulation apparatus to perform the processing of multi-level demodulation of a communication signal and outputting a demodulated data signal of (3p+2) strings, where p is an integer not less than 2, said program causing said computer to execute a conversion process which receives said communication signal as demodulated first to third data string signals and converts the received signals into a data demodulated signal of (3p+2) strings;

said conversion process receiving $(7/4) \times 2^p$ values as said first demodulated data string signals;

if said first demodulated signal takes on a value from 1 to $4 \times 2^{(p-2)}$, said conversion process receiving predetermined $(7/4) \times 2^p$ values as said second and third demodulated data string signals, respectively;

if said first demodulated signal takes on a value from $1+4 \times 2^{(p-2)}$ to $4 \times 2^{(p-2)}+2 \times 2^{(p-2)}$, said conversion process receiving predetermined $(7/4) \times 2^p$ and $1 \times 2^p$ values as said second and third demodulated data string signals, respectively;

if said first demodulated signal takes on a value from $1+4 \times 2^{(p-2)}+2 \times 2^{(p-2)}$ to $4 \times 2^{(p-2)}+2 \times 2^{(p-2)}+1 \times 1^{(p-2)}$, said conversion process receiving predetermined $1 \times 2^p$ and $(1/4)2^p$ values as said second and third demodulated data string signals, respectively; and said conversion process outputting a demodulated data signal of (3p+2) strings, said demodulated data signal taking on a predetermined value, based on the values indicated by said first to third demodulated data string signals.

32. A method of performing multi-level modulating/demodulation in which (3p+2) strings of an input signal are allocated to three modulation symbols, where p is an integer not less than 2, comprising the steps of:

allocating $(7/4) \times 2^p$ signal points as a first modulation symbol;

if said first modulation symbol takes 1 to $4 \times 2^{(p-3)}$ signal points, using $(7/4) \times 2^p$ signal points, predetermined in association with said input signal as second and third modulation symbols;

if said first modulation symbol takes $1+4 \times 2^{(p-2)}$ to $4 \times 2^{(p-2)}+2 \times 2^{(p-2)}$ points, using $(7/4) \times 2^p$ and $1 \times 2^p$ signal points, predetermined in association with said input signal, as said second and third modulation symbols, respectively; and if said first modulation symbol takes $1+4 \times 2^{(p-2)}+2 \times 2^{(p-2)}$ to $4 \times 2^{(p-2)}+2 \times 2^{(p-2)}+1 \times 2^{(p-2)}$ signal points, using $1 \times 2^p$ and $(1/4)2^p$ signal points, predetermined in association with said input signal, as said second and thirds symbols, respectively.

33. A method of performing multi-level modulating/demodulation in which (3p+2) strings of an input signal are allocated to three modulation symbols, where p is an integer not less than 2, comprising the steps of:

allocating $(7/4) \times 2^p$ signal points as a first modulation symbol;

if said first modulation symbol takes 1 to $4 \times 2^{(p-3)}$ signal points, using $(7/4) \times 2^p$ signal points, predetermined in association with said input signal, as second and third modulation symbol;

if said first modulation symbol takes $1+4 \times 2^{(p-2)}$ to $4 \times 2^{(p-2)}+2 \times 2^{(p-2)}$ signal points, using $(7/4) \times 2^p$ values and $1 \times 2^p$ signal points, predetermined in association with said input signal, as said second and third modulation symbols, respectively; and if said first modulation symbol takes $1+4\times2^{(p-2)}+2\times2^{(p-2)}$ to $4\times2^{(p-2)}+2\times2^{(p-2)}+1\times2^{(p-2)}$ signal points, using $(1/2)\times2^p$ values and $(1/2)\times2^p$ signal points, predetermined in association with said input signal, as said second and third modulation symbols, respectively.

34. A modulation apparatus comprising:

converting means receiving an input signal that takes on a value from 1 to a (3p+2) power of 2, where p is an integer not less than 2, to generate and output first to third converted data based on said input signal; and means, receiving said first to third converted data to effect multi-level modulation thereon to output modulated data;

said converting means classifying said input signal, depending on the values thereof, into three predetermined groups not having common elements, said converter means including converting means operating such that if said input signal belongs to said first group, said first converted data takes on a value form 1 to $4\times2^{(p-2)}$, depending on the value of said input signal, said second and third converted data taking on $(7/4)\times2^p$ and $(7/4)\times2^p$ values, allocated depending on the value of said input signal, respectively;

if said input signal belongs to said second group, said first converted data takes on a value from $1+4\times2^{(p-2)}$ to $4\times2^{(p-2)}+2\times2^{(p-2)}$, depending on the value of said input signal, said second and third converted data taking on $(7/4)\times2^p$ and $1\times2^p$ values, allocated depending on the value of said input signal, respectively; and if said input signal belongs to said third group, said first converted data takes on a value from $1+4\times2^{(p-2)}+2\times2^{(p-2)}$ to $4\times2^{(p-2)}+2\times2^{(p-2)}+1\times2^{(p-2)}$, depending on the value of said input signals, said second and third converted data taking on $1\times2^p$ and $(1/4)\times2^p$ values, allocated depending on the value of said input signal, respectively.

35. A modulation apparatus comprising:

converting means receiving an input signal that takes on a value from 1 to a (3p+2) power of 2, where p is an integer not less than 2, to generate and output first to third converted data based on said input signal; and means receiving said first to third converted data to effect multi-level modulation thereon to output modulated data;

said converting means classifying said input signal, depending on the values thereof, into three predetermined groups not having common elements, said converter means including means operating such that if said input signal belongs to said first group, said first converted data takes on a value form 1 to $4\times2^{(p-2)}$, depending on the value of said input signal, said second and third converted data taking on $(7/4)\times2^p$ and $(7/4)\times2^p$ values, allocated depending on the value of said input signal, respectively;

if said input signal belongs to said second group, said first converted data takes on a value from $1+4\times2^{(p-2)}$ to $4\times2^{(p-2)}+2\times2^{(p-2)}$, depending on the value of said input signal, said second and third converted data taking on $(7/4)\times2^p$ and $1\times2^p$ values, allocated depending on the value of said input signal, respectively; and if said input signal belongs to said third group, said first converted data takes on a value from $1+4\times2^{(p-2)}+2\times2^{(p-2)}$ to $4\times2^{(p-2)}+2\times2^{(p-2)}+1\times2^{(p-2)}$, depending on the value of said input signal, said second and third converted data taking on $(1/2)\times2^p$ and $(1/2)\times2^p$ values, allocated depending on the value of said input signal, respectively.

36. A method of performing multi-level modulating, said method comprising the steps of:

converting a data signal of (3p+2) strings, where p is an integer not less than 2, to three signals, each being a (p+1) strings signal and having a predetermined relation to one another;

allocating the three signals of (p+1) strings separately to three phase planes; and performing multi-level modulation with the three phase planes as a set, by controlling the numbers of the signal points in the three phase planes; wherein an multi-level quadrature amplitude modulation (QAM) is carried out, in which equivalently (p+2/3) bits are allocated to each modulation symbol and the n-ary number is approximated to $2^{(p+2/3)}$.

37. An apparatus for performing multi-level modulation of an input data string to output a communication signal, said apparatus comprising:

a data string number conversion circuit for converting the input data string into an input data signal made up by (4p+3) strings of binary signals, where p is an integer not less than 3, and for outputting said input data signal;

a first data conversion circuit, receiving the input data signal output from the data string number conversion circuit for converting the input data signal to output the converted input data signal;

a second data conversion circuit, receiving the input data signal output from the data string number conversion circuit and an output signal of the first data conversion circuit to convert the received signal into four sets of output signals, termed first, second, third and fourth output signals, each being a (p+3) string output signal;

a parallel-to-serial conversion circuit, receiving and time-division multiplexing the four sets of (p+1) string output signals, output by the second data conversion circuit, to output multiplexed signals; and a multi-level modulating unit, receiving the multiplexed signals of the parallel-to-serial conversion circuit, for effecting multi-level modulation to output the communication signal; wherein the first data conversion circuit outputs an output signal indicating values from 1 to $15\times2^{(p-3)}$, responsive to the value of the input data signal;

if the output signal of the first data conversion circuit takes on a value from 1 to $8\times2^{(p-3)}$, the second data conversion circuit sets, based on the input data signal, the value of the output signal of the first data conversion circuit as the first output signal and outputs signals representing predetermined $15\times2^{(p-3)}$, $15\times2^{(p-3)}$ and $12\times2^{(p-3)}$ values as the second, third and fourth signals, respectively;

if the output signal of the first data conversion circuit takes on a value from $8\times2^{(p-3)}+1$ to $8\times2^{(p-3)}+4\times2^{(p-3)}$, the second data conversion circuit sets the value of the output signal of the first data conversion circuit as the first output signal and outputs signals representing predetermined $15\times2^{(p-3)}$, $12\times2^{(p-3)}$ and $12\times2^{(p-3)}$ values as the second, third and fourth output signals, respectively;

if the output signal of the first data conversion circuit takes on a value from $8\times2^{(p-3)}+4\times2^{(p-3)}+1$ to $8\times2^{(p-3)}+4\times2^{(p-3)}+2\times2^{(p-3)}$, the second data conversion circuit sets the value of the output signal of the first data conversion circuit as the first output signal and outputs signals representing predetermined $12\times2^{(p-3)}$, $12\times2^{(p-3)}$ and $8\times2^{(p-3)}$ values as the second, third and fourth signals, respectively, and if the output signal of the first data conversion circuit takes on a value from $8\times2^{(p-3)}+4\times2^{(p-3)}+2\times2^{(p-3)}+1$ to $8\times2^{(p-3)}+4\times2^{(p-3)}2\times2^{(p-3)}+1\times2^{(p-3)}$, said second data conversion circuit sets the value of the output signal of said first data conversion circuit as said first output signal and outputs signals representing predetermined $8\times2^{(p-3)}$, $7\times2^{(p-3)}$ and $4\times2^{(p-3)}$ values as said second, third and fourth signals, respectively.

38. The apparatus as defined in claim 37, wherein, when values from 1 to $15\times2^{(p-3)}$, are classified by the first data conversion circuit as said output signal of said first data conversion circuit, responsive to the value of said input data signal, the output signal of said first data conversion circuit, taking $8\times2^{(p-3)}$, $4\times2^{(p-3)}$, $2\times2^{(p-3)}$ and $1\times2^{(p-3)}$ values, is output the sequence thereof is interchanged.

39. The apparatus as defined in claim 37, wherein, if the output signal of said first data conversion circuit takes on a value from $8\times2^{(p-3)}+4\times2^{(p-3)}+2\times2^{(p-3)}+1$ to $8\times2^{(p-3)}+4\times2^{(p-3)}+2\times2^{(p-3)}+1\times2^{(p-3)}$, said second data conversion circuit sets the value of the output signal of said first data conversion circuit as said first output signal to output predetermined values of $4\times2^{(p-3)}$, $14\times2^{(p-3)}$ and $4\times2^{(p-3)}$ values or predetermined values of $14\times2^{(p-3)}$, $8\times2^{(p-3)}$ and $2\times2^{(p-3)}$ values, as said second, third and fourth output signals, respectively.

40. The apparatus as defined in claim 37, wherein said second data conversion circuit outputs second to fourth output signals as the sequence of predetermined plural values thereof is interchanged.

41. A multi-level modulation/demodulating communication system comprising:
a multi-level modulating apparatus for performing multi-level modulation to output a communication signal, said multi-level modulating apparatus being the apparatus as defined in claim 37; and
a multi-level demodulating apparatus for performing multi-level demodulation of a received communication signal sent by the multi-level modulating apparatus.

42. The apparatus as defined in claim 37, further comprising
multi-level modulation controlling means for controlling said first and second data conversion circuits for changing the correspondence between said input data signal supplied to said first and second data conversion circuits and output values of output signals from said first and second data conversion circuits.

43. A multi-level modulation/demodulating communication system comprising:
a multi-level modulating apparatus for performing multi-level modulation to output a communication signal, said multi-level modulating apparatus being the apparatus as defined in claim 42; and
a multi-level demodulating apparatus for performing multi-level demodulation of a received communication signal sent by the multi-level modulating apparatus.

44. An apparatus for performing multi-level demodulation of a communication signal to output a demodulated data signal of (4p+3) strings, where p is an integer not less than 3, said apparatus comprising:
a multi-level demodulating unit for demodulating said communication signals to output a received demodulated data string signal;
a serial-to-parallel conversion circuit, receiving and time-division demultiplexing said received demodulated data string signal to output first, second, third and fourth demodulated data string signals; and
a data inverse-conversion circuit, receiving said first, second, third and fourth demodulated data string signals to output said demodulated data signal of 4p+3 strings; wherein
if said first demodulated data string signal takes on a value from 1 to $8\times2^{(p-3)}$, said data inverse-conversion circuit receives signals representing predetermined $15\times2^{(p-3)}$, $15\times2^{(p-3)}$ and $12\times2^{(p-3)}$ values as second, third and fourth demodulated data string signals, respectively;
if said first demodulated data string signal takes on a value from $8\times2^{(p-3)}+1$ to $8\times2^{(p-3)}+4\times2^{(p-3)}$, said data inverse-conversion circuit receives signals representing predetermined $15\times2^{(p-3)}$, $12\times2^{(p-3)}$ and $12\times2^{(p-3)}$ values, as second, third and fourth demodulated data string signals, respectively;
if said first demodulated data string signal takes on a value from $8\times2^{(p-3)}+4\times2^{(p-3)}+1$ to $8\times2^{(p-3)}+4\times2^{(p-3)}+2\times2^{(p-3)}$, said data inverse-conversion circuit receives signals representing predetermined $12\times2^{(p-3)}$, $12\times2^{(p-3)}$ and $8\times2^{(p-3)}$ values, as second, third and fourth demodulated data string signals, respectively;
if said first demodulated data string signal takes on a value from $8\times2^{(p-3)}+4\times2^{(p-3)}+2\times2^{(p-3)}+1$ to $8\times2^{(p-3)}+4\times2^{(p-3)}+2\times2^{(p-3)}+1\times2^{(p-3)}$, said data inverse-conversion circuit receives signals representing predetermined $8\times2^{(p-3)}$, $7\times2^{(p-3)}$ and $4\times2^{(p-3)}$ values, as second, third and fourth demodulated data string signals, respectively; and
said data inverse-conversion circuit outputs the demodulated data taking on a predetermined value, based on the values indicated by said first, second, third and fourth demodulated data string signals, as said (4p+3) strings of said demodulated data.

45. The apparatus as defined in claim 41, wherein, when the values of said demodulated data string signal of from 1 to $15\times2^{(p-3)}$, are classified, responsive to the value of said first demodulated data string signal, said first demodulated data string signal is composed by $8\times2^{(p-3)}$, $4\times2^{(p-3)}$, $2\times2^{(p-3)}$ and $1\times2^{(p-3)}$ values, as the sequence thereof is interchanged.

46. The apparatus as defined in claim 44, wherein, if said first demodulated data string signal take on a value from $8\times2^{(p-3)}+4\times2^{(p-3)}+2\times2^{(p-3)}+1$ to $8\times2^{(p-3)}+4\times2^{(p-3)}+2\times2^{(p-3)}+1\times2^{(p-3)}$, said data inverse-conversion circuit receives the signals of predetermined values of $14\times2^{(p-3)}$, $4\times2^{(p-3)}$ and $4\times2^{(p-3)}$, or predetermined values of $14\times2^{(p-3)}$, $8\times2^{(p-3)}$ and $2\times2^{(p-3)}$, as said second, third and fourth output signals, respectively.

47. The apparatus as defined in claim 44, wherein second to fourth demodulated data string signals are output the sequence of predetermined plural values thereof is interchanged.

48. A multi-level modulation/demodulating communication system comprising:
a multi-level modulating apparatus for performing multi-level modulation to output a communication signal; and
a multi-level demodulating apparatus for performing multi-level demodulation of a received communication signal sent by the multi-level modulating apparatus, said multi-level demodulating apparatus being the apparatus as defined in claim 44.

49. The apparatus as defined in claim 41, further comprising
multi-level modulation controlling means for controlling said data inverse-conversion circuit for changing the correspondence between said first to fourth demodulated data string signals supplied to said data inverse-conversion circuit and an output value of said data inverse-conversion circuit.

50. A multi-level modulation/demodulating communication system comprising:
a multi-level modulating apparatus for performing multi-level modulation to output a communication signal; and
a multi-level demodulating apparatus for performing multi-level demodulation of a received communication signal sent by the multi-level modulating apparatus, said multi-level demodulating apparatus being the apparatus as defined in claim 49.

51. A computer readable medium encoded with a computer program, respectively causing computer composing a multi-level modulation apparatus to perform the processing of multi-level modulation of (4p+3) strings of an input data signal, where p is an integer not less than 3; said program causing said computer to execute the processing of converting said input data signal into first, second, third and fourth converted data in such a manner that said first conversion data takes on a value from 1 to $15 \times 2^{(p-3)}$ depending on the value of said input data signal;

if said first conversion data takes on a value from 1 to $8 \times 2^{(p-3)}$, said second, third and fourth conversion data take on predetermined $15 \times 2^{(p-3)}$, $12 \times 2^{(p-3)}$ and $12 \times 2^{(p-3)}$ values, depending on the value of said input data signal, respectively;

if said first conversion data takes on a value from to $8 \times 2^{(p-3)}+1$ to $8 \times 2^{(p-3)}+4 \times 2^{(p-3)}$ values, said second, third and fourth conversion data take on predetermined $15 \times 2^{(p-3)}$, $12 \times 2^{(p-3)}$ and $12 \times 2^{(p-3)}$ values, respectively, depending on the value of said input data signal;

if said first conversion data takes on a value from $8 \times 2^{(p-3)}+4 \times 2^{(p-3)}+1$ to $8 \times 2^{(p-3)}+4 \times 2^{(p-3)}+2 \times 2^{(p-3)}$ values, said second, third and fourth conversion data take on predetermined $12 \times 2^{(p-3)}$, $12 \times 2^{(p-2)}$ and $8 \times 2^{(p-3)}$ values, respectively, depending on the value of said input data signal; and if said first conversion data takes on a value from $8 \times 2^{(p-3)}+4 \times 2^{(p-3)}+2 \times 2^{(p-3)}+1$ to $8 \times 2^{(p-3)}+4 \times 2^{(p-3)}+2 \times 2^{(p-3)}1 \times 2^{(p-3)}$ values, said second, third and fourth conversion data take on predetermined $8 \times 2^{(p-3)}$, $7 \times 2^{(p-3)}$ and $4 \times 2^{(p-3)}$ values, respectively, depending on the value of said input data signal;

said program causing said computer to execute the processing of sequentially outputting said first to fourth conversion data to a multi-level demodulating unit.

52. The computer readable medium, respectively as defined in claim 51, said program causing said computer to execute a processing in which, when the conversion values from 1 to $15 \times 2^{(p-3)}$, as values of said input data signal, responsive to the value of said input data signal, are classified, the output signal of said first conversion data, made up by $8 \times 2^{(p-3)}$, $4 \times 2^{(p-3)}$, $2 \times 2^{(p-3)}$ and $1 \times 2^{(p-3)}$ values, is output as the sequence thereof is interchanged.

53. The computer program product as defined in claim 51, said computer program causing said computer to execute a processing in which, if said first conversion data takes on a value from $8 \times 2^{(p-3)}+4 \times 2^{(p-3)}+2 \times 2^{(p-3)}+1$ to $8 \times 2^{(p-3)}+4 \times 2^{(p-3)}+2 \times 2^{(p-3)}+1 \times 2^{(p-3)}$ values, said second, third and fourth conversion data take on predetermined $4 \times 2^{(p-3)}$, $14 \times 2^{(p-3)}$ and $4 \times 2^{(p-3)}$ values or predetermined $14 \times 2^{(p-3)}$, $8 \times 2^{(p-3)}$ and $2 \times 2^{(p-3)}$ values, as said second, third and fourth output signals, respectively.

54. The computer readable medium, respectively as defined in claim 51, said computer program causing said computer to execute the processing of outputting said second to fourth conversion data as the sequence of predetermined plural values thereof is interchanged.

55. The computer readable medium, respectively as defined in claim 51, said computer program causing said computer to execute the processing in which, when the conversion values from 1 to $15 \times 2^{(p-3)}$, are classified responsive to the value of said input data signal, the output signal of said first conversion data, made up by $8 \times 2^{(p-3)}$, $4 \times 2^{(p-3)}$, $2 \times 2^{(p-3)}$, and $1 \times 2^{(p-3)}$ values is output as the sequence thereof is interchanged.

56. A computer readable medium encoded with a computer program, respectively causing a computer composing a multi-level demodulation apparatus to perform a processing of multi-level demodulation of a communication signal and outputting a demodulated data signal of (4p+3) strings, where p is an integer not less than 3, said program causing said computer to execute a conversion process which receives said communication signal as demodulated first to fourth data string signals and converts the received signals into a data demodulated signal of (4p+3) strings;

said conversion process receiving $15 \times 2^{(p-3)}$ values as said first demodulated data string signal;

if said first demodulated signal takes on a value from 1 to $8 \times 2^{(p-3)}$, predetermined $15 \times 2^{(p-3)}$, said conversion process receiving $15 \times 2^{(p-3)}$ and $12 \times 2^{(p-3)}$ values are received as said second, third and fourth demodulated data string signals, respectively;

if said first demodulated signal takes on a value from $8 \times 2^{(p-3)}+1$ to $8 \times 2^{(p-3)}$ to $4 \times 2^{(p-3)}$, said conversion process receiving predetermined $15 \times 2^{(p-3)}$, $12 \times 2^{(p-3)}$ and $12 \times 2^{(p-3)}$ values as said second, third and fourth demodulated data string signals, respectively;

if said first demodulated signal takes on a value from $8 \times 2^{(p-3)}$ to $4 \times 2^{(p-3)}+1$ to $8 \times 2^{(p-3)}$ to $4 \times 2^{(p-3)}+2 \times 2^{(p-3)}$, said conversion process receiving predetermined $15 \times 2^{(p-3)}$, $15 \times 2^{(p-3)}$ and $12 \times 2^{(p-3)}$ values as said second, third and fourth demodulated data string signals, respectively;

if said first demodulated signal takes on a value from $8 \times 2^{(p-3)}$ to $4 \times 2^{(p-3)}+2 \times 2^{(p-2)}+1$ to $8 \times 2^{(p-2)}$ to $4 \times 2^{(p-2)}+2 \times 2^{(p-2)}1 \times 2^{(p-2)}$, predetermined $8 \times 2^{(p-3)}$, said conversion process receiving $7 \times 2^{(p-3)}$ and $4 \times 2^{(p-3)}$ values are received as said second, third and fourth demodulated data string signals, respectively, said conversion process outputting a demodulated data signal of (4p+3) strings, said demodulated data signal taking on a predetermined value, based on the values indicated by said first to fourth demodulated data string signals.

57. The computer program product as defined in claim 56, said computer program causing said computer to execute the processing in which, if said first conversion data takes on a first value from $8 \times 2^{(p-3)}+4 \times 2^{(p-3)}+2 \times 2^{(p-3)}+1$ to $8 \times 2^{(p-3)}+4 \times 2^{(p-3)}+2 \times 2^{(p-3)}+1 \times 2^{(p-3)}$ values, said second, third and fourth conversion data take on predetermined $14 \times 2^{(p-3)}$, $4 \times 2^{(p-3)}$ and $4 \times 2^{(p-3)}$ $^{values}$ or predetermined $14 \times 2^{(p-3)}$, $8 \times 2^{(p-3)}$ and $2 \times 2^{(p-3)}$ $^{values}$, as said second, third and fourth output signals, respectively.

58. The computer readable medium, respectively as defined in claim 56, said computer program causing said computer to perform the processing of outputting said second to fourth demodulated data string signals as the sequence of predetermined plural values thereof is interchanged.

59. A method of performing multi-level modulating/demodulation in which (4p+1) strings of an input signal are allocated to three modulation symbols, where p is an integer not less than 3, comprising the steps of:

allocating $15 \times 2^{(p-3)}$ signal points as a first modulation symbol;

if said first modulation symbol takes 1 to $8 \times 2^{(p-3)}$ signal points, using $15 \times 2^{(p-3)}$, $12 \times 2^{(p-3)}$ and $12 \times 2^{(p-3)}$ signal points, predetermined in association with said input signal, as second, third and fourth modulation symbols;

if said first modulation symbol takes $8 \times 2^{(p-3)}+1$ to $8 \times 2^{(p-3)}+4 \times 2^{(p-3)}$ signal points, using $15 \times 2^{(p-3)}$, $15 \times 2^{(p-3)}$ and $12 \times 2^{(p-3)}$ signal point predetermined in association with said input signal, are used as said second, third and fourth modulation symbols respectively;

if said first modulation symbol takes $8 \times 2^{(p-3)}+4 \times 2^{(p-3)}+1$ to $8 \times 2^{(p-3)}+4 \times 2^{(p-3)}+2 \times 2^{(p-3)}$ signal points, using $12 \times 2^{(p-3)}$, $12 \times 2^{(p-3)}$ and $8 \times 2^{(p-3)}$ signal points, predetermined in association with said input signal, are used as said second, third and fourth modulation symbols, respectively; and if said first modulation symbol takes $8 \times 2^{(p-3)}+4 \times 2^{(p-3)}+2 \times 2^{(p-3)}+1$ to $8 \times 2^{(p-3)}+4 \times 2^{(p-3)}+2 \times 2^{(p-3)}+1 \times 2^{(p-3)}$ signal points, using $8 \times 2^{(p-3)}$, $7 \times 2^{(p-3)}$ and $4 \times 2^{(p-3)}$ signal points, predetermined in association with said input signal, are used as said second, third and fourth modulation symbols, respectively.

60. The method as defined in claim 59, wherein, when the values of said first modulation symbol of from 1 to $15 \times 2^{(p-3)}$, are classified, the sequence of said first modulation symbol, namely $8 \times 2^{(p-3)}$, $4 \times 2^{(p-3)}$, $2 \times 2^{(p-3)}$ and $1 \times 2^{(p-3)}$, is interchanged.

61. The method as defined in claim 59, wherein, if the first modulation symbol takes on a value from $8 \times 2^{(p-3)}+4 \times 2^{(p-3)}+2 \times 2^{(p-3)}+1$ to $8 \times 2^{(p-3)}+4 \times 2^{(p-3)}+2 \times 2^{(p-3)}+1 \times 2^{(p-3)}$ predetermined values of $14 \times 2^{(p-3)}$, $4 \times 2^{(p-3)}$ and $4 \times 2^{(p-3)}$ values or predetermined values of $14 \times 2^{(p-3)}$, $8 \times 2^{(p-3)}$ and $2 \times 2^{(p-3)}$ values, are output as said second, third and fourth symbols for demodulation, respectively.

62. The method as defined in claim 59, wherein the sequence of plural values predetermined as second, third and fourth modulation symbols is interchanged.

63. A modulation apparatus comprising converting means, receiving an input signal that takes on a value from 1 to a (4p+3) power of 2, where p is an integer not less than 3, to generate and output first to fourth conversion data based on said input signal; and means, receiving said first to fourth converted data to effect multi-level modulation thereon to output modulated data;

said converting means classifying said input signal, depending on the values thereof, into four predetermined groups not having common elements; said converter means having means for executing conversion such that if said input signal belongs to said first group, said first conversion data takes on a value form 1 to $8 \times 2^{(p-3)}$, depending on the value of said input signal, said second, third and fourth converted data taking on $15 \times 2^{(p-3)}$, $15 \times 2^{(p-3)}$ and $12 \times 2^{(p-3)}$ values, allocated depending on the value of said input signal, respectively;

if said input signal belongs to said second group, said first conversion data takes on a value from $8 \times 2^{(p-3)}+1$ to $8 \times 2^{(p-3)}+4 \times 2^{(p-3)}$, depending on the value of said input signal, said second, third and fourth conversion data taking on $15 \times 2^{(p-3)}$, $15 \times 2^{(p-3)}$ and $12 \times 2^{(p-3)}$ values, allocated depending on the value of said input signal, respectively;

if said input signal belongs to said third group, said first conversion data takes on a value from $8 \times 2^{(p-2)}++4 \times 2^{(p-3)}+1$ to $8 \times 2^{(p-3)}+4 \times 2^{(p-3)}+2 \times 2^{(p-3)}$ depending on the value of said input signal, said second, third and fourth conversion data taking on $12 \times 2^{(p-3)}$, $12 \times 2^{(p-3)}$ and $8 \times 2^{(p-3)}$ values, allocated depending on the value of said input signal, respectively; and if said input signal belongs to said third group, said first conversion data takes on a value from $8 \times 2^{(p-2)}+4 \times 2^{(p-3)}+2 \times 2^{(p-3)}+1$ to $8 \times 2^{(p-3)}+4 \times 2^{(p-3)}+2 \times 2^{(p-3)}+1 \times 2^{(p-3)}$ depending on the value signal, said second, third and fourth converted data taking on $8 \times 2^{(p-3)}$, $7 \times 2^{(p-3)}$ and $4 \times 2^{(p-3)}$ values, allocated depending on the value of said input signal, respectively.

64. A method of performing modulation comprising the steps of:

converting a data signal of (4p+3) strings, where p is an integer not less than 3, to four signals, each being a (p+1) string and having a predetermined relation to one another, allocating the four signal of (p+1) string separately to four phase planes, and performing multi-level modulation, with the four phase planes as a set, by controlling respective numbers of signal points in the four phase planes; wherein an multi-level quadrature amplitude modulation (QAM) is carried out, in which equivalently (p+3/4) bits are allocated to each modulation symbol and the n-ary number is approximated to $2^{(p-3/4)}$.

* * * * *